US009990187B1

(12) United States Patent
Carroll et al.

(10) Patent No.: US 9,990,187 B1
(45) Date of Patent: Jun. 5, 2018

(54) ANALYTIC EXECUTION FOR AUTOMATIC DECISION MAKING

(71) Applicant: SAS Institute Inc., Cary, NC (US)

(72) Inventors: James Porter Carroll, Cary, NC (US); Martin D. Tomasi, Cary, NC (US); David Rawlings Duling, Durham, NC (US); Steve Michael Sparano, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days. days.

(21) Appl. No.: 15/821,220

(22) Filed: Nov. 22, 2017

Related U.S. Application Data

(60) Provisional application No. 62/451,226, filed on Jan. 27, 2017.

(51) Int. Cl.
G06F 9/45 (2006.01)
G06F 9/44 (2018.01)

(52) U.S. Cl.
CPC . G06F 8/41 (2013.01); G06F 8/31 (2013.01)

(58) Field of Classification Search
CPC .................................... G06F 8/41; G06F 8/31
USPC ........................................................ 717/152
See application file for complete search history.

(56) References Cited

U.S. PATENT DOCUMENTS

| | | | | |
|---|---|---|---|---|
| 2005/0015748 | A1* | 1/2005 | Zatloukal | G06F 8/20 717/114 |
| 2008/0005728 | A1* | 1/2008 | Morris | G06F 8/52 717/153 |
| 2010/0088686 | A1* | 4/2010 | Langworthy | G06F 8/41 717/143 |
| 2013/0159981 | A1* | 6/2013 | Klemenz | G06F 8/47 717/143 |

OTHER PUBLICATIONS

Wexler et al., Time Is Precious, So Are Your Models: SAS® Provides Solutions to Streamline Deployment, Paper 086-2013, SAS Global Forum 2013, Apr. 28, 2013.
SAS Institute Inc. 2014. SAS® Decision Manager 2.2: User's Guide. Cary, NC: SAS Institute Inc., Jan. 2015.
(Continued)

*Primary Examiner* — Anna Deng
(74) *Attorney, Agent, or Firm* — Bell & Manning, LLC

(57) ABSTRACT

A computing device executes analytic source code published to it. A revision definition includes source code in a first programming language compiled using a first compiler. When the source code compilation is successful, the source code is parsed to define code elements, an integration function is generated, the integration function is compiled with the source code using a second compiler in a second programming language to define an executable, an entry point address to the generated integration function is retrieved from the defined executable, an incremented revision number and the entry point address are stored in a created revision data structure, and the created revision data structure is stored in a created module context data structure. The integration function maps first input and output parameters of the source code in the second programming language to second input and output parameters of the source code in the first programming language.

30 Claims, 21 Drawing Sheets

(56) References Cited

OTHER PUBLICATIONS

SAS Institute Inc. 2015. SAS® Decision Manager 3.1: User's Guide. Cary, NC: SAS Institute Inc., Jul. 2015.
Sparano et al., Introduction to SAS® Decision Manager, Paper 276-2014, SAS Global Forum 2014, Mar. 23, 2014.
Crain et al., Next Generation: Using SAS® Decision Manager to Modernize and Improve Your Operational Decisions, SAS1912-2015, SAS Global Forum 2015, Apr. 26, 2015.
J. Taylor, SAS Decision Manager, 2014.

* cited by examiner

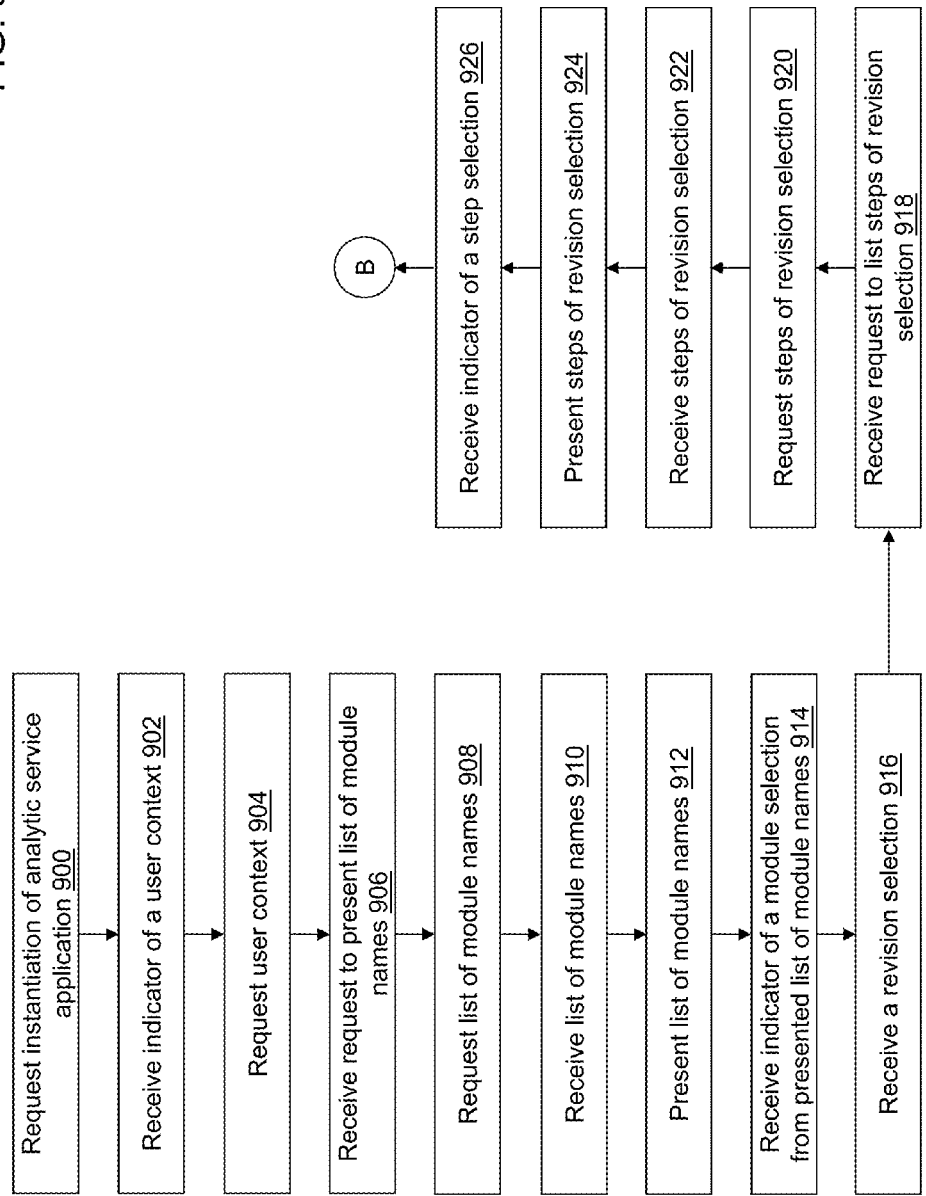

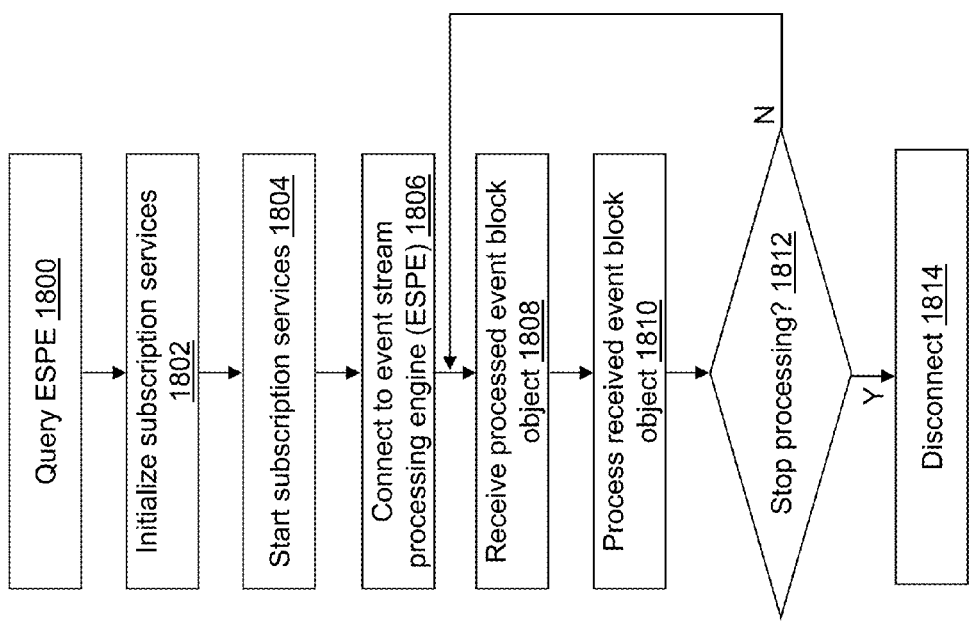

ANALYTIC EXECUTION FOR AUTOMATIC DECISION MAKING

CROSS-REFERENCE TO RELATED APPLICATIONS

The present application claims the benefit of 35 U.S.C. § 119(e) to U.S. Provisional Patent Application No. 62/451,226 filed Jan. 27, 2017, the entire contents of which are all hereby incorporated by reference.

BACKGROUND

A typical analytic project involves multiple programming languages that require integrators to employ cross-language integration code and to handle multiple runtime libraries and data representation differences manually, which limits the automation and flexibility of analytic use for automatic decision making and lengthens project implementation times. Existing software systems require a separate set of tools for each programming language, and require separate steps to compile and deploy executables to each target environment. This separation of analytic program creation and deployment limits the ability of users to rapidly implement changes.

SUMMARY

In an example embodiment, a non-transitory computer-readable medium is provided having stored thereon computer-readable instructions that when executed by a computing device, cause the computing device to execute analytic source code published to the computing device. A module context definition is received from an analytic client application. The module context definition includes a module context name and an indicator of a first programming language. A module context data structure is created for the module context definition. The module context name and the indicator of the first programming language are stored in the created module context data structure. A value of a module context pointer is defined. The value is a memory location of the created module context data structure. The value of the module context pointer is stored. A revision definition is received from the analytic client application. The revision definition includes source code based on the first programming language. The source code included in the received revision definition is compiled using a first compiler associated with the indicator of the first programming language. When the compilation of the source code is successful, a revision number is incremented, a revision data structure is created for the revision definition, the source code is parsed to define code elements, an integration function is generated, the generated integration function is compiled with the source code using a second compiler associated with the second programming language to define an executable, an entry point address to the generated integration function is retrieved from the defined executable, the incremented revision number and the retrieved entry point address are stored in the created revision data structure, and the created revision data structure is stored in the created module context data structure. The integration function is generated using the parsed source code. The generated integration function maps first input parameters of the source code in a second programming language to second input parameters of the source code in the first programming language and maps first output parameters of the source code in the second programming language to second output parameters of the source code in the first programming language. A request to execute the source code is received from the analytic client application that includes a module indicator and a revision indicator. The created revision data structure is identified using the module indicator and the revision indicator. The retrieved entry point address is identified using the identified, created revision data structure. The generated integration function is called using the identified, retrieved entry point address. The generated integration function calls the source code compiled using the second compiler. A result generated by the called integration function is output.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to execute analytic source code published to the computing device.

In yet another example embodiment, a method of executing analytic source code published to a computing device is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 9A-9B depict flow diagrams illustrating examples of operations performed by the analytic execution device of FIG. 4 in requesting execution of an analytic revision accordance with an illustrative embodiment.

FIG. 18 depicts a flow diagram illustrating examples of operations performed by the event subscribing device of FIG. 17 in accordance with an illustrative embodiment.

DETAILED DESCRIPTION

Figure 1:
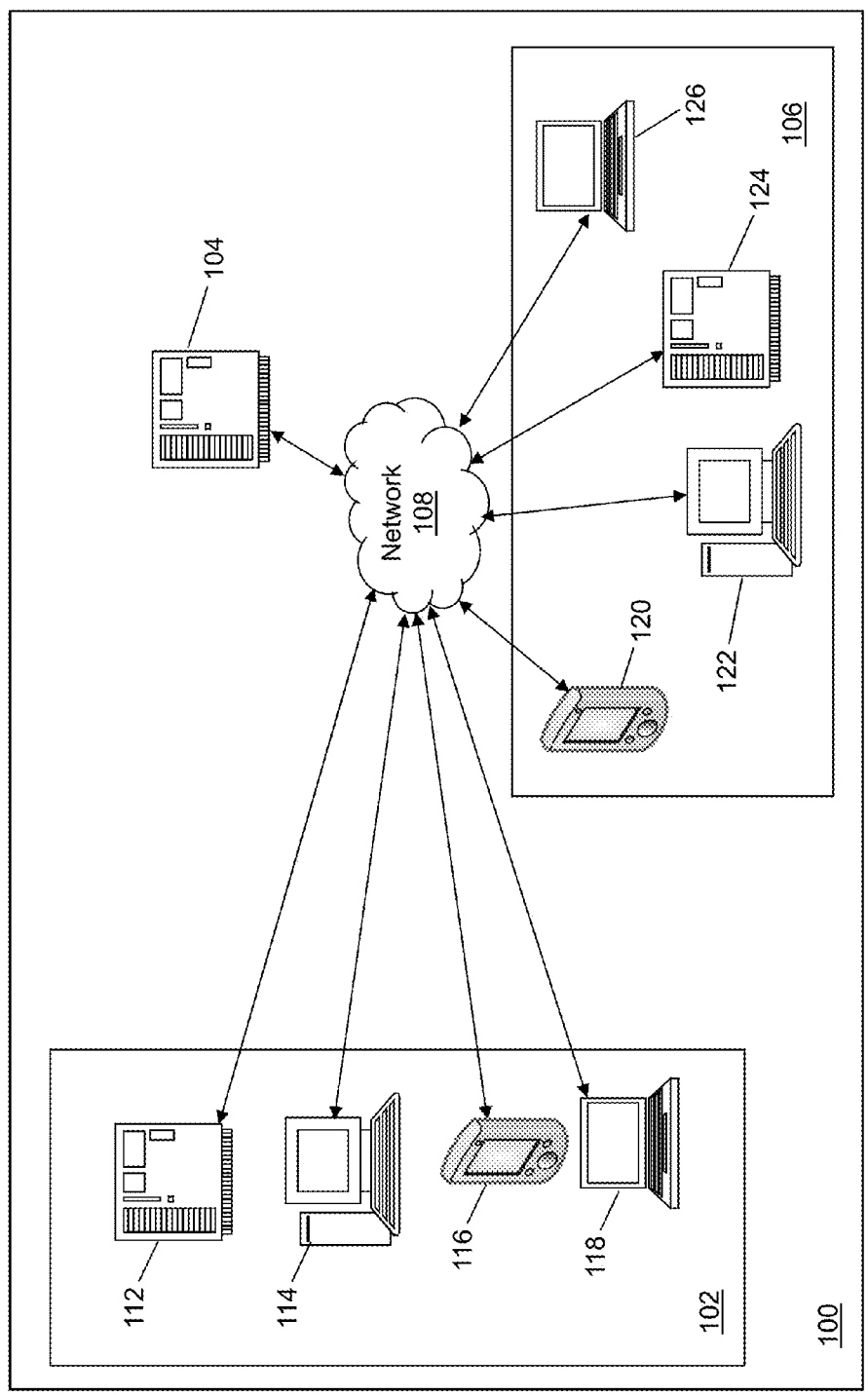
FIG. 1 depicts a block diagram of an analytic creation and execution system in accordance with an illustrative embodiment.

Referring to FIG. 1, a block diagram of an analytic creation and execution system 100 is shown in accordance with an illustrative embodiment. In an illustrative embodiment, analytic creation and execution system 100 may include an analytic creation system 102, an analytic service device 104, an analytic execution system 106, and a network 108. Each of analytic creation system 102, analytic service device 104, and analytic execution system 106 may be composed of one or more discrete devices in communication through network 108. Analytic service device 104 may be integrated with a computing device of analytic creation system 102 and/or analytic execution system 106. Analytic creation system 102 may be integrated with or may be the same system as analytic execution system 106.

Analytic creation system 102 requests publication of an analytic revision based on source code that defines an analytic decision-making model. Analytic execution system 106 requests execution of the published analytic revision with input data to perform automatic decision making based on the input data. Analytic service device 104 receives the source code from analytic creation system 102, creates the analytic revision for execution, and executes the analytic revision with input data received from analytic execution system 106.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

Analytic service device 104 can include any form factor of computing device. For illustration, FIG. 1 represents analytic service device 104 as a server computer. In general, a server computer may include faster processors, additional processors, more disk memory, and/or more random access memory (RAM) than a client computer and support multi-threading as understood by a person of skill in the art. Analytic service device 104 sends and receives signals through network 108 to/from analytic creation system 102 and/or to/from analytic execution system 106. Analytic service device 104 may communicate using various transmission media that may be wired and/or wireless as understood by those skilled in the art. Analytic service device 104 may be implemented on a plurality of computing devices of the same or different type.

Figure 2:
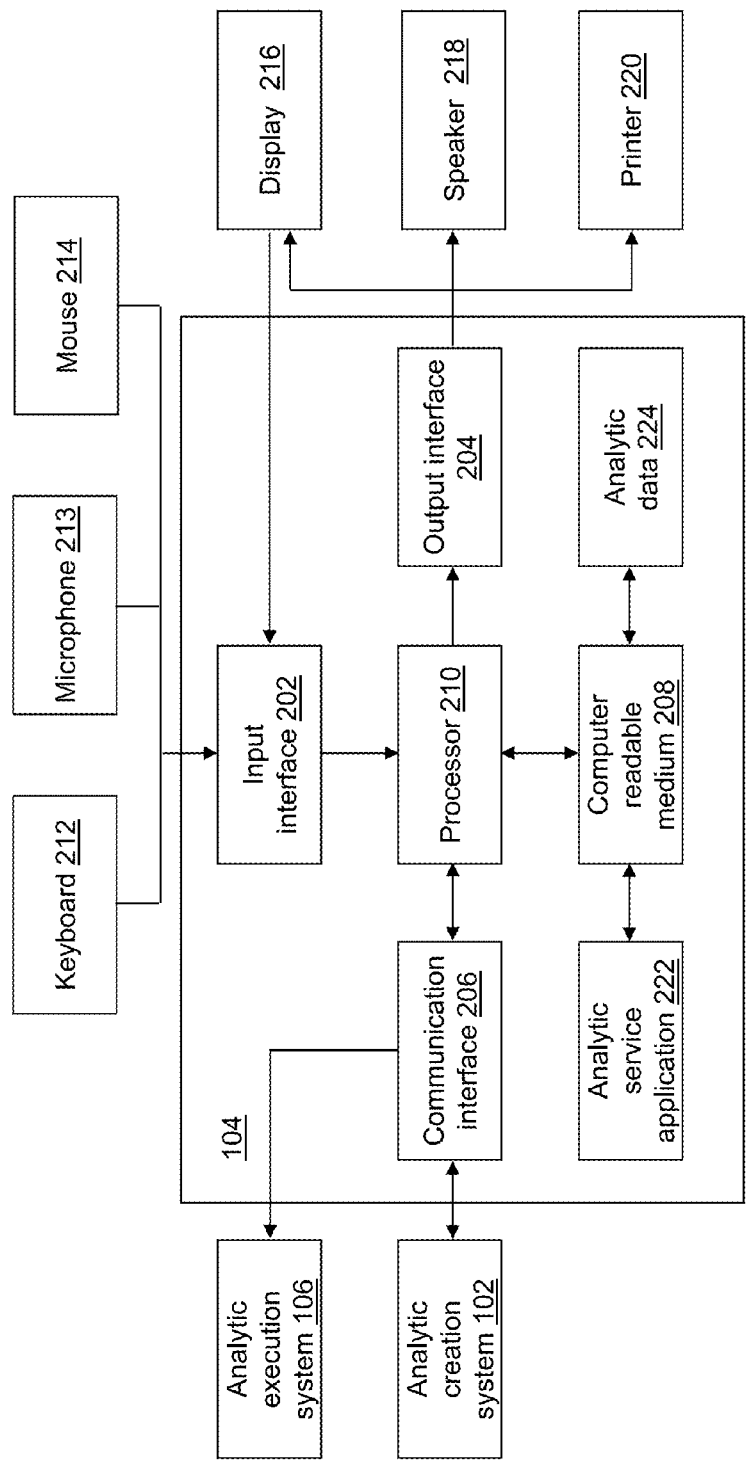
FIG. 2 depicts a block diagram of an analytic service device in accordance with an illustrative embodiment.

For illustration, referring to FIG. 2, a block diagram of analytic service device 104 is shown in accordance with an example embodiment. Analytic service device 104 may include an input interface 202, an output interface 204, a communication interface 206, a non-transitory computer-readable medium 208, a processor 210, an analytic service application 712, and analytic data 224. Fewer, different, and/or additional components may be incorporated into analytic service device 104.

Input interface 202 provides an interface for receiving information from the user or another device for entry into analytic service device 104 as understood by those skilled in the art. Input interface 202 may interface with various input technologies including, but not limited to, a keyboard 212, a microphone 213, a mouse 214, a display 216, a track ball, a keypad, one or more buttons, etc. to allow the user to enter information into analytic service device 104 or to make selections presented in a user interface displayed on display 216. The same interface may support both input interface 202 and output interface 204. For example, display 216 comprising a touch screen provides a mechanism for user input and for presentation of output to the user. Analytic service device 104 may have one or more input interfaces that use the same or a different input interface technology. The input interface technology further may be accessible by analytic service device 104 through communication interface 206.

Output interface 204 provides an interface for outputting information for review by a user of analytic service device 104 and/or for use by another application or device. For example, output interface 204 may interface with various output technologies including, but not limited to, display 216, a speaker 218, a printer 220, etc. Analytic service device 104 may have one or more output interfaces that use the same or a different output interface technology. The output interface technology further may be accessible by analytic service device 104 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Analytic service device 104 may have one or more communication interfaces that use the same or a different communication interface technology. For example, analytic service device 104 may support communication using an Ethernet port, a Bluetooth antenna, a telephone jack, a USB port, etc. Data and messages may be transferred between analytic service device 104 and a computing device of analytic creation system 102 and/or analytic execution system 106 using communication interface 206. For example, analytic service device 104 may communicate with one or more analytic client devices that may request publication and/or execution of an analytic stored in analytic data 224.

Non-transitory computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Analytic service device 104 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Analytic service device 104 also may have one or more drives that support the loading of a memory media such as a CD, DVD, an external hard drive, etc. One or more external hard drives further may be connected to analytic service device 104 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Analytic service device 104 may include a plurality of processors that use the same or a different processing technology.

Analytic service application 222 performs operations associated with receiving source code, compiling the received source code, creating analytic data 224, and executing the compiled source code stored in analytic data 224 when requested. Some or all of the operations described herein may be embodied in analytic service application 222. The operations may be implemented using hardware, firmware, software, or any combination of these methods. Referring to the example embodiment of FIG. 2, analytic service application 222 is implemented in software (comprised of computer-readable and/or computer-executable instructions) stored in computer-readable medium 208 and accessible by processor 210 for execution of the instructions that embody the operations of analytic service application 222. Analytic service application 222 may be written using one or more programming languages, assembly languages, scripting languages, etc.

Analytic service application 222 may be integrated with other analytic tools. As an example, analytic service application 222 may be part of an integrated data analytics software application and/or software architecture such as that offered by SAS Institute Inc. of Cary, N.C., USA. Merely for illustration, analytic service application 222 may be implemented using or integrated with one or more SAS software tools such as Base SAS, SAS® Enterprise Miner™, SAS Factory Miner, SAS® Model Manager, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Event Stream Processing, SAS® Decision Manager, SAS® Forecast Server, all of which are developed and provided by SAS Institute Inc. of Cary, N.C., USA. Data mining, statistical analytics, and response prediction are applicable in a wide variety of industries. For example, any of SAS® Enterprise Miner™, SAS Factory Miner, SAS® Decision Manager may generate an analytic, predictive, descriptive, and/or prescriptive model that is submitted to analytic service application 222 so that is can be compiled for execution many times.

Analytic service application 222 provides language-independent publishing and execution interfaces, which enable source code that describes the generated model, written in any supported programming language, to be published directly to a broad spectrum of execution environments. When published, the source code is compiled with a built-in optimizing compiler, and the resulting executable code stream is maintained in-memory in the target environment, where it can be executed repeatedly.

Supported target environments range from complex event processing (CEP) systems, where a core engine of analytic service application 222 runs in-process with the CEP system to process events in near real-time, to web applications serving loosely coupled clients using a representational state transfer (REST)/JavaScript object notation (JSON) interface. Analytic service application 222 is multi-threaded and can be clustered when deployed to a web application server. Analytic service application 222 can be scaled up or down to match the performance and availability requirements of a wide range of target systems.

Analytic client devices are not required to know the language that a published module is written in, and integrators do not need to implement language-specific calling conventions, even when an analytic client application and analytic service application 222 are deployed to execute in the same process space. Metadata collected during publishing and described further below is used to support language independence and to optimize execution performance.

Analytic service application 222 provides a language-independent parameter and results passing mechanism, which enables a generated model with an arbitrary fixed signature to be called in a standard way using a set of data types supported across all languages. Conversions between language-independent and language-specific types are performed automatically where necessary.

Analytic service application 222 may be implemented as a Web application. For example, analytic service application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

For illustration, analytic service application 222 provides hosting for datastep 2 code (DS2), Python, C, and ASTORE programs and supports a "compile-once, execute-many-times" usage pattern. DS2 is a SAS® proprietary programming language developed and provided by SAS Institute Inc. of Cary, N.C., USA that is appropriate for advanced data manipulation. DS2 is included with Base SAS and SAS® Viya™. ASTORE programs may be created using the ASTORE procedure provided by the SAS Visual Data Mining and Machine Learning Procedures developed and provided by SAS Institute Inc. of Cary, N.C., USA. The ASTORE procedure is an interactive procedure in which each statement runs immediately. The ASTORE procedure describes, manages, and scores with an analytic store, also referred to as an astore. The analytic store is the result of a SAVESTATE statement from another analytic procedure and is a binary file that contains that procedure's state after it completes the training phase of data analysis. The analytic store can be used at a later time for scoring input data.

Analytic service application 222 may be multi-threaded and may be clustered for high availability. Analytic service application 222 provides the capability to embed analytics into very small portable systems in support of real-time or transactional analytics. Analytic service application 222 can execute multiple source code programs simultaneously as well as maintain isolation between multiple user contexts.

Referring again to FIG. 1, the one or more computing devices of analytic creation system 102 may include computing devices of any form factor such as a server computer 112, a desktop 114, a smart phone 116, a laptop 118, a personal digital assistant, a tablet computer, etc. Analytic creation system 102 can include any number and any combination of form factors of computing devices that may be organized into subnets. The computing devices of analytic creation system 102 send and receive signals through network 108 to/from another of the one or more computing devices of analytic creation system 102 and/or to/from analytic service device 104. The one or more computing devices of analytic creation system 102 may communicate using various transmission media that may be wired and/or wireless as understood by those skilled in the art. The one or more computing devices of analytic creation system 102 may be geographically dispersed from each other and/or co-located.

Figure 3:
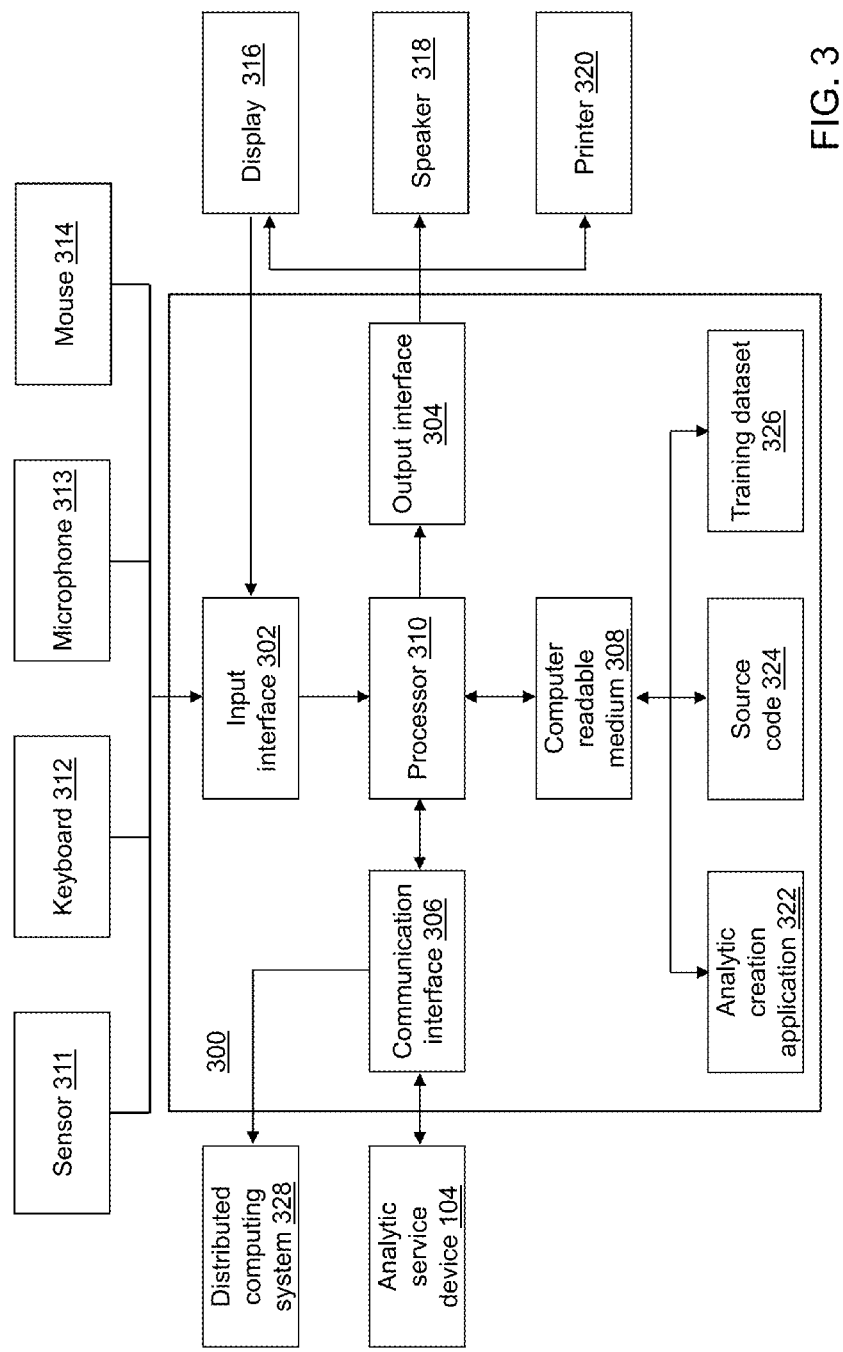
FIG. 3 depicts a block diagram of an analytic creation device in accordance with an illustrative embodiment.

For illustration, referring to FIG. 3, a block diagram of an analytic creation device 300 is shown in accordance with an example embodiment. Analytic creation device 300 is an example computing device of analytic creation system 102. For example, each of server computer 112, desktop 114, smart phone 116, and laptop 118 may be an instance of analytic creation device 300. Analytic creation device 300 may include a second input interface 302, a second output interface 304, a second communication interface 306, a second non-transitory computer-readable medium 308, a second processor 310, an analytic creation application 322, source code 324, and training dataset 326. Each computing device of analytic creation system 102 may be executing analytic creation application 322 of the same or different type. Fewer, different, and/or additional components may be incorporated into analytic creation device 300. For illustration, source code 324 may include an astore, a DS2 package, a C program, or a Python script.

Second input interface 302 provides the same or similar functionality as that described with reference to input interface 202 of analytic service device 104 though referring to analytic creation device 300. Second output interface 304 provides the same or similar functionality as that described with reference to output interface 204 of analytic service device 104 though referring to analytic creation device 300. Second communication interface 306 provides the same or similar functionality as that described with reference to communication interface 206 of analytic service device 104 though referring to analytic creation device 300. Data and messages may be transferred between analytic creation device 300 and analytic service device 104 and/or to/from a distributed computing system 328 using second communication interface 306. Second computer-readable medium 308 provides the same or similar functionality as that described with reference to computer-readable medium 208 of analytic service device 104 though referring to analytic creation device 300. Second processor 310 provides the same or similar functionality as that described with reference to processor 210 of analytic service device 104 though referring to analytic creation device 300.

Analytic creation application 322 performs operations associated with requesting compilation, also referred to as publication, of one or more source code blocks stored in source code 324. Analytic creation application 322 further may create the one or more source code blocks from data stored in training dataset 326. Some or all of the operations described herein may be embodied in analytic creation application 322. The operations may be implemented using hardware, firmware, software, or any combination of these methods.

Referring to the example embodiment of FIG. 3, analytic creation application 322 is implemented in software (comprised of computer-readable and/or computer-executable instructions) stored in second computer-readable medium 308 and accessible by second processor 310 for execution of the instructions that embody the operations of analytic creation application 322. Analytic creation application 322 may be written using one or more programming languages, assembly languages, scripting languages, etc. Analytic creation application 322 may be integrated with other analytic tools. For example, analytic creation application 322 may be implemented using or integrated with one or more SAS software tools such as Base SAS, SAS® Enterprise Miner™, SAS Factory Miner, SAS® Model Manager, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Event Stream Processing, SAS® Decision Manager, SAS® Forecast Server, all of which are developed and provided by SAS Institute Inc. of Cary, N.C., USA.

Analytic creation application 322 and analytic service application 222 further may be integrated applications such that a model generated by analytic creation application 322 is automatically published to analytic service application 222. As used herein, a model is an analytic model created by training using training dataset 326 and which is defined by source code and data parameters that include hyperparameters and model parameters. Merely for illustration, analytic creation application 322 may generate models of various model types such as a "Decision Tree", a "Factorization Machine", a "Random Forest", a "Gradient Boosting Tree", a "Neural Network", a "Support Vector Machine", etc. Once published to analytic service device 104, the compiled model can be executed with input data 424 (shown referring to FIG. 4) to generate predicted output data 426 (shown referring to FIG. 4) using analytic execution device 400 (shown referring to FIG. 4).

Analytic creation application 322 may be implemented as a Web application. Analytic creation application 322 may be integrated with other system processing tools to automatically process data generated as part of operation of an enterprise using second input interface 302, second output interface 304, and/or second communication interface 306 so that appropriate action can be initiated in response. Source code 324 and/or training dataset 326 may be received using a sensor 311, a second keyboard 312, a second microphone 313, a second mouse 314, etc. or from another computing device through second communication interface 306. Analytic creation application 322 may present information to a user using a second display 316, a second speaker 318, a second printer 320, etc.

Analytic creation application 322 may perform operations associated with defining source code 324 after training using data stored in training dataset 326. Alternatively, another model training application on analytic creation device 300 or another computing device of a distributed computing system 328 may use data stored in training dataset 326 to define source code 324. As still another alternative, a user may manually define source code 324.

Training dataset 326 may include, for example, a plurality of rows and a plurality of columns. The plurality of rows may be referred to as observation vectors or records (observations), and the columns may be referred to as variables. Training dataset 326 may be transposed. The plurality of variables may include a response variable y and a plurality of explanatory variables that define an explanatory vector x for each observation. In other applications, the plurality of variables may not include the response variable y. An observation vector is defined as $y_i$, $x_i$ or $x_i$ that may include a value for each of the plurality of variables associated with the observation i. Each variable of the plurality of variables may describe a characteristic of a physical object. For example, if training dataset 326 includes data related to operation of a vehicle, the variables may include an oil pressure, a speed, a gear indicator, a gas tank level, a tire pressure for each tire, an engine temperature, a radiator level, etc. Training dataset 326 may include data captured as a function of time for one or more physical objects.

The data stored in training dataset 326 may be generated by and/or captured from a variety of sources including one or more sensors, such as sensor 311, of the same or different type, one or more computing devices, through second keyboard 312, second microphone 313, second mouse 314, etc. The data stored in training dataset 326 may be received directly or indirectly from the source and may or may not be pre-processed in some manner. For example, the data may be pre-processed using an event stream processing (ESP) device. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 326 may be stored on second computer-readable medium 308 or on one or more computer-readable media of distributed computing system 328 and accessed by analytic creation device 300 using second communication interface 306, second input interface 302, and/or second output interface 304. Data stored in training dataset 326 may be sensor measurements or signal values captured by sensor 311, may be generated or captured in response to occurrence of an event or a transaction, generated by a device such as in response to an interaction by a user with the device, etc. The data stored in training dataset 326 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 326 may be captured at different time points periodically, intermittently, when an event occurs, etc. One or more columns of training dataset 326 may include a time and/or date value.

Training dataset 326 may include data captured under normal or abnormal operating conditions of the physical object. Training dataset 326 may include data captured at a high data rate such as 200 or more observations per second for one or more physical objects. For example, data stored in training dataset 326 may be generated as part of the Internet of Things (IoT), where things (e.g., machines, devices, phones, sensors) can be connected to networks and the data from these things collected and processed within the things and/or external to the things before being stored in training dataset 326. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESP device executing an ESP engine (ESPE), which may reside in the cloud or in an edge device before being stored in training dataset 326.

Training dataset 326 may be stored using various data structures as known to those skilled in the art including one or more files of a file system, a relational database, one or more tables of a system of tables, a structured query language database, etc. on analytic creation device 300 or on distributed computing system 328. Analytic creation device 300 may coordinate access to training dataset 326 that is distributed across distributed computing system 328 that may include one or more computing devices. For example, training dataset 326 may be stored in a cube distributed across a grid of computers as understood by a person of skill in the art. As another example, training dataset 326 may be stored in a multi-node Hadoop® cluster. For instance, Apache™ Hadoop® is an open-source software framework for distributed computing supported by the Apache Software Foundation. As another example, training dataset 326 may be stored in a cloud of computers and accessed using cloud computing technologies, as understood by a person of skill in the art. The SAS® LASR™ Analytic Server may be used as an analytic platform to enable multiple users to concurrently access data stored in training dataset 326. The SAS® Viya™ open, cloud-ready, in-memory architecture also may be used as an analytic platform to enable multiple users to concurrently access data stored in training dataset 326. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

The source code stored in source code 324 may be received from another analytic tool. For example, the source code may be received from an instantiation of SAS® Decision Manager. As another example, the source code may be an astore generated as a result of execution of a SAVESTATE statement from an instantiation of SAS® Visual Data Mining and Machine Learning. For further illustration, the source code may be defined and received from analysis of training dataset 326 by a statistical analysis tool such as SAS® Enterprise Miner™, SAS/STAT®, SAS® High Performance Analytics Server, SAS® Visual Data Mining and Machine Learning, SAS® LASR™, etc. The statistical analysis tool may define the model to predict, to classify, to make decisions, to identify patterns, etc. based on new data that may be received from any source of data. Source code 324 may be stored on second computer-readable medium 308 and/or received from distributed computing system 328 using second communication interface 306 and/or second input interface 302.

Referring again to FIG. 1, the one or more computing devices of analytic execution system 106 may include computers of any form factor such as a smart phone 120, a desktop 122, a server computer 124, a laptop 126, a personal digital assistant, an integrated messaging device, a tablet computer, etc. Analytic execution system 106 can include any number and any combination of form factors of computing devices. The computing devices of analytic execution system 106 send and receive signals through network 108 to/from analytic service device 104 and/or to/from distributed computing system 328 and/or to/from another computing device of analytic execution system 106. The one or more computing devices of analytic execution system 106 may be geographically dispersed from each other and/or co-located. The one or more computing devices of analytic execution system 106 may communicate using various transmission media that may be wired and/or wireless as understood by those skilled in the art.

Figure 4:
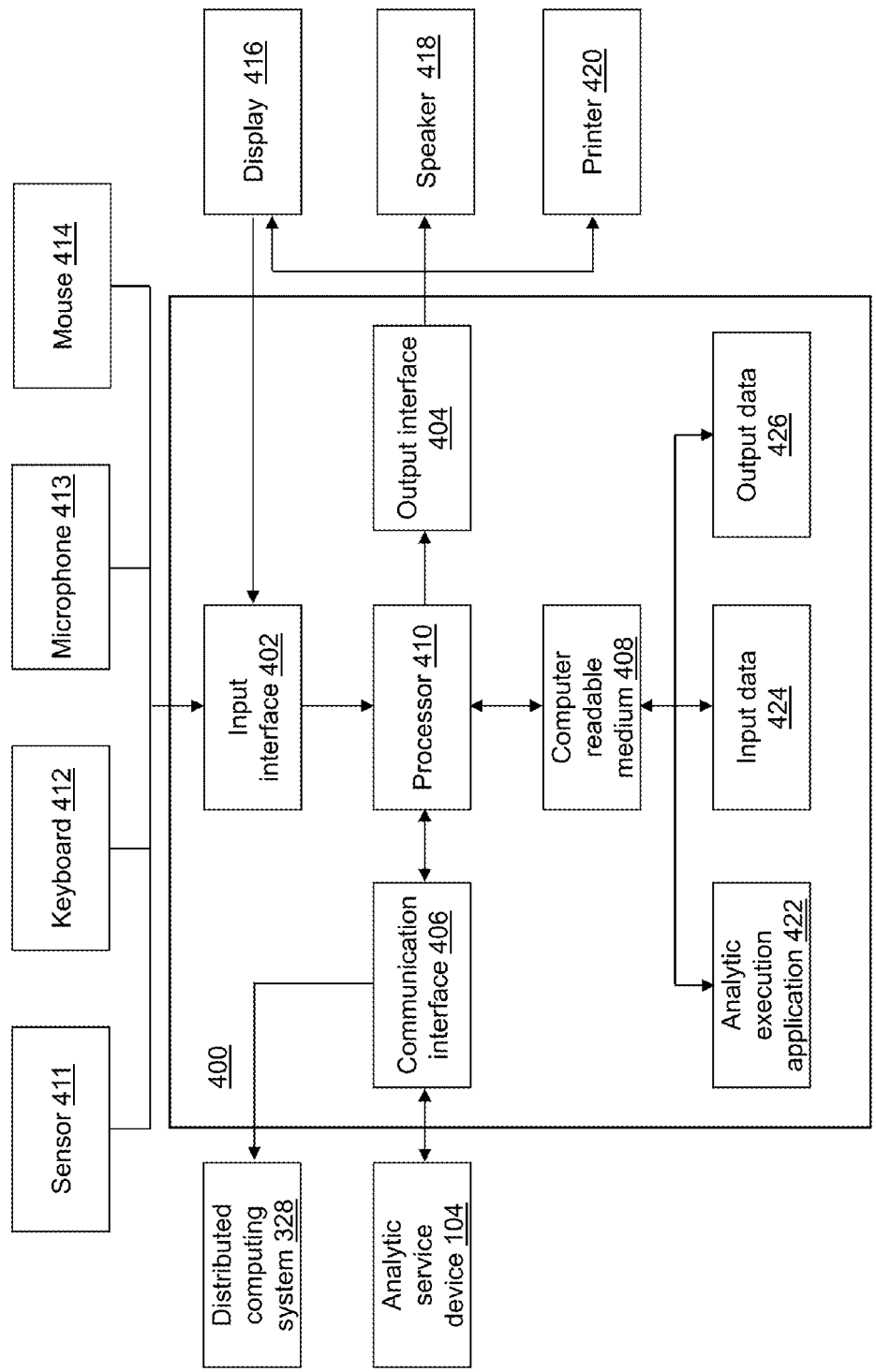
FIG. 4 depicts a block diagram of an analytic execution device in accordance with an illustrative embodiment.

For illustration, referring to FIG. 4, a block diagram of an analytic execution device 400 is shown in accordance with an example embodiment. Analytic execution device 400 is an example computing device of analytic execution system 106. For example, each of smart phone 120, a desktop 122, a server computer 124, a laptop 126 may be an instance of analytic execution device 400. Analytic execution device 400 may include a third input interface 402, a third output interface 404, a third communication interface 406, a third computer-readable medium 408, a third processor 410, an analytic execution application 422, input data 424, and output data 426. Each computing device of analytic execution system 106 may be executing analytic execution application 422 of the same or different type. Fewer, different, and/or additional components may be incorporated into analytic execution device 400. Analytic creation device 300 and analytic execution device 400 may be the same or different devices.

Third input interface 402 provides the same or similar functionality as that described with reference to input interface 202 of analytic service device 104 though referring to analytic execution device 400. Third output interface 404 provides the same or similar functionality as that described with reference to output interface 204 of analytic service device 104 though referring to analytic execution device 400. Second communication interface 406 provides the same or similar functionality as that described with reference to communication interface 206 of analytic service device 104 though referring to analytic execution device 400. Data and messages may be transferred between analytic service device 104 and analytic execution device 400 and/or other computing devices of distributed computing system 328 using third communication interface 406. Third computer-readable medium 408 provides the same or similar functionality as that described with reference to computer-readable medium 208 of analytic service device 104 though referring to analytic execution device 400. Third processor 410 provides the same or similar functionality as that described with reference to processor 210 of analytic service device 104 though referring to analytic execution device 400.

Analytic execution application 422 performs operations associated with requesting execution of one or more source code blocks stored in analytic data 224. Input data 424 may be provided as an input for execution of a source code block compiled and stored in analytic data 224 by analytic service device 104. Output data 426 may be received as a result of execution of analytic data 224 by analytic service device 104. Some or all of the operations described herein may be embodied in analytic execution application 422. The operations may be implemented using hardware, firmware, software, or any combination of these methods.

Referring to the example embodiment of FIG. 4, analytic execution application 422 is implemented in software (comprised of computer-readable and/or computer-executable instructions) stored in third computer-readable medium 408 and accessible by third processor 410 for execution of the instructions that embody the operations of analytic execution application 422. Analytic execution application 422 may be written using one or more programming languages, assembly languages, scripting languages, etc. Analytic execution application 422 may be integrated with other analytic tools. For example, analytic execution application 422 may be implemented using or integrated with one or more SAS software tools such as Base SAS, SAS® Enterprise Miner™, SAS Factory Miner, SAS® Model Manager, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Event Stream Processing Engine (ESPE), SAS® Decision Manager, SAS® Forecast Server, all of which are developed and provided by SAS Institute Inc. of Cary, N.C., USA. Analytic creation application 322 and analytic execution application 422 further may be integrated applications.

Analytic execution application 422 may be implemented as a Web application. Analytic execution application 422 may be integrated with other system processing tools to automatically process data generated as part of operation of an enterprise using third input interface 402, third output interface 404, and/or third communication interface 406 so that appropriate action can be initiated in response. For example, a warning or an alert may be presented using a third display 416, a third speaker 418, a third printer 420, etc. or sent to one or more computer-readable media, display, speaker, printer, etc. of distributed computing system 328 based on predicted values for a response variable generated based on execution of a model (source code block) compiled and stored in analytic data 224.

Input data 424 may be generated, stored, and accessed using the same or different mechanisms as training dataset 326. Similar to training dataset 326, input data 424 may include a plurality of rows and a plurality of columns with the plurality of rows referred to as observations or records, and the columns referred to as variables that are associated with an observation. Input data 424 may be transposed.

Similar to training dataset 326, input data 424 may be stored on third computer-readable medium 408 or on one or more computer-readable media of distributed computing system 328 and accessed by analytic execution device 400 using third communication interface 406. Data stored in input data 424 may be a sensor measurement or a data communication value, for example, from a second sensor 411, may be generated or captured in response to occurrence of an event or a transaction, generated by a device such as in response to an interaction by a user with the device, for example, from a third keyboard 412, a third microphone 413, or a third mouse 414, etc. The data stored in input data 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input data 424 may be captured at different time points periodically, intermittently, when an event occurs, etc. One or more columns may include a time value. Similar to training dataset 326, data stored in input data 424 may be generated as part of the IoT, and some or all data may be pre- or post-processed by an ESPE.

Similar to training dataset 326, input data 424 may be stored in various compressed formats such as a coordinate format, a compressed sparse column format, a compressed sparse row format, etc. Input data 424 further may be stored using various structures as known to those skilled in the art including a file system, a relational database, a system of tables, a structured query language database, etc. on analytic execution device 400, on analytic creation device 300, and/or on distributed computing system 328. Analytic execution device 400 and/or distributed computing system 328 may coordinate access to input data 424 that is distributed across a plurality of computing devices. For example, input data 424 may be stored in a cube distributed across a grid of computers as understood by a person of skill in the art. As another example, input data 424 may be stored in a multi-node Hadoop® cluster. As another example, input data 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input data 424.

For example, input data 424 may receive data generated by second sensor 411 as a function of time. Second sensor 411 may measure a physical quantity in an environment to which second sensor 411 is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

The data stored in input data 424 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input data 424 may include data captured at a high data rate such as 200 or more observations per second for one or more physical objects. For example, data stored in input data 424 may be generated as part of the IoT. Some data of input data 424 may be processed with an ESPE, which may reside in the cloud or in an edge device before being stored in input data 424. For example, analytic execution application 322 may be executed using the ESPE.

Figure 5:
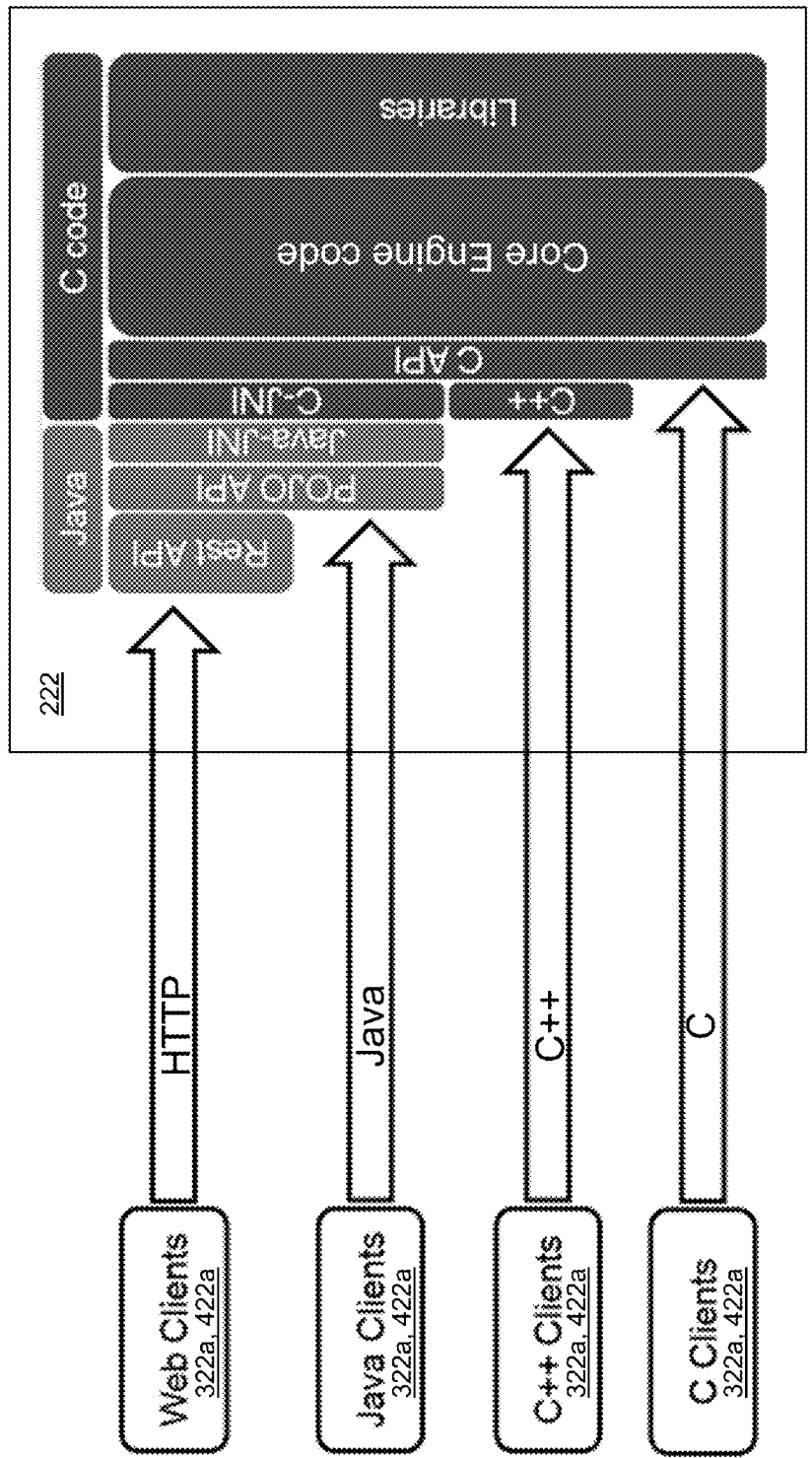
FIG. 5 depicts a block diagram of an analytic client and analytic execution infrastructure in accordance with an illustrative embodiment.

Referring to FIG. 5, analytic service application 222 may have a layered architecture that is suitable for a variety of deployment topologies. Analytic service application 222 may include a REST application programming interface (API) layer, a Java plain old Java object (POJO) API (POJO API) layer, and a Java-Java native interface (Java-JNI) layer written in the Java programming language. Analytic service application 222 further may include a C++ layer, a C-JNI layer, a C API layer, a core engine code layer, and libraries written in the C programming language for high performance.

Web clients may implement an analytic creation application 322a or an analytic execution application 422a. Java clients may implement an analytic creation application 322b or an analytic execution application 422b. C++ clients may implement an analytic creation application 322c or an analytic execution application 422c. C clients may implement an analytic creation application 322d or an analytic execution application 422d. Each type of analytic creation application 322 interfaces with analytic service application 222. Java clients can integrate with the POJO API layer. The POJO API layer may communicate with the C core engine code layer in-process through the Java-JNI layer that is optimized. Web clients may interface with the REST API layer that provides persistence and clustering for scalability and high availability.

For example, analytic creation application 322 may be implemented using the SAS® Enterprise Decision Manager that generates DS2 programs that implement user-created rule sets and rule flows. SAS® Enterprise Decision Manager can combine analytics, such as score code generated by SAS® Enterprise Miner, with business rules to form decision logic. Analytic service application 222 is used to compile and execute the generated score code provided as an input.

All three interfaces, the REST API layer, POJO API layer, and C API layer are functionally similar. However, the REST API layer handles certain functionality automatically, such as initialization and user context management. By contrast, the POJO API layer and C API layer provide methods to control these elements directly.

The Java-JNI layer is positioned between the REST API layer and the C API layer. Dependencies between the three interface layers may be strictly one-way such that the C API does not depend on the REST API layer, the POJO API layer, or the Java-JNI layer. C clients can omit the Java layers altogether. The POJO API layer communicates with the core engine code layer strictly through the C API layer, but does not depend on the REST API layer. Similarly, the REST API layer communicates with the core engine code layer strictly through the POJO API layer and the Java-JNI layer.

Analytic service application 222 may be deployed as a web application executing on one or more Web application servers implemented using Base SAS. The REST API layer provides an interface for web client applications to compile and execute source code 324 into steps (method, subroutines, functions) that provide near real-time analytic capabilities. A step is a set of instructions designed to perform a predefined operation within a program. The REST API layer supports the execution of DS2 source code and provides the ability to run SAS Enterprise Miner score code (possibly converted from a SAS DATA step to DS2) as well as user-written functions.

For illustration, the REST API layer may provide the following POST methods: 1) a create revision method that publishes source code 324 in memory with a request body that contains DS2 source code as an input, 2) a validate revision method that validates the request body of input values required by the DS2 source code and returns validation results, and 3) an execute revision step method that validates and executes the published source code 324 with a request body of input values required by the DS2 source code. As described further below, the source code 324 is published and stored in analytic data 224. The REST API layer further may provide an update revision context PUT method that publishes updated source code 324 in memory with a request body containing the DS2 source code as input. The REST API layer further may provide a delete revision DELETE method that removes source code 324 from memory. The REST API layer may provide the following GET methods: 1) an individual revision query method that returns detailed information about a revision, 2) a revision steps query method that returns a list of steps available in the published source code 324, 3) an individual revision step query method that returns detailed information about the inputs required by the step and the outputs produced by the step, 4) a retrieve revision details query method that returns information such as the name of the published source code 324, the revision number, and a list of compiled steps of the published source code 324. The REST API layer may support JSON resource representations. A "step" is any of a method of the DS2 package, a subroutine of a C program, or a function of a Python script.

The POJO API layer supports the same functionality as the C API. The POJO API layer allows tightly coupled Java client applications to interact with analytic service application 222 directly through Java method calls by not hiding detailed functionality. In contrast, the REST API layer, in the interest of simplicity, handles many interactions automatically.

The POJO API layer enables client-supplied DS2, Python, C, and ASTORE analytic source code programs to be published to analytic service application 222, where they are compiled into modules and made available for repeated execution by storing in analytic data 224. The POJO API layer also includes methods for querying information about currently loaded content, such as user contexts, modules, revisions, step signatures (input and output parameters) as discussed further below.

Figure 6:
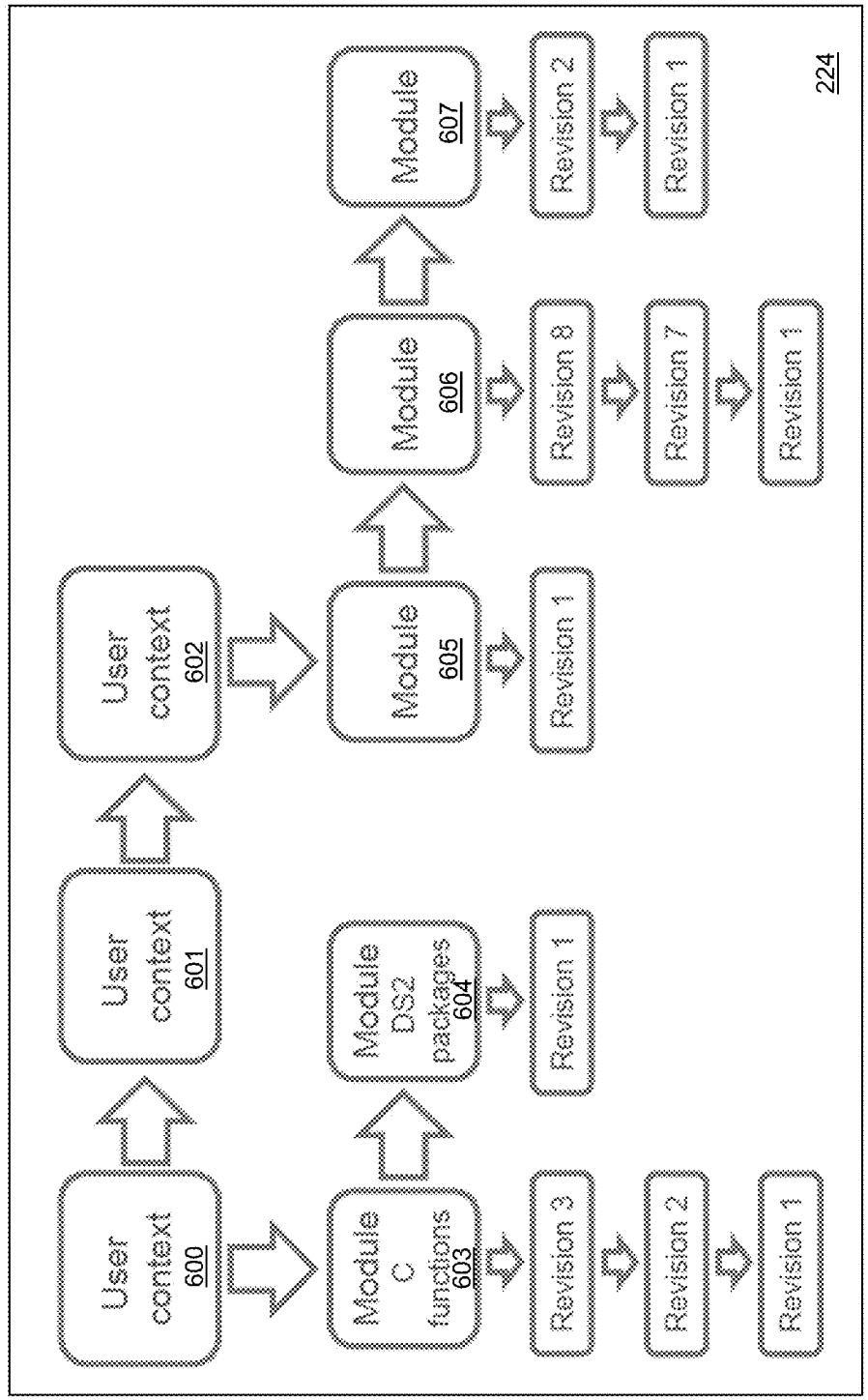
FIG. 6 depicts a block diagram of an analytic storage infrastructure in accordance with an illustrative embodiment.

Referring to FIG. 6, analytic data 224 is a container for source code 324 that analytic service application 222 receives, compiles, and executes as requested by analytic creation application 322 and/or analytic execution application 422. Analytic data 224 includes one or more user contexts. Each user context is a container of and includes one or more module contexts. Each module context is a container of and includes one or more revisions of source code 324. Each user context defines an isolated execution environment. That is, source code 324 executing in a first user context 600 is not visible to any other context such as a second user context 601 or a third user context 602.

Source code 324 received and stored by analytic service application 222 is referred to as a module context. Each module context represents a single analytic source code program though multiple revisions may be created and are each associated with the same module context. In the case of DS2, each module context represents a single DS2 package, and a name of each module context is the same as a name of the DS2 package that it represents. A module context is a collection of related steps (a DS2 package, a C program, a Python script) associated with the single analytic source code program. For example, a C functions module context 603 and a DS2 packages module context 604 are associated with first user context 600. A first module context 605, a second module context 606, and a third module context 607 are associated with third user context 602.

A module context such as C functions module context 603 is a container of one or more revisions. For example, C functions module context 603 includes a revision 1, a revision 2, and a revision 3. The module context also includes any compiler warning or error messages generated from a most recent revision compilation or compilation attempt as discussed further below. DS2 packages module context 604 includes a revision 1. First module context 605 includes a revision 1. Second module context 606 includes a revision 1, a revision 7, and a revision 8. At some point in time, second module context 466 included revisions 2 through 6 that were deleted because the revision number is a monotonically increasing integer value starting with one for the initial revision for a module context. Third module context 607 includes a revision 1 and a revision 2.

Each revision is a version of a module context and is at a leaf level of an object hierarchy. Each revision contains a version of source code 324 associated with that program, an optimized binary executable, and metadata. The metadata describes the steps, step signatures (input and output by data type), and entry points of the source code program defined in source code 324. Revisions provide the ability to roll back to a previous version of the source code program defined in source code 324. Additionally, when the Java or C API layers are used, revisions allow two or more versions of source code 324 to execute concurrently, which may be useful, for example, in champion and challenger testing of predictive models. Unless specified otherwise, step, method, function, and subroutine are used interchangeably. Unless specified otherwise, script, package, and program are used interchangeably also where source code 324 is a program made up of one or more steps, methods, functions, or subroutines.

Analytic service application 222 can host and execute multiple revisions of source code 324 concurrently, which are stored in analytic data 224. Analytic service application 222 assigns a revision number to each revision of source code 324 when it is created. A revision is uniquely identified by a module context identifier (ID) and a revision number. Each revision is uniquely numbered for the associated module context. Specifying revision number zero indicates a request to select a most recent revision.

Figure 7A:
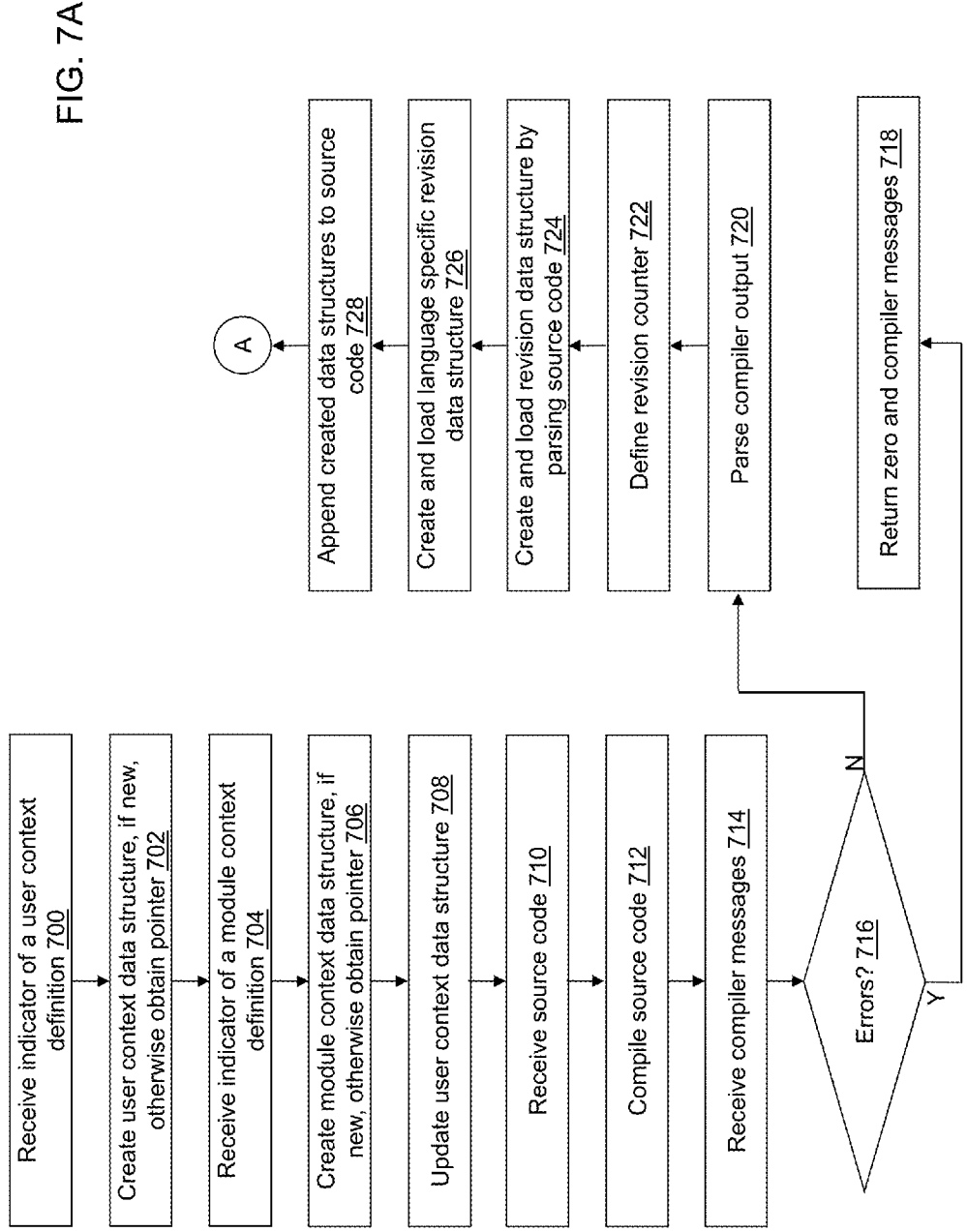
FIGS. 7A-7B depict flow diagrams illustrating examples of operations performed by the analytic service device of FIG. 2 in creating an analytic revision in accordance with an illustrative embodiment.
Figure 7B:
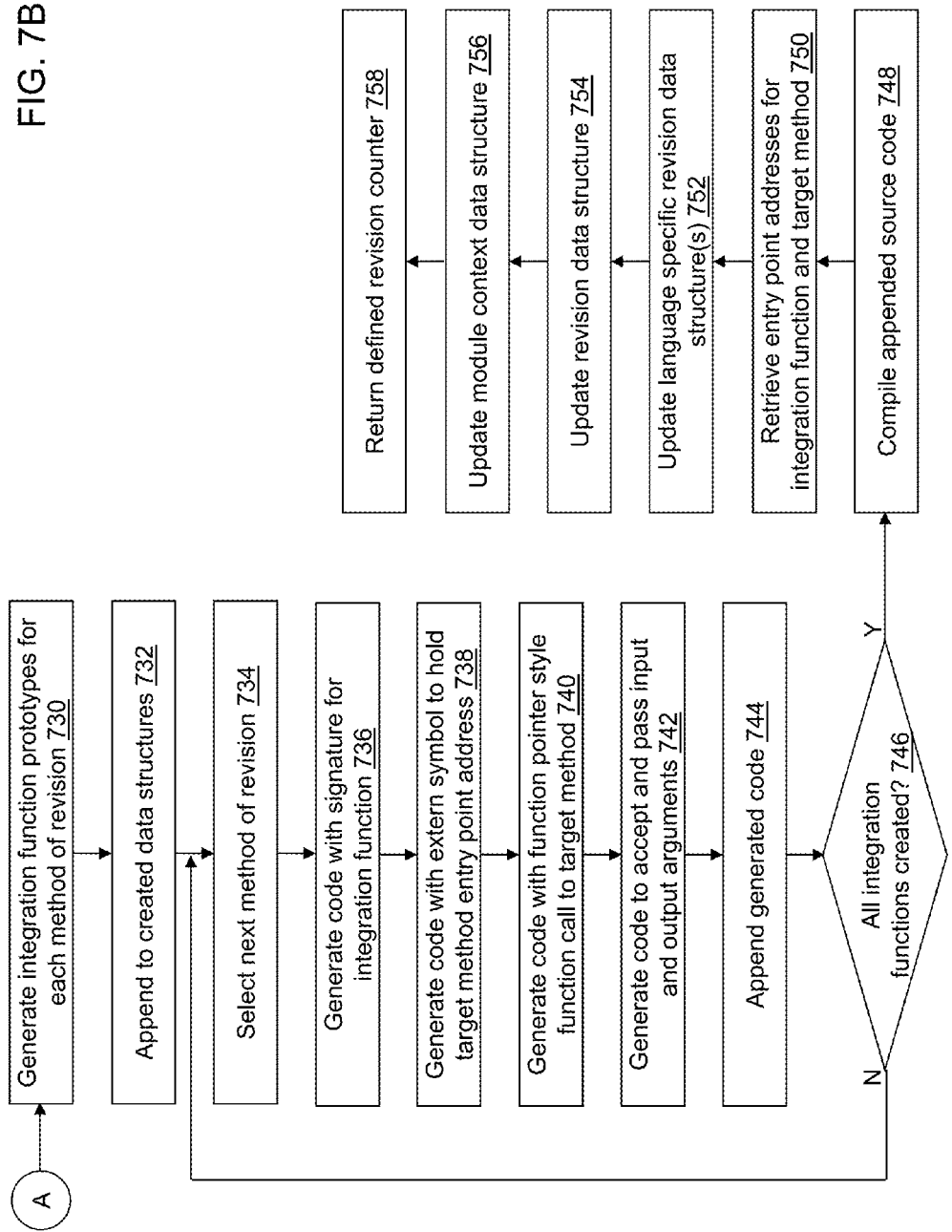

Referring to FIGS. 7A-7B, example operations associated with analytic service application 222 are described. Additional, fewer, or different operations may be performed depending on the embodiment of analytic service application 222. The order of presentation of the operations of FIGS. 7A-7B is not intended to be limiting. Some of the operations may not be performed in some embodiments. Although some of the operational flows are presented in sequence, the various operations may be performed in various repetitions, concurrently (in parallel, for example, using threads and/or distributed computing system 328), and/or in other orders than those that are illustrated. For example, the operations of each of FIGS. 7A-7B may be executing in parallel using a plurality of threads and/or a plurality of computing devices of distributed computing system 328. Analytic service application 222 may be instantiated with a number of threads as specified on a command line that triggers instantiation of analytic service application 222 by analytic creation application 322. An order of execution of the described operations may be based on analytic creation application 322, for example, based on a user interaction with analytic creation application 322, which triggers processing by analytic service application 222.

In an operation 700, a first indicator of a user context definition is received from analytic creation application 322. For illustration, the first indicator may include a name of a new or a previously created user context. The name may be a name of a user or a business function.

In an operation 702, a user context data structure is created based on the received user context definition if the user context definition identifies a new user context. Creation of the user context results in defining a value for a pointer to the created user context data structure. The user context specified by the first indicator may have been created already such that a pointer to a previously created user context data structure is identified by looping through a list of user contexts and selecting a pointer to the user context data structure having a matching name. When creation of or identification of the user context data structure fails, the value for the pointer to the created user context may be set to −1.

For illustration, the following user context data structure is created if it does not already exist:

```
typedef struct SF_USER_CONTEXT {
    TKUUID                  id;
    TKUUIDString            idStr;
    double                  creationDT;
    double                  lastModifiedDT;
    char                    *name;
    int32_t                 numModules;
    struct SF_MODULE_CONTEXT *modules;
    struct SF_MODULE_CONTEXT *astPrepMtx;
    struct SF_USER_CONTEXT  *nextContext;
    ...
};
```

The "id" parameter may be generated automatically to uniquely identify each user context data structure; whereas, the "idStr" parameter is a string representation of the associated unique user context identifier "id". The "name" parameter may be the name provided with the first indicator that is used to identify the user context by matching the name value. The "creationDT" parameter indicates a date and a time the user context was created and may be generated automatically when the user context data structure is created based on a current date and time. The "lastModifiedDT" parameter indicates a date and a time the user context was last modified and may be generated automatically when the user context data structure is modified to create a new module context, a new revision, etc. based on the current date and time. The "numModules" parameter indicates a number of modules associated with the user context and may be generated and updated automatically as new module contexts are created and associated with the user context. The "modules" parameter may be generated and updated automatically to point to a first module context in a list of module contexts (module context data structures) created and associated with the user context. Of course, the "modules" parameter may be NULL until a module context is created for the user context. The "astPrepMtx" parameter may be generated and updated automatically to point to a first module context in a list of ASTORE module contexts used to load ASTORE models for DS2 usage. The "nextContext" parameter may be generated and updated automatically to point to a next user context in a list of user contexts. Of course, a value of "nextContext" may be NULL if there is not a next user context. A global control block (GCB) may store top level entities and data structures such as a pointer to a first user context of the user context list, a worker thread pool, one or more loggers, one or more library handles, various flags, other properties, etc. for analytic service application 222.

The value of the pointer to the created user context may be returned to analytic creation application 322 to indicate a success or a failure of the user context creation/identification and/or may be stored locally and used automatically for subsequent operations. For example, the value of the user context pointer that is returned to analytic creation application 322 may be included when information is received in subsequent operations from analytic creation application 322 or the last value of the user context pointer may be used automatically.

In an operation 704, a second indicator of a module context definition is received from analytic creation application 322. For illustration, the second indicator may include a name of a new or a previously created module context associated with the user context indicated in operation 700. The name may be a reference to source code 324 for the module. For example, the name may indicate what type of model is defined by and what type of prediction is performed by source code 324 such as NN_ImageType to indicate that source code 324 predicts a type of image using a neural network model type In an operation 706, a module context data structure is created based on the received module context definition if the module context definition identifies a new module context. Creation of the module context results in defining a value for a pointer to the created module context. The module context specified by the second indicator may have been created already such that a pointer to a previously created module context data structure is identified by looping through the linked list maintained by the "modules" parameter of the user context data structure pointed to by the user context pointer and selecting a pointer to the module context data structure having a matching name. When creation/identification of the module context fails, the value for the pointer to the created module context may be set to −1.

For example, the following module context data structure is created if it does not already exist:

```
typedef struct MODULE_CONTEXT {
    UUID                    id;
    UUIDString              idStr;
    double                  creationDT;
    double                  lastModifiedDT;
    char                    *name;
    moduleType              type;
    unsigned char           isInternal;
    int32_t                 numRevisions;
    int32_t                 highestRevision;
    struct REVISION         *revisions;
    char*                   diagRecs[MAX_MESSAGES];
    int32_t                 recCount;
    struct MODULE_CONTEXT   *nextContext;
    struct USER_CONTEXT     *owner;
    ...
};
```

The "id" parameter may be generated automatically to uniquely identify each module context data structure; whereas, the "idStr" parameter is a string representation of the associated unique module context identifier "id". The "name" parameter may be the name provided with the second indicator that is used to identify the module context. The "creationDT" parameter indicates a date and a time the module context was created and may be generated automatically when the module context data structure is created based on the current date and time. The "lastModifiedDT" parameter indicates a date and a time the module context was last modified and may be generated automatically when the module context data structure is modified to create a new revision based on the current date and time. The "type" parameter is an integer that indicates a language such as C, DS2, Python, ASTORE, etc. in which source code 324 associated with the module context is written or stored. The "numRevisions" parameter may be generated and updated automatically as new revisions are created and associated with the module context. The "highestRevision" parameter may be generated and updated automatically as new revisions are created and associated with the module context and identifies a most recently created revision.

The "revisions" parameter may be generated and updated automatically to point to the most recently created revision of a list of revisions (revision data structures) created and associated with the module context. The "revisions" parameter holds a pointer that is a head of a linked list of revisions associated with the module context in reverse creation order such that the end of the linked list is the first created revision of the module context that has not been deleted. The "diagRecs" parameter may be generated and updated automatically to include compilation messages generated when the most recently created revision was compiled. The "recCount" parameter may be generated and updated automatically to indicate a number of compilation messages included in the "diagRecs" parameter. The "MAX_MESSAGES" parameter may have a predefined value that defines a maximum number of compilation message that can be stored. The "nextContext" parameter may be generated and updated automatically to point to a next module context in a list of module contexts associated with the user context. Of course, a value of "nextContext" may be NULL if there is not a next module context when the current module context is the most recently created in association with the user context. The "owner" parameter may be generated and updated automatically to point to the associated user context that "owns" the module context.

The value of the pointer to the created module context may be returned to analytic creation application 322 to indicate a success or a failure of the module context creation and/or may be stored locally and used automatically for subsequent operations. For example, the value of the module context pointer that is returned to analytic creation application 322 may be included when information is received in subsequent operations from analytic creation application 322 or the last value of the module context pointer may be used automatically.

In an operation 708, the user context data structure is updated. For example, the "lastModifiedDT" parameter is updated to the current date and time, and the "numModules" parameter is incremented if the module context is new. The created module context is stored in association with the created user context. For example, the pointer to the created module context may be added to the linked list maintained by the "modules" parameter if the second indicator indicated a new module context.

In an operation 710, a source code block of source code 324 is received from analytic creation application 322. The source code block may include a DS package that include one or more methods, one or more C programs that may each include one or more subroutines, one or more Python scripts that may each include one or more functions. The DS2 package may read and execute a SAS ASTORE model. One or more entry points may be received with the source code block where each entry point is a name of a method, a subroutine, or a python function that can be executed separately.

The SAS ASTORE Procedure creates the analytic store. Regardless of whether an astore is to be published for direct execution or for execution within a DS2 package, all astore models are persisted as files on disk. A data manager handles the exchange of data, and sometimes metadata, between an astore model and the application that embeds it. A data manager is required for each astore integration, and the data manager implementation is generally specific to the particular embedding application (such as a type of analytic creation application 322). In the case of DS2, the DS2 package named "score" implements a data manager that allows DS2 methods to exchange data with astore models at runtime. This data manager maps variables from the DS2 program data vector to and from astore model inputs and outputs, and, when calling the model, the data manager translates the appropriate DS2 data types to and from the astore data types.

When an astore model is published to analytic creation application 322 as an astore module, analytic creation application 322 may use the data manager implemented by extension "tkdmcmpa" developed and provided by SAS Institute Inc. of Cary, N.C., USA. In addition to data marshaling, the tkdmcmpa API provides access to an astore model's metadata, allowing analytic service application 222 to build a language-independent metadata dictionary that describes the astore model's input and output arguments and types. The metadata dictionary enables analytic service application 222 to provide a language-independent interface to the astore module, which is consistent with the other module types (e.g., DS2, C, Python). Unlike other data managers, the tkdmcmpa data manager implements a system of callbacks that enable analytic service application 222 to optimize data marshaling for transaction processing. When an astore module is published, analytic service application 222 registers four callback functions with the data manager: "allocate buffer," "free buffer," "fill input," and "process output." During astore model initialization, the data manager calls an "allocate buffer" function and instructs it to allocate memory for one input buffer and for one output buffer, where the number of bytes it specifies to allocate for each buffer is derived from an aggregate size of the published model's input and output arguments. Astore models support fixed length byte strings and doubles as arguments, which allows the buffers to be defined as byte arrays. When the astore model's score function is executed by analytic execution application 422, the data manager compiled within the associated analytic data 224 calls the "fill input" callback function to efficiently transfer data from a method argument list as discussed further below to the astore model's input buffer. When the astore has completed execution of the score function, the output buffer is populated with the results, and the data manager compiled within the associated analytic data 224 calls a "process output" callback function to marshal the results from the output buffer to the output arguments list, which is returned to analytic execution application 422.

In an operation 712, the source code block received from analytic creation application 322 is compiled using an appropriate compiler such as a DS2 compiler or a C compiler. When the source code block is written in the DS2 programming language, a DS2 compiler first translates the DS2 source code block into C source code. The C source code is submitted to a code generation subsystem that compiles the C source code into an executable binary image.

When the source code block is written in the C programming language, the submitted C source code is supplemented with declarations that provide convenience features, such as access to memory pools with various lifetimes (transaction lifetime vs. model lifetime vs. application-controlled lifetime), and the supplemented code is submitted to the code generation subsystem that compiles the C code into an executable binary image.

When the source code block is written in the Python programming language, the Python C-API provides Python module compilation functions to pre-compile Python modules for more efficient execution. As a simple example, the source code may have the form:

Method A( . . . ) {
. . .
}
Method B( . . . ) {
. . .
}
Method C( . . . ) {
. . .
}
. . .

In an operation 714, compiler messages are received that indicate whether or not the compilation was successful. When the DS2 language is used and the received compiler messages indicate there were compiler errors, the errors may be trapped and the corrupted module automatically recompiled in operation 712 as a failover measure. The error trapping and automatic recompilation may be repeated until a predefined maximum number of recompilations has been reached.

In an operation 716, a determination is made concerning whether or not the source code compiled without any errors. When the source code compiled without any errors, processing continues in an operation 720. When the source code compiled with an error, processing continues in an operation 718.

In operation 718, a revision value of zero and the received compiler messages are returned to analytic creation application 322 to indicate that creation of the revision was unsuccessful, and processing of the revision stops. Subsequent processing may result in performance of various operations of operation 700, operation 704, or operation 710 based on subsequent actions by the user of analytic creation application 322.

In operation 720, the received compiler messages are parsed and stored in the "diagRecs" parameter of the module context data structure pointed to by the module context pointer and the value of the "recCount" parameter is defined based on a number of the parsed compiler messages.

In an operation 722, a revision number is defined for the revision. If this is the first revision, the revision number is initialized as one. Otherwise, a value of the "highestRevision" parameter for the module context is selected and is incremented to define the revision number for the source code block received in operation 710.

In an operation 724, a revision data structure is created based on the received source code block. Values for parameters of the created revision data structure are defined by parsing the received source code to identify various structures included in the source code such as the language, methods/functions/subroutines (steps) that associated with an entry point, input and output arguments to each step, etc. Each entry point signature is parsed where entry points are to a method of a DS2 package, one or more Python functions of a Python script, or one or more C subroutines of a C program.

Creation of the revision results in defining a value for a pointer to the created revision. When creation of the revision fails, the value for the pointer to the created revision may be set to −1. The value of the pointer to the created revision may be returned to analytic creation application 322 to indicate a failure of the revision creation.

For example, the following revision data structure may be created for each revision:

```
typedef struct REVISION {
        int32_t                 revNumber;
        double                  creationDT;
        char                    *description;
        int32_t                 recompileCount;
        char                    *sourceCode;
        CSh                     codestream;
        struct DICTIONARY       dictionary;
        struct REVISION         *nextRevision;
        struct MODULE_CONTEXT   *owner;
};
```

The revision data structure defines a language independent representation for the source code. The "revNumber" parameter indicates the revision number of source code 324 received in operation 710. The "creationDT" parameter indicates a date and a time the revision was created and may be generated automatically when the revision data structure is created based on the current date and time. The "description" parameter may be generated as a pointer to a character string that holds a description of the revision provided with the received source code or received separately, but in association with the source code. The "sourceCode" parameter may be generated to point to a character string that holds the received source code. The "codestream" parameter is a handle to the compiled binary executable code created from the received source code for the revision as described further below. The "codestream" parameter stores a pointer to an integration function created and compiled as described further below to "wrap" the received source code. The "dictionary" parameter holds metadata that describes the revision's methods and method arguments and which may be queried by analytic creation application 322. The "nextRevision" parameter may be generated and updated automatically to point to a next revision in the list of revisions associated with the module context. Again, the linked list of revisions may be stored in reverse creation order. Of course, a value of "nextRevision" may be NULL when there is not a next revision. The "owner" parameter may be generated and updated automatically to point to the associated module context that "owns" the revision.

Certain runtime environments, such as the DS2 runtime environment, corrupt their code stream or execution context information when fatal errors occur. Where possible, analytic service application 222 traps such errors and automatically recompiles the corrupted module as a failover measure as discussed previously. The "recompileCount" parameter maintains a strike count that limits the number of recompilations to a predefined maximum number.

A dictionary data structure below may be created to capture the metadata items below for each revision that can be queried by a user of analytic creation application 322 to understand details regarding how to use source code 324 associated with the revision:

```
typedef struct DICTIONARY {
        int32_t              language;
        char                 *name;
        int32_t              revisionNumber;
        int32_t              numMethods;
        struct DICT_METHOD   *methods;
};
```

The "language" parameter indicates a language of the revision that "owns" the "dictionary" parameter that may be a numeric value that indicates the C language, the DS2 language, the Python language, an ASTORE, etc. and that may be determined by parsing the received source code or as the value of the "type" parameter of the "owner" parameter of the associated module context that "owns" the revision. The "name" parameter may be determined by parsing the received source code to identify a name for the revision. For example, the first called step of the source code may be selected to define a value of the "name" parameter. The "revisionNumber" parameter indicates the revision number of the revision that "owns" the "dictionary" parameter. The "numMethods" parameter indicates a number of methods/subroutines/functions included in the revision that "owns" the "dictionary" parameter. A value for the "numMethods" parameter may be determined by parsing the received source code. When an ASTORE is published, a value for the "numMethods" parameter may be equal to one.

The "methods" parameter holds metadata associated with each method of the revision. For example, a dictionary method data structure below may be created to capture the metadata items below for each method:

```
typedef struct DICT_METHOD {
        char                 *name;
        int32_t              numInputs;
        int32_t              numOutputs;
        struct SF_DICT_ARG   *arguments;
};
```

The "name" parameter may be a name of the method determined by parsing each method of the received source code. The "num Inputs" parameter defines a number of input arguments to the method that may be determined by parsing each method of the received source code. The "numOutputs" parameter defines a number of output arguments resulting from execution of the method that may be determined by parsing each method of the received source code.

The "arguments" parameter holds metadata associated with each argument. For example, a dictionary argument data structure below may be created to capture the metadata items below for each input and output argument of the method:

```
typedef struct SF_DICT_ARG {
        char            *name;
        SFOid           type;
        form_t          form;
        unsigned char   isInput;
        unsigned char   isRequired;
        uint32_t        fixedArraySize;
};
```

The "name" parameter may be a name of the argument determined by parsing each argument of the associated method. The "type" parameter defines a data type of the argument that may be determined by parsing each argument of the associated method. For example, the "type" parameter may be a data type enumeration value that indicates "int", "long", "double", "string", "pointer", etc. The "form" parameter defines a scalar or array enumeration value of the argument that may be determined by parsing each argument of the associated method. The "isInput" parameter defines whether the argument is an input argument or an output argument determined by parsing the associated method to determine how the argument is used. For example, an input versus an output argument may be determined based on whether or not the argument is on a right side or a left side of an equal sign in the method. A non-zero value for the "isInput" parameter may indicate that the argument is an input argument; whereas, a zero value for the "isInput" parameter may indicate that the argument is an output argument. The "isRequired" parameter defines whether a value for the argument is required to be defined at runtime. A value for the "isRequired" parameter may be determined by parsing the associated method to determine how the argument is used. The "fixedArraySize" parameter defines a length for DS2 arrays.

In an operation 726, a language specific revision data structure is created and loaded based on the parsed source code when the received source code is compiled. For illustration, a DS2 language specific revision data structure defines a DS2 language-specific representation of a revision that is created based on the "type" parameter of the "owner" parameter of the associated module context that "owns" the revision. For example, a DS2 language specific revision data structure below may be created to hold the language specific data structure:

```
typedef struct DS2REVISION {
        struct REVISION   i;
        int32_t           numThreads;
        struct DS2PACK    *packList;
};
```

The "i" parameter holds the revision data structure created and loaded in operation 714 and updated in operation 724. The "numThreads" parameter indicates a number of entries in the "packList" parameter, which is also a number of threads that are executing the revision. Each compilation produces a separate DS2PACK structure in an array pointed to by a value of the "packList" parameter. The "packList" pointer is used for DS2 because DS2 is not thread safe. As a result, each DS2 package is compiled per thread in the thread pool and separate code streams are maintained for each.

A DS2 package data structure defines the entries of the "packList" parameter. For example, a DS2 package data structure below may be created to hold each compiled DS2 package:

```
typedef struct DS2PACK {
    char                    *packname;
    struct DS2C             *ds2ch;
    struct DS2C_PACKAGE_INFO *ds2cpack;
    int32_t                 nummeths;
    struct DS2METH          *meths;
    struct DS2_EXEC         *ds2gcb;
    . . .
};
```

The "packname" parameter may be a name of the DS2 package determined by parsing the received source code and may be different from the module name included in the received source code. The "nummeths" parameter indicates a number of methods included in the DS2 package and is equal to the "numMethods" parameter included in the revision that "owns" the DS2 revision data structure and that was determined by parsing the received source code. The "meths" parameter indicates a pointer to a first DS2 method of the methods included in the DS2 package. The "ds2ch" parameter is a pointer to a DS2 compiler instance stored in computer-readable medium 208 for the associated thread. During a first compilation on worker thread zero, the data structures are created. On each subsequent per-thread compilation, a struct DS2PACK with an index equal to a current thread number is populated. The "ds2cpack" parameter points to metadata generated by the DS2 compiler for the DS2 package. The "ds2gcb" parameter points to a DS2 execution context that contains information needed by the compiled DS2 code at runtime.

A DS2 method data structure defines the entries of the "meths" parameter. For example, a DS2 method data structure below may be created to hold each DS2 method:

```
typedef struct DS2METH {
    struct ENTRYPT          i;
    char                    *methname;
    StrSize                 methnamelen;
    struct DS2PACK          *container;
    NarrowString            *prototype;
    void                    (*entry)(struct DS2_EXEC *);
    Char                    clientfn[80];
    struct DS2C_METHOD_INFO *ds2meth;
    int32_t                 numargs;
    struct ARG_METADATA     *args;
};
```

The "i" parameter holds the entry point to an integration function that wraps the DS2 method. The "methname" parameter holds a name of the DS2 method that may be determined by parsing the received DS2 method. The "methnamelen" parameter holds a number of characters in the name of the DS2 method. The "container" parameter holds a pointer to the DS2 package data structure that owns the DS2 method. The "prototype" parameter holds a prototype of the integration function. The "(*entry)(struct DS2_EXEC *)" parameter holds a pointer to the entry point of the DS2 method and has the generic pointer type "void *" and an argument that is a pointer to a DS2_EXEC data structure. The "clientfn" parameter holds the generated integration function name. The "ds2meth" parameter holds compiler generated metadata. The "numargs" parameter indicates a number of input and output arguments of the DS2 method. The "args" parameter holds a pointer to metadata associated with each argument.

Similar to the dictionary argument data structure SF_DICT_ARG above, the DS2 argument data structure below may be created to capture the metadata items below for each input and output argument of the DS2 method:

```
typedef struct ARG_METADATA {
    char            *name;
    Oid             type;
    form_t          form;
    unsigned char   isInput;
    unsigned char   isRequired;
    uint32_t        dim;
};
```

The "name" parameter may be a name of the argument determined by parsing the received DS2 method. The "type" parameter defines a data type of the argument that may be determined by parsing the received DS2 method. The "form" parameter defines a scalar or array enumeration value of the argument that may be determined by parsing the received DS2 method. The "isInput" parameter defines whether the argument is an input argument or an output argument. The "isRequired" parameter defines whether a value for the argument is required to be defined at runtime. The "dim" parameter defines a length of the array if the argument is an array.

For illustration, a C language specific revision data structure below may be created to hold the language specific data structure for a C program:

```
typedef struct CREVISION {
    struct REVISION     i;
    int32_t             numRoutines;
    struct CENTRYPT     routinesStatic[SF_MAX_ENTRYPTS];
    struct CENTRYPT     *routines;
};
```

Only one set of metadata and one executable is required (no array) because C is thread safe. The "i" parameter again holds the created revision data structure created and loaded in operation 714 and updated in operation 724 that is the language independent revision data structure. The "numRoutines" parameter indicates a number of subroutines included in the C source code and is equal to the "numMethods" parameter included in the revision that "owns" the C revision data structure and that was determined by parsing the received source code. The "routinesStatic" parameter contains an array, where each array item is associated with a CENTRYPT data structure of a single C subroutine of the parsed C source code. The predefined "SF_MAX_ENTRYPTS" value may be a user configurable maximum number of C subroutines that can be included in the received source code. The "routines" parameter indicates a pointer to a CENTRYPT data structure of a first C subroutine of the subroutines included in the received source code.

A step is invoked by dereferencing the step's entry point address. Each entry point address is a location of a first instruction of the step within the executable code stream of the revision. For example, if the variable "fp" points to the first instruction of the step "score" within a code stream, the "score" function can be called by dereferencing the function pointer using (*fp)(list of parameters . . . ). Each member of the "routinesStatic" parameter array contains the entry point address of a step. Use of both "routines" and "routinesStatic" is for optimization. That is, if the published revision contains less than SF_ MAX_ENTRYPTS number of steps, all of the entry_ points fit within the "routinesStatic" parameter array and no memory allocation is necessary. If more than SF_MAS_ENTRYPTS steps are included in the revision, memory is allocated for an array to hold these entry points and the address of the array is saved as the value of the "routines" parameter.

A C subroutine data structure defines the entries of the "routinesStatic" and the "routines" parameters. For example, a C subroutine data structure below may be created to hold each C subroutine of the subroutines included in the received source code:

```
typedef struct CENTRYPT {
    struct ENTRYPT      i;
    char                clientfn[80];
    char                *fnName;
    void                (*entry)( );
} CENTRYPT;
```

The "i" parameter holds the entry point to an integration function that wraps the C subroutine. The "clientfn" parameter holds a name of the integration function generated to wrap the C subroutine. The "fnName" parameter holds a pointer to the generated integration function name. The "(*entry)( )" parameter holds a pointer to the entry point of the C subroutine.

Each integration function is declared and an entry point data structure is defined that may include the parameters below defined for the integration function that is generated to wrap each C subroutine, each Python function, or each DS2 method:
typedef void (*Entrypoint)(struct MODULE_CONTEXT *moduleContext, void *args);
    typedef struct ENTRYPT {
    Entrypoint entry;
};
The "Entrypoint" type is used for calling the integration functions generated in operations 734 thru 744 discussed further below. The integration functions marshal input and output arguments between the language-independent parameter list (the "args" parameter in the Entrypoint call) and the language specific parameters of the corresponding received source code.

Illustrative code is shown below:
void Call_crunch1_THREAD01(struct SF_MODULE_CONTEXT *moduleCtx,
    struct SF_SYMTBL_S *args) {
    extern void(*crunch1_THREAD0)( );
    (*crunch1_THREAD0)
        (sfSymbolTableGetDS2ExecutionContext(args),
        sfSymbolTableGetInt(args,   0)→val,   &(sfSymbolTableGetInt(args, 0)→ind),
        sfSymbolTableGetInt(args,   1)→val,   &(sfSymbolTableGetInt(args, 1)→ind),
        sfSymbolTableGetInt(args,   2)→val,   &(sfSymbolTableGetInt(args, 2)→ind),
        &(sfSymbolTableGetInt(args,   3)→val),   &(sfSymbolTableGetInt(args, 3)→
        ind), &(sfSymbolTableGetInt(args, 4)→val), &(sfSymbolTableGetInt(args, 4)→ind));}
void _crunch1(struct TKEDSC_EXEC *_gcb, TKTSINTEGER arg1, int8_t*
    _indparm1, TKTSINTEGER arg2, int8_t* _indparm2, TKTSINTEGER
    multiplier, int8_t* _indparm3, TKTSINTEGER *out1, int8_t* _indparm4,
    TKTSINTEGER *out2, int8_t* _indparm5) { . . . }

"Call_crunch1_THREAD01" is the name of the integration function stored in the "clientfn" parameter for the DS2 package or the "fnName" parameter for a C subroutine. The extern symbol is populated with the appropriate entry point. Because externs are in a global namespace, method names are generated in such a way as to avoid name collisions between per-thread compilations. The first function "(*crunch1_THREAD0)" translates the input and output data between the integration function "Call_crunch1_THREAD01" that is executed when selected by the user of analytic execution application 422 and the target function as discussed further below. The second function "_crunch1" is the target function included in the received source code block. Analytic service application 222 may append different code (data structures) to find revisions and steps based on the language indicated by the "type" parameter of the module context data structure.

In an operation 728, the created language independent revision data structure declarations and the language dependent revision data structure declarations are appended to the received source code along with additional structure, symbol, and function prototype declarations. For illustration, for a code stream hosting a module written in DS2, the following also may be appended to the received source code:
struct DOUBLE
{
int8_t ind;
char pad1[7];
double val;
};
struct DOUBLE_ARR
{
int8_t *ind;
void *val;
int32_t num;
char pad20[4];
};
struct INT
{
int8_t ind;
char pad1[3];
int val;
};
struct INT_ARR
{
int8_t *ind;
void *val;
int32_t num;
char pad20[4];
};
struct BIGINT
{
int8_t ind;
char pad1[7];
int64_t val;
};
struct BIGINT_ARR
{
int8_t *ind;

```
void *val;
int32_t num;
char pad20[4];
};
struct BOOL
{
int8_t ind;
unsigned char val;
};
struct BOOL_ARR
{
int8_t *ind;
void *val;
int num;
char pad20[4];
};
Sym_h_symCreate(struct GCB* gcb, struct MODULE_CONTEXT*
    moduleContext, int32_t revision, char* entryPoint,
        int32_t threadNdx);
    void symDestroy(Sym_h pTbl);
    int32_t symGetInt(const Sym_h pTbl, int32_t ndx,
int32_t* pOutData);
    int32_t symSetInt(Sym_h pTbl, int32_t ndx, int32_t
value);
    struct INT* symDS2GetInt(Sym_h pTbl, int32_t ndx);
    int32_t symGetIntArray(const Sym_h pTbl, int32_t ndx,
int32_t** pOutData,
        int32_t* pOutArraySize);
    int32_t symSetIntArray(Sym_h pTbl, int32_t ndx, int32_t
*value, int32_t size);
    struct INT_ARR*symDS2GetIntArray(const Sym_h
pTbl, int32_t ndx);
    int32_t symGetBigInt(const Sym_h pTbl, int32_t ndx,
int64_t* pOutData);
    int32_t symSetBigInt(Sym_h pTbl, int32_t ndx, int64_t
value);
    struct BIGINT*symDS2GetBigInt(Sym_h pTbl, int32_t
ndx);
    int32_t symGetBigIntArray(const Sym_h pTbl, int32_t
ndx, int64_t** pOutData,
        int32_t* pOutArraySize);
    int32_t symSetBigIntArray(Sym_h pTbl, int32_t ndx,
int64_t *value, int32_t
        size);
    struct BIGINT_ARR*symDS2GetBigIntArray(const
Sym_h pTbl, int32_t ndx);
    int32_t symGetDouble(const Sym_h pTbl, int32_t ndx,
double* pOutData);
    int32_t symSetDouble(Sym_h pTbl, int32_t ndx, double
value);
    struct DOUBLE* symDS2GetDouble(Sym_h pTbl,
int32_t ndx);
    int32_t symGetDoubleArray(const Sym_h pTbl, int32_t
ndx, double**
        pOutData, int32_t* pOutArraySize);
    int32_t symSetDoubleArray(Sym_h pTbl, int32_t ndx,
struct DOUBLE_ARR*);
    struct DOUBLE_ARR* symDS2GetDoubleArray(const
Sym_h pTbl, int32_t
        ndx);
    int32_t symGetBool(const Sym_h pTbl, int32_t ndx,
unsigned char* val);
    int32_t symSetBool(Sym_h pTbl, int32_t ndx, unsigned
char value);
    struct BOOL* symDS2GetBool(Sym_h pTbl, int32_t
ndx);
    int32_t symGetBoolArray(const Sym_h pTbl, int32_t
ndx, unsigned char**
        pOutData, int32_t* pOutArraySize);
    int32_t symSetBoolArray(Sym_h pTbl, int32_t ndx,
unsigned char *value,
        int32_t size);
    struct BOOL_ARR*symDS2GetBoolArray(const Sym_h
pTbl, int32_t ndx);
    int32_t symGetString(const Sym_h pTbl, int32_t ndx,
char** pOutData);
    int32_t symSetString(Sym_h pTbl, int32_t ndx, const
char* value);
    struct_DS2String* symDS2GetString(const Sym_h pTbl,
int32_t ndx);
    int32_t symGetStringArray(const Sym_h pTbl, int ndx,
char*** pOutValue,
        int32_t* pOutSize);
    int32_t symSetStringArray(Sym_h pTbl, int ndx, char**
pData, int32_t size);
    struct  DS2STRING_ARR*  symDS2GetStringArray
(Sym_h pTbl, int32_t ndx);
    int32_t symGetDatetime(const Sym_h pTbl, int32_t ndx,
int64_t*
        pMilliseconds, const char** pTimeZoneID);
    int32_t symSetDatetime(Sym_h pTbl, int32_t ndx,
int64_t milliseconds, const
        char* szTimeZoneID);
    int32_t symGetDatetimeArray(const Sym_h pTbl, int32_t
ndx, int64_t**
        pMillisecondValues, const char*** pTimeZoneIDValues,
            int32_t* pSize);
    int32_t symSetDatetimeArray(Sym_h pTbl, int32_t ndx,
int64_t*
        millisecondValues, const char** timeZoneIDValues,
            int32_t size);
    struct DS2C* symGetDS2Compiler(Sym_h pTbl);
    struct DS2C_EXEC* symGetDS2ExecutionContext
(Sym_h pTbl);
    unsigned char symIsMissing(const Sym_h pTbl, int32_t
ndx);
    void symSetMissing(Sym_h pTbl, int32_t ndx);
    int32_t symGetArraySize(const Sym_h pTbl, int32_t
ndx);
    int32_t symGetInputCount(const Sym_h pTbl);
```

Structure alignment agrees with the corresponding structures that also exist outside of a code stream. However, those structure members that are referenced within the code stream are declared explicitly as evidenced by the padding elements above. The structures above support the language independent execution interface because they define a generic, language-independent form for the input and output argument data. A standard set of declarations may be defined for each language based on data types supported by that language. The generated wrapper functions translate the generic, language-independent form into the language-specific forms used by the target function. These definitions may also provide access to SAS threaded kernel services required by DS2 such as analytic functions, memory management, threading, I/O, etc.

Referring to FIG. 7B, in an operation 730, a prototype for each integration function is generated having the form below as shown above for the integration function "Call_crunch1_THREAD01":

```
typedef void (*Entrypoint)(struct THREAD_ENV *te,
Sym_h args);
```

Within each integration function, a uniquely named extern symbol ("extern void(*A)( )") is generated to house the entry point address of the target method or function that it wraps as shown in the example above ("extern void (*crunch1_THREAD0)( )"). Because extern symbols are global, DS2 is compiled per thread, and multiple revisions of a module may exist concurrently, the name "A" of each extern symbol used to house a target method address must be unique. The unique names may be generated by concatenating the target method name with the incremented revision number, and appending "_THREAD" and an index number of the current thread for DS2 methods as in defining "Call_crunch1_THREAD01" and "crunch1_THREAD0". For C subroutines and Python functions, the unique name "A" similarly may be generated by concatenating the target method name with the incremented revision number. The name for the prototype for each integration function may be formed by appending "A" to "Call_".

The "te" argument points to thread context information, which holds information necessary for interrupt handling and other thread-specific functionality. The "args" argument is used to pass in the language-independent parameter list defined by analytic execution application 422, also referred to as a "symbol table". For example, the integration function prototypes may have the form:
Call_A(*te_1, args_1);
Call_B(*te_2, args_2);
Call_C(*te_3, args_3);
where the "_1" represents the thread context information for the first method, subroutine, or function, "_2" represents the thread context information for the second method, subroutine, or function, "_3" represents the thread context information for the third method, subroutine, or function, etc. In the example above, the following code is generated: "Call_crunch1_THREAD01(*te_1, args_1);" for each step included in the received source code.

In an operation 732, the generated integration function prototypes are appended to the data structure declarations.

In an operation 734, a next method, subroutine, or function is selected from the received source code. For example, on a first iteration of operation 734, the first method, subroutine, or function is selected from the language-specific revision data structure and/or language independent revision data structure. On a next iteration, the next method, subroutine, or function is selected from the linked list associated with, for example, the "routines" parameter or the "packList" parameter of language specific data structures.

In an operation 736, code having the form "void Call_A (*te_1, args_1)" is generated with a signature for the integration function that will wrap the language specific method, subroutine, or function is defined. In the example above, the following code is generated:
void Call_crunch1_THREAD01(struct SF_MODULE_CONTEXT *moduleCtx, struct SF_SYMTBL_S *args)

In an operation 738, code is generated with an extern symbol that will hold the target method entry point address entry defined in the language specific data structure having the form "extern void (*A)( );". In the example above, the following code is generated: "extern void (*crunch1_THREAD0)( );". The target method is to the language specific method, subroutine, or function. The entry point addresses are assigned after compilation of the appended source code in an operation 748 below.

In an operation 740, code is generated with a function pointer style function call to the target method entry point address entry defined in the language specific data structure having the form "(*A)( );". When analytic execution application 422 executes a method of a published revision, the associated integration function is called, which in turn calls the target method through the code "(*A)( );". In the example above, the following code is generated
"(*crunch1_THREAD0) (sfSymbolTableGetDS2ExecutionContext(args)".

In an operation 742, code is generated to receive and pass input and output parameter arguments from the integration function to the target method that is added to the function pointer style function call "( . . . )". Each of the input and output arguments for the step are listed with an index to the appropriate value in the symbol table passed through the "SF_SYMTBL_S *args" parameter of the integration function. In the example above, the following code results after adding the input and output parameter arguments to the function pointer style function call:
(*crunch1_THREAD0)
(sfSymbolTableGetDS2ExecutionContext(args),
   sfSymbolTableGetInt(args, 0)→val, &(sfSymbolTableGetInt(args, 0)→ind),
   sfSymbolTableGetInt(args, 1)→val, &(sfSymbolTableGetInt(args, 1)→ind),
   sfSymbolTableGetInt(args, 2)→val, &(sfSymbolTableGetInt(args, 2)→ind),
   &(sfSymbolTableGetInt(args, 3)→val), &(sfSymbolTableGetInt(args, 3)→ind),
   &(sfSymbolTableGetInt(args, 4)→val), &(sfSymbolTableGetInt(args, 4)→ind));
}

Input arguments may be passed by value and output arguments may be passed by reference. Each numeric DS2 method argument has two arguments in the target C function. The first of each argument pair holds the data value ("val"), and the second contains a missing value indicator ("ind"). For each target method argument, the integration function extracts the appropriate value of the appropriate type from the language-independent parameter list ("args"), and inserts it into the argument list of the target method at runtime. For pass-by-reference arguments, the locations where the target method should store the output values are passed to the target method. For example, "sfSymbolTableGetInt(args, 3)" is an output argument.

To summarize, the generated integration function has the form:
void Call_A(*te_1, args_1)
{
extern void (*A)( );
(*A)( . . . )
}

For illustration, in the following example, a SAS DS2 package named "truck" has been received as source code by analytic service application 222 from analytic creation application 322. The truck package contains a method named "score," which accepts truck onboard sensor data as input and predicts the probability of component failures as an output. A fragment of the DS2 source code is listed below:
package truck/overwrite=yes;
method score(double Ambient_air_temp, double Engine_Load, double
Engine_RPM, double Intake_Air_Temp, double Speed_OBD, double
Throttle_Pos_Manifold, double Vibration, in_out double
EM_PREDICTION, in_out double EM_SEGMENT, in_out double
P_failure, in_out double V_failure, in_out double_NODE_, in_out
char(4)_WARN_);

<method body omitted>
end;
endpackage;

The DS2 compiler translates the DS2 source code into C code because the core engine code layer is written in C. Of course, other programming languages may be used for the core engine code layer. The "score" method above is translated into a function like the one below before being compiled into an in-memory binary code stream. This represents the target method that an integration function is automatically generated to wrap:

```
void_score1(struct DS2C_EXEC *_gcb,
  DOUBLE ambient_air_temp, int8_t* _indparm1,
  DOUBLE engine_load, int8_t* _indparm2,
  DOUBLE engine_rpm, int8_t* _indparm3,
  DOUBLE intake_air_temp, int8_t* _indparm4,
  DOUBLE speed_obd, int8_t* _indparm5,
  DOUBLE throttle_pos_manifold, int8_t* _indparm6,
  DOUBLE vibration, int8_t* _indparm7,
  DOUBLE *em_prediction, int8_t* _indparm8,
  DOUBLE *em_segment, int8_t* _indparm9,
  DOUBLE *p_failure, int8_t* _indparm10,
  DOUBLE *v_failure, int8_t* _indparm11,
  DOUBLE    *_node_,    int8_t*    _indparm12,
    DS2String * _warn_)
{
<function body omitted> . . .
}
```

The target method, "_score1", takes a DS2 execution context followed by a set of input and output values as arguments. For illustration, the generated integration function that wraps the "_score1" target method defined from the DS2 package above is provided below:

```
void Call_score0_THREAD0(struct THREAD_ENV *te,
Sym_h args) {
  extern void(*score0_THREAD0)( );
  (*score0_THREAD0)(symGetDS2ExecutionContext
    (args),
  symDS2GetDouble(args, 0)→val, &(symDS2GetDouble
    (args, 0)→ind),
  symDS2GetDouble(args, 1)→val, &(symDS2GetDouble
    (args, 1)→ind),
  symDS2GetDouble(args, 2)→val, &(symDS2GetDouble
    (args, 2)→ind),
  symDS2GetDouble(args, 3)→val, &(symDS2GetDouble
    (args, 3)→ind),
  symDS2GetDouble(args, 4)→val, &(symDS2GetDouble
    (args, 4)→ind),
  symDS2GetDouble(args, 5)→val, &(symDS2GetDouble
    (args, 5)→ind),
  symDS2GetDouble(args, 6)→val, &(symDS2GetDouble
    (args, 6)→ind),
  &(symDS2GetDouble(args,       7)→val),
    &(symDS2GetDouble(args, 7)→ind),
  &(symDS2GetDouble(args,       8)→val),
    &(symDS2GetDouble(args, 8)→ind),
  &(symDS2GetDouble(args,       9)→val),
    &(symDS2GetDouble(args, 9)→ind),
  &(symDS2GetDouble(args,       10)→val),
    &(symDS2GetDouble(args, 10)→ind),
  &(symDS2GetDouble(args,       11)→val),
    &(symDS2GetDouble(args, 11)→ind),
  symDS2GetString(args, 12));
}
```

Again, the symbol table function calls are emitted into argument list of the function pointer style function call (e.g., (*A)( . . . )) such that input data and missing indicators are passed for input arguments, and the addresses that define where the target method is to place the results are passed for output arguments. Because the symbol table index is zero-based, "args, 0" references the first argument. This populates the output arguments within the symbol table with the results, which are made available to the calling analytic execution application 422 via the language-independent interface. For example, the symGetDS2ExecutionContext (args) argument accepts the arguments from the language independent call to the integration function from analytic execution application 422 and uses those values to load each input value required by the target method using the correct data type (e.g., struct DOUBLE* symDS2GetDouble (Sym_h pTbl, int32_t ndx) converts the double value to the DOUBLE value).

In an operation 744, the generated code for the integration function is appended to the appended code in operation 732.

In an operation 746, a determination is made concerning whether or not an integration function has been created for all of the subroutines, methods, or functions of the received source code. When all of the integration functions have been created, processing continues in an operation 748. When all of the integration functions have not been created, processing continues in operation 734 to select the next subroutine, method, or function included in the received source code, to create its integration function, and to append it to the code.

In operation 748, the source code appended with the integration functions is compiled using the programming language for the core engine code layer, which in the illustrative embodiment is written in C. As a result, the appended source code is C code compiled using a C compiler. The compiled, appended source code creates the executable code stream. For illustration, a SAS code generation subsystem, TKG, developed and provided by SAS Institute Inc. of Cary, N.C., USA, allows source code to be appended to the code of a previously compiled code stream, and provides a function, tkgGenerate( ), which recompiles the code stream, resulting in a new code stream with both target and integration functions included.

The source code is compiled in both operation 712 and operation 748 because the appended source code must exist within the same code stream as the received source code, which requires compiling the received source code with the appended source code as a unit. Additionally, during compilation of the received source code in operation 712, if the compilation fails, the code appending is skipped. Also, the compilation message preserves the original line numbers because the received source code has not been modified. In the case of DS2, the DS2 compiler generates metadata that is useful during code generation, which minimizes duplicate parsing.

In an operation 750, the entry point addresses are retrieved from the executable code stream. For DS2 and C modules, a call may be made to a code generation subsystem to retrieve the entry point address to each integration function and target function. For Python, the Python C-API may be used to look-up a compiled Python entry point by name.

In an operation 752, the created language specific data structures are updated with the retrieved entry point address for each target function and associated integration function. The entry point address to the integration function is stored in the "i" parameter of the entry point data structure such as CENTRYPT or DS2METH. The entry point address to the target function is stored in the "entry" parameter of the same entry point data structure allowing the associated integration function to call the appropriate target function at runtime using the *fp-style function calls (e.g., "extern void (*score0_THREAD0)( )"). Because a revision may contain multiple methods, subroutines, or functions, an entry point address is retrieved from the executable code stream and stored in the "i" parameter and the "entry" parameter of the entry point data structure created for each module method, subroutine, or function. The location of the entry point data structure is language specific.

In an operation 754, the created language independent revision data structure is updated so that a handle to the executable code stream created in operation 748 is stored in the "codestream" parameter of the REVISION data structure of the revision. The integration function(s) is/are compiled into the executable code stream with the received source code.

In an operation 756, the module context data structure is updated. For example, the "lastModifiedDT" parameter is updated to the current date and time, the "numRevisions" parameter is updated by incrementing the currently stored value of the "numRevisions" parameter, and the "highestRevision" parameter is set to the defined revision counter value. The created revision is stored in association with the created module context. For example, the pointer to the created revision may be added to the linked list maintained by the "revisions" parameter of the module context data structure so that, upon successful compilation, the newly created revision is a first revision in the revisions list of the module context. Therefore, when referencing a most recent revision by specifying zero for a revision number, the "revisions" parameter of the module context data structure is selected. Each received compiler message is stored in the "diagRecs" character array as a separate array item. The "recCount" parameter is defined as a number of the received compiler messages and also indicates a dimension of the "diagRecs" character array. The predefined "MAX_MESSAGES" parameter defines a maximum size of the "diagRecs" character array and limits a number of compiler messages that can be stored.

All of the defined data structures are stored in analytic data 224 as a linked list of user context data structures. Analytic data 224 may be stored in thread-specific storage. If target method execution must be interrupted later, such as if the target method contains an infinite loop or is blocked waiting for a database or web service to respond, this information may be used to lookup the worker thread executing the method so that execution can be halted, and the thread returned to the worker thread pool.

An entry representing the revision may also be added to a list that is manipulated only by atomic (uninterruptable) operations. This latter list may be used for looking up the revision, and by garbage collection, which eliminates exposure to race conditions such as attempts to delete a revision that is in use, chain corruption due to attempts to link two revisions to the same module context concurrently, etc.

In an operation 758, the value of the defined revision counter is returned to analytic creation application 322 to indicate a success of the revision creation.

Language independence is achieved through a combination of automated code generation, which implements a linkage between the language independent integration function and the language specific target method, and through generation of language independent, but method specific argument lists that provide a standard interface for analytic execution application 422 to use to set input values and to retrieve output values regardless of implementation language.

The process described referring to FIGS. 7A and 7B may be referred to as publishing source code to analytic service device 104 for repeated execution by processor 210 in computer-readable medium 208. The described operations may be integrated with a complex event processing (CEP) system, where the core engine runs in-process with the CEP system to process events in near real-time, or with a web application serving loosely coupled clients using the REST API layer. Analytic service device 104 can be clustered when deployed to a web application server.

Figure 8:
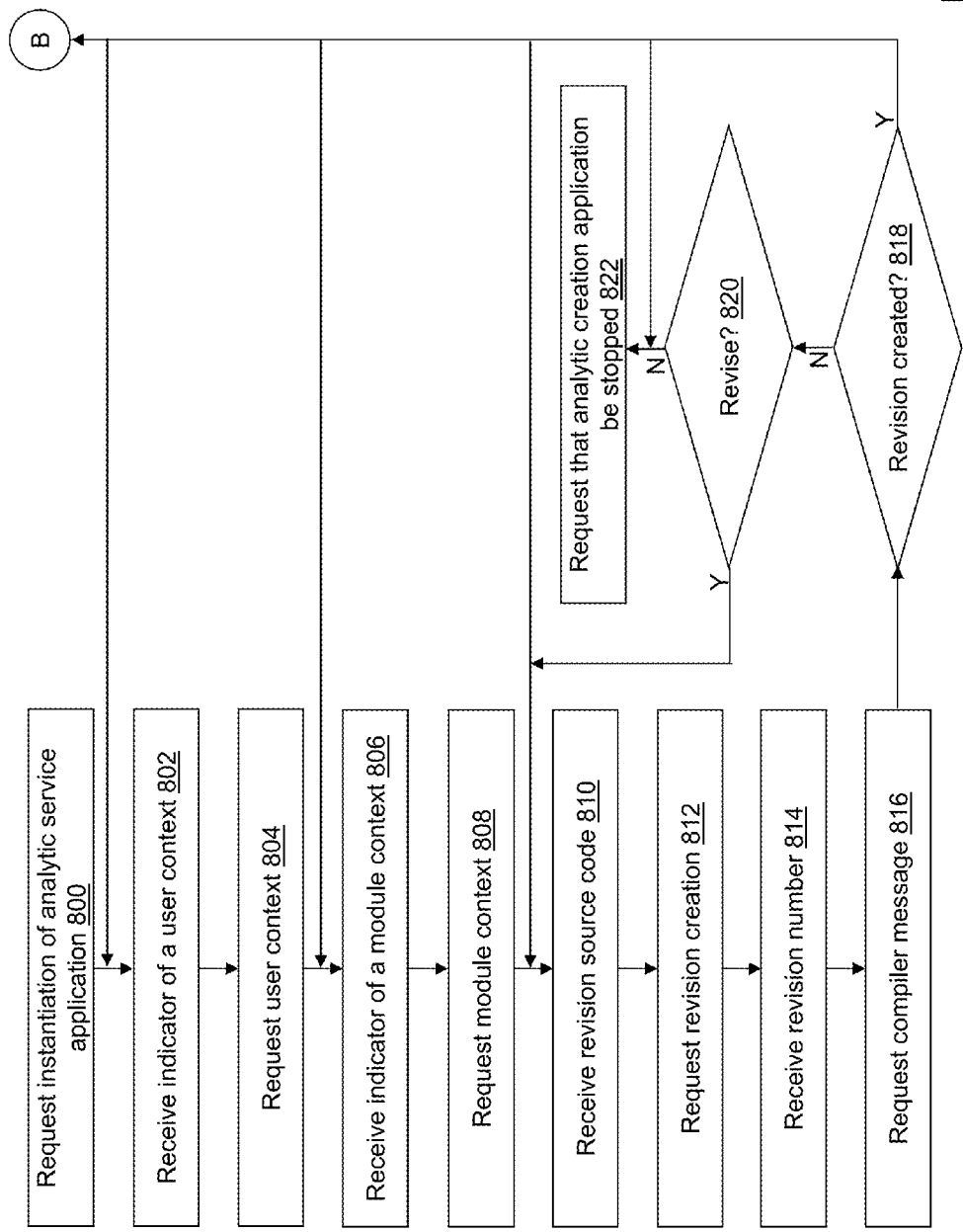
FIG. 8 depicts a flow diagram illustrating examples of operations performed by the analytic creation device of FIG. 3 in requesting creation of an analytic revision in accordance with an illustrative embodiment.

Referring to FIG. 8, example operations associated with analytic creation application 322 are described. Additional, fewer, or different operations may be performed depending on the embodiment of analytic creation application 322. The order of presentation of the operations of FIG. 8 is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute analytic creation application 322, which causes presentation of a first user interface window, which may include a plurality of menus and selectors such as drop down menus, buttons, text boxes, hyperlinks, etc. associated with analytic creation application 322 as understood by a person of skill in the art. The plurality of menus and selectors may be accessed in various orders. An indicator may indicate one or more user selections from a user interface, one or more data entries into a data field of the user interface, one or more data items read from second computer-readable medium 308 or otherwise defined with one or more default values, etc. that are received as an input by analytic creation application 322.

In an operation 800, a request to instantiate an instance of analytic service application 222 is sent to analytic service device 104 that may be analytic creation device 300 because analytic service application 222 and analytic creation application 322 may be executing in the same process space.

For example, when using the POJO API layer, instantiating a Java class, such as "tksfjni", triggers an instantiation (start) of analytic service application 222. When using the REST API layer, analytic service application 222 may be started automatically when a web application is started. For illustration, using the POJO API layer, the following code triggers an instantiation (start) of analytic service application 222 with a threaded kernel thread pool size equal to four:

int threads=4;
    String logconfigloc=null;
    TkLight tk=new tksfjni(threads, logconfigloc);

Analytic service application 222 uses worker threads in the threaded kernel thread pool to dispatch code compilation and execution tasks. For most applications, the input parameter "threads" may be defined to be approximately equal to a number of cores of analytic service device 104. A thread pool size equal to zero may result in analytic service application 222 setting the thread pool size equal to a total number of logical processors that are present on analytic service device 104. For example, an Intel® hyper-threaded processor may have two logical processors per core. When the thread pool size is set equal to zero for analytic service device 104 having one Intel quad-core hyper-threaded processor, the thread pool size is set to eight by analytic service device 104. The input parameter "logconfigloc", which is null in the example above, can be used to specify a location of a logging configuration file that controls logging of messages by analytic service application 222. A null value indicates no logging.

In an operation 802, a third indicator of a user context is received that indicates a user context that may be new. For example, the third indicator may be received by analytic creation application 322 after selection from a user interface window or after entry by a user into a user interface window.

In other embodiments, the user context may be received automatically as part of user login information. In an operation 804, a request to create a new user context or select an existing user context is sent to analytic service application 222. For example, the following code may be used to request creation of a new user context:

long userContext=tk.newUserContext (java.lang.String displayName);
    if (userContext==-1) {
    System.out.println("User context creation failed.");
    tk.term( );
    return;
    } where "displayName' is included in the third indicator in operation 802.

When the REST API layer is used, the creation of a context may be done automatically as part of startup processing. When the REST API layer is not used, the user context definition may be executed to trigger creation of the user context by analytic service application 222. The input parameter "displayName" is provided by the user and used as the user context name defined in the "name" parameter of the user context data structure. The input parameter "displayName" is passed to analytic service application 222 for use in log messages to reference the user context. Execution of the newUserContext command may return an opaque pointer to the created or the identified user context data structure that may be received from analytic service application 222. The pointer may be used to pass to methods that require a user context identifier. Alternatively, the input parameter "displayName" may be passed to analytic service application 222 to request selection of an existing user context, for example, using a different command such as userContextExists. Execution of the userContextExists command may return an opaque pointer to the selected existing user context or the identified user context data structure that may be received from analytic service application 222. A return value of −1 indicates a failure to create or to identify the user context by analytic service application 222.

Additional commands may include deleteUserContext, getUserContextDisplayName, getModuleIDs, getModuleNames, getUserContextCreationDateTime, and getUserContextLastModifiedDateTime. The deleteUserContext command deletes a specified user context. The getUserContextDisplayName command requests the name of a user context associated with a specified pointer value. The getModuleIDs command returns the module ID of each module context of the user context. For example, the module ID is an opaque pointer to the module context data structure created for each module context of the user context. The getUserContextCreationDateTime command returns the creation date and time for the user context. The getUserContextLastModifiedDateTime command returns the last modified date and time for the user context. The user may trigger execution of any of these commands to explore information related to the user context.

In an operation 806, a fourth indicator of a module context is received that indicates a module context that may be new. For example, the fourth indicator may be received by analytic creation application 322 after selection from a user interface window or after entry by a user into a user interface window.

In an operation 808, a request to create a new module context or select an existing module context is sent to analytic service application 222. For example, the following code may be used to request creation of a new module context:

long moduleContext=tk.newModuleContext(long userContext, TkLight.Language language, java.lang.String displayName,
        java.util.EnumSet<TkLight.ModuleOptions> options);
    if (moduleContext==-1) {
    System.out.println("Module context creation failed.");
    tk.term( );
    return;
    }

The input parameter "userContext" is the returned opaque pointer to the requested user context in operation 804. The input parameter "language" identifies the language in which the revisions are written such as DS2, C, Python, or ASTORE. The input parameter "displayName" is provided as the module name. The input parameter "options" include an indicator of whether or not the module context is private. Private modules may not be called by external clients, and may only be called internally by other modules. Module contexts may be public by default. Values for the "language", "displayName", and "options" parameters may be received with the fourth indicator.

The created new module context is owned by the created user context indicated by the input parameter "userContext". The revisions within a module context contain different source code, but the revisions represent the same named DS2 package, C program, Python script, or ASTORE. In addition to zero or more revisions, a module context maintains information such as a description of the module, a highest revision number, a number of revisions currently stored (revisions may be deleted), programming language (e.g., C, DS2, Python, ASTORE), one or more messages from a most recent compilation, a creation date and time, a last modified date and time, etc. as described above. Execution of the newModuleContext command may return an opaque pointer "moduleContext" to the module context created by analytic service application 222 and that is used to pass to methods that require the module context ID. A return value of −1 indicates a failure to create the module context by analytic service application 222.

Additional commands may include deleteModuleContext, moduleContextExists, getModuleContextDisplayName, getModuleContextByName, getModuleContextCreationDateTime, getModuleContextLastModifiedDateTime, and registerModuleName. The deleteModuleContext command deletes a specified module context. The moduleContextExists command returns an opaque pointer to the selected existing module context data structure. The getModuleContextDisplayName requests the name of a module context specified by a pointer to the module context data structure. The getModuleContextByName command requests the opaque pointer to a module context specified by the provided name. The getModuleContextCreationDateTime function returns the creation date and time for the module context. The getModuleContextLastModifiedDateTime function returns the last modified date and time for the module context. The function registerModuleName registers a module context name so that it can participate in calls across codestreams. The created module holds the one or more revisions to be created. The user may trigger execution of any of these commands to explore information related to the module context.

In an operation 810, a revision source code is received that indicates a new revision for the created or selected module context. For example, the revision source code may be received by analytic creation application 322 after selection from a user interface window or after entry by a user into a user interface window.

In an operation 812, a request to create a new revision is sent to analytic service application 222. For example, the following code may be used to request creation of a new revision:

String myCode="ds2_options sas;\n"+"package myPkg;\n"+
  "method myMth(int i, in_out int j);\n"+"j=i+5;\n"+
    "end;\n"+
  endpackage;\n";
int revNumber=tk.newRevision(long moduleContext, java.lang.String myCode, java.lang.String description, java.lang.String[ ] CEntryPoints);
if (revNumber >0) {
System.out.println("Revision"+revNumber+"created.");
}
else {
System.out.println("Revision not created.");
}

The input parameter "moduleContext" is the returned opaque pointer to the requested module context in operation 808. The input parameter "myCode" is the received source code in the language indicated by the language parameter when the module context was created. The input parameter "description" is provided to describe the revision. The input parameter "CEntryPoints" includes the name(s) of the entry points (methods, subroutines, or functions) to make available externally for execution by analytic execution application 422. The "CEntryPoints" and the "description" parameters may be provided with the source code and included with the request.

The source code may be read from source code 324 and passed to the newRevision command. When the source code is read from source code 324, newline characters may be included automatically. The escaped newline characters "\n" at the end of each line in the example above are not automatically included in a literal string. Including the escaped newline characters "\n" in a literal string is not required, but assists in identifying the code associated with compiler messages.

The module context ID and the assigned revision number can be passed to additional commands such as deleteRevision, getCompilationMessages, revisionIsValid, getStepIDs, getStepDescription, getStepInputs, getStepOutputs, getOverloadedStepCount, isOverloaded, and getRevisionCreationDateTime. The deleteRevision command deletes a specified revision. The getCompilationMessages command requests the compiler messages if not returned automatically. The revisionIsValid command returns an opaque pointer to the selected existing revision or the identified revision data structure. The getStepIDs command requests the step identifier (ID) of each step of the revision. For example, the step ID is a method name of a DS2 package, a subroutine name of a C program, or a function name of a Python script. The getStepDescription requests the description of a step specified by a pointer to the step. The getStepInputs requests a list of input arguments to a step specified by a pointer to the step. The getStepOutputs requests a list of output arguments to a step specified by a pointer to the step. The getOverloadedStepCount requests a number of overloaded DS2 methods of the revision. The isOverloaded requests whether or not a step specified by a pointer to the step is overloaded. The getRevisionCreationDateTime function returns the creation date and time for the revision. A step is associated with an entry point and they are used interchangeably herein. The user may trigger execution of any of these commands to explore information related to each revision.

In an operation 814, the revision number for the revision is received from analytic service application 222. For example, execution of the newRevision command may return a revision number "revNumber" of the revision assigned by analytic service application 222 that is used to identify the revision of the module context.

In an operation 816, compiler messages may be requested and received from analytic service application 222, for example, by executing the following command:
  String[ ] msgs=tk.getCompilationMessages(moduleContext);.

In an operation 818, a determination is made concerning whether or not the revision was created. When the revision was created, processing continues in various operations based on user interaction with analytic creation application 322. For example, processing may continue in an operation 822, operation 810 to create a new revision, operation 806 to create or select a different module context, operation 802 to create or select a different user context, etc. When the revision was not created, processing continues in an operation 820. For example, if the returned revision number is greater than zero, the source code passed using the input parameter "myCode" compiled correctly into executable form and is ready to be executed. A revision is uniquely identified using the module context ID and the assigned revision number. Once created, a revision can be executed many times.

In operation 820, a determination is made concerning whether or not the user wants to revise the source code that failed to compile. When the user wants to revise the source code, processing continues in operation 810 to allow the user to enter or select new source code. When the user does not want to revise the source code, processing continues in operation 822 though the user can also opt to trigger other actions such as to select a different module context based on interaction with analytic creation application 322.

In operation 822, a done signal is sent to analytic service application 222 to request that analytic service application 222 stop processing.

Figure 9B:
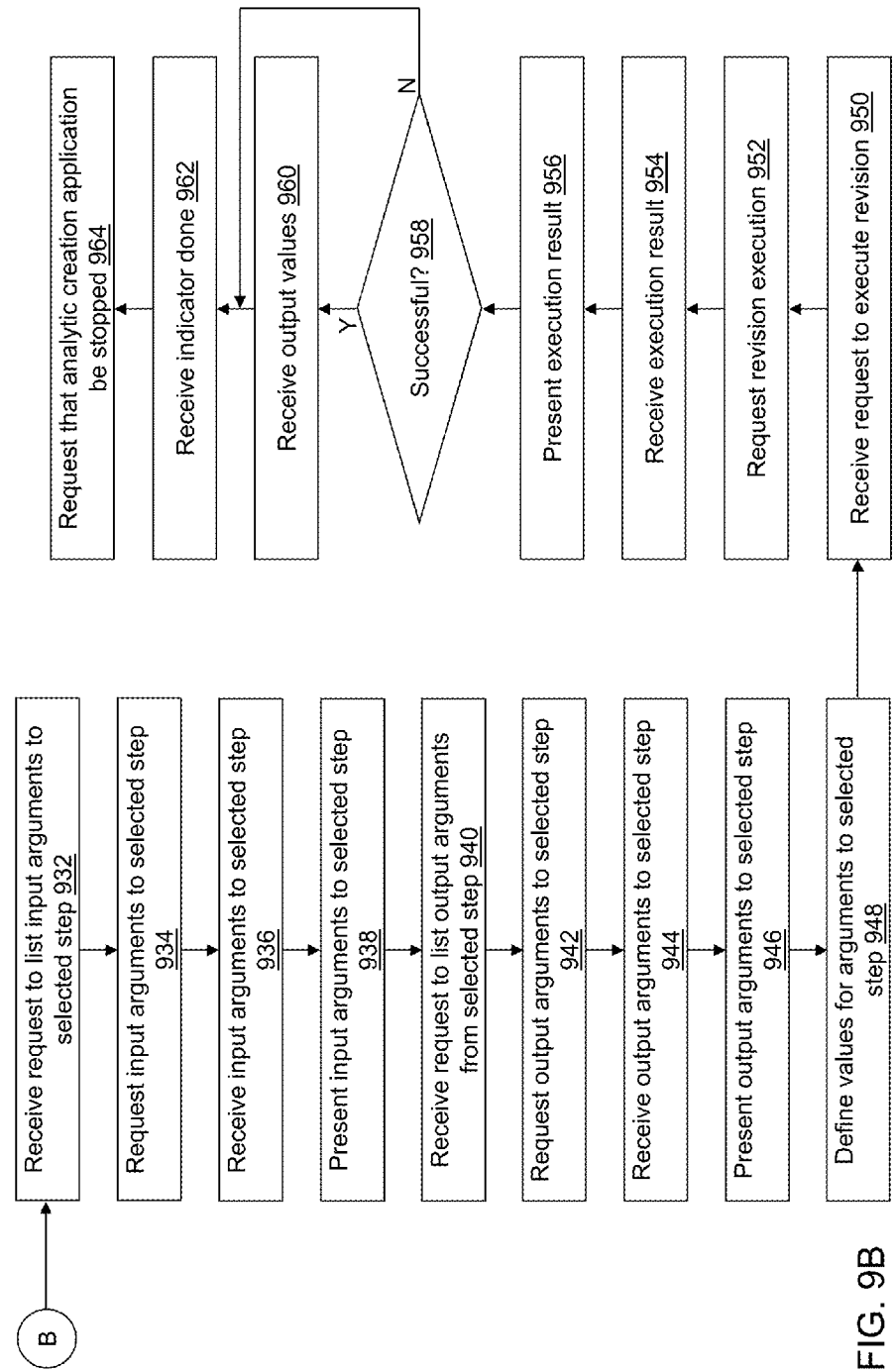

Referring to FIGS. 9A-9B, example operations associated with analytic execution application 422 are described. Analytic creation application 322 and analytic execution application 422 may be a single application that allows the user to both create and execute revisions. Additional, fewer, or different operations may be performed depending on the embodiment of analytic execution application 422. The order of presentation of the operations of FIGS. 9A-9B is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute analytic execution application 422, which causes presentation of a first user interface window, which may include a plurality of menus and selectors such as drop down menus, buttons, text boxes, hyperlinks, etc. associated with analytic execution application 422 as understood by a person of skill in the art. The plurality of menus and selectors may be accessed in various orders. An indicator may indicate one or more user selections from a user interface, one or more data entries into a data field of the user interface, one or more data items read from third computer-readable medium 408 or otherwise defined with one or more default values, etc. that are received as an input by execution application 422.

Similar to operation 800, in an operation 900, a request to instantiate an instance of analytic service application 222 is sent to analytic service device 104 that may be analytic execution device 400 because analytic service application 222 and analytic execution application 422 may be executing in the same process space.

In an operation 902, a fifth indicator of a user context is received that indicates a user context, for example, by name.

In an operation 904, a request to select an existing user context associated with the user context name is sent to analytic service application 222. The pointer to the user context may be returned.

In an operation 906, a request to present a list of module names associated with the user context is received. For example, the request may be received by analytic execution application 422 after selection from a user interface window or after entry by a user into a user interface window. The user may be unfamiliar with the module contexts associated with the user context and thus want to explore the module context.

In an operation 908, a request to list the module names associated with the user context is sent to analytic service application 222. For example, the getModuleNames command may be used as described previously.

In an operation 910, the list of module names is received from analytic service application 222.

In an operation 912, the received list of module names is presented to the user, for example, using third display 416.

In an operation 914, a sixth indicator of a module selection from the presented list of module names is received. For example, the sixth indicator may be received by analytic execution application 422 after selection of a presented module name from a user interface window or after entry by a user into a user interface window. The selection may trigger execution of the getModuleContextByName command with the module selection to obtain the pointer to the module context data structure having the indicated module name.

In an operation 916, a revision selection is received. For example, the revision selection may be received by analytic execution application 422 after selection from a user interface window or after entry by a user into a user interface window.

In an operation 918, a request to present a list of steps associated with the revision selection is received. For example, the request may be received by analytic execution application 422 after selection from a user interface window or after entry by a user into a user interface window. The user may be unfamiliar with the steps included in the revision and thus want to explore the revision.

In an operation 920, a request to list the step IDs (method, subroutine, or function name(s)) included in the revision selection is sent to analytic service application 222. For example, the getStepIDs command may be used as described previously.

In an operation 922, the list of step IDs is received from analytic service application 222.

In an operation 924, the received list of step IDs is presented to the user, for example, using third display 416.

In an operation 926, a seventh indicator of a step selection from the presented list of step IDs is received. For example, the seventh indicator may be received by analytic execution application 422 after selection of a presented step name from a user interface window or after entry by a user into a user interface window.

Referring to FIG. 9B, in an operation 932, a request to present a list of input arguments to the selected step is received. For example, the request may be received by analytic execution application 422 after selection from a user interface window or after entry by a user into a user interface window. The user may be unfamiliar with the input arguments required by the step of the revision and thus want to explore the step inputs.

In an operation 934, a request to list the input arguments required by the selected step is sent to analytic service application 222. For example, the getStepInputs command may be used as described previously.

In an operation 936, the list of input arguments is received from analytic service application 222.

In an operation 938, the received list of input arguments is presented to the user, for example, using third display 416.

In an operation 940, a request to present a list of output arguments of the selected step is received. For example, the request may be received by analytic execution application 422 after selection from a user interface window or after entry by a user into a user interface window. The user may be unfamiliar with the output arguments required by the step of the revision and thus want to explore the step outputs.

In an operation 942, a request to list the output arguments from the selected step is sent to analytic service application 222. For example, the getStepOutputs command may be used as described previously.

In an operation 944, the list of output arguments is received from analytic service application 222.

In an operation 946, the received list of output arguments is presented to the user, for example, using third display 416.

In an operation 948, a value of each input argument is received. For example, the value(s) may be received by analytic execution application 422 after selection from a user interface window or after entry by a user into a user interface window. The input argument values may be read from input data 424 or a location and a name of input data 424 may be provided. Input data 424 may be a database. Connection strings may be used to specify database connection information such as the URL, credentials, and options needed based on the type of database. Connection strings can be federated allowing multiple databases to be used concurrently.

As understood by a person of skill in the art, "setter" functions may be used to define the values of the input arguments. For illustration, the POJO API layer may use a "tksfValues" object to pass arguments to and from the selected step to be executed by analytic service application 222. As an example, "tksfValues args=new tksfValues(2, 1);" may be used to define the input parameter values. The first parameter to the "tksfValues" constructor may define a total number of step arguments including both input arguments and output arguments. The second parameter to the "tksfValues" constructor may define a number of input arguments to the selected step. Both inputs and outputs may be populated in the tksfValues object, for example, using the following to specify the value and data type for input arguments and the data type for output arguments:

args.setInt(3);
args.setOutInt( );

In an operation 950, a request to execute the selected revision and step is received. For example, the request may be received by analytic execution application 422 after selection from a user interface window or after entry by a user into a user interface window.

In an operation 952, a request to execute the selected revision and step is sent to analytic service application 222. For example, the following code may be entered by the user of analytic execution application 422 and executed to request execution of the revision selection:

rc=tk.execute(userContext, moduleContext, revNumber, stepId, args);

A "revNumber" equal to zero may indicate a request to execute the most recent revision. The input parameter "args" may be the populated "tksfValues" object.

In an operation 954, an execution result is received from analytic service application 222. Execution of the "execute" method may return an execution code. An execution code value equal to zero may indicate successful execution of the revision.

In an operation 956, the received execution result is presented to the user, for example, using third display 416.

In an operation 958, a determination is made concerning whether or not the execution was successful. When the execution was successful, processing continues in an operation 960. When the execution was not successful, processing continues in an operation 962.

In operation 960, the values of the output arguments may be received, for example, using getter methods to retrieve the execution results. The one or more output values may be stored in output data 426. Analytic execution application 422 uses type-specific setter and getter functions to set and retrieve input and output argument values, respectively. Analytic service application 222 handles any necessary data type conversion automatically, and returns an error if no valid conversion exists between a requested data type and an actual data type.

In operation 962, a done signal is received. For example, the done signal may be received by analytic execution application 422 after selection from a user interface window or after entry by a user into a user interface window. Of course, the user can also opt to trigger other subsequent actions such as to select a different module context (operation 914), select a different revision (operation 916), select a different step (operation 926), define different input argument values (operation 948), etc. based on interaction with analytic execution application 422. For example, the revision may be executed again with new input argument values by reading another line of data or another record from input data 424.

In operation 964, the received done signal is sent to analytic service application 222 to request that analytic service application 222 stop processing.

Figure 10A:
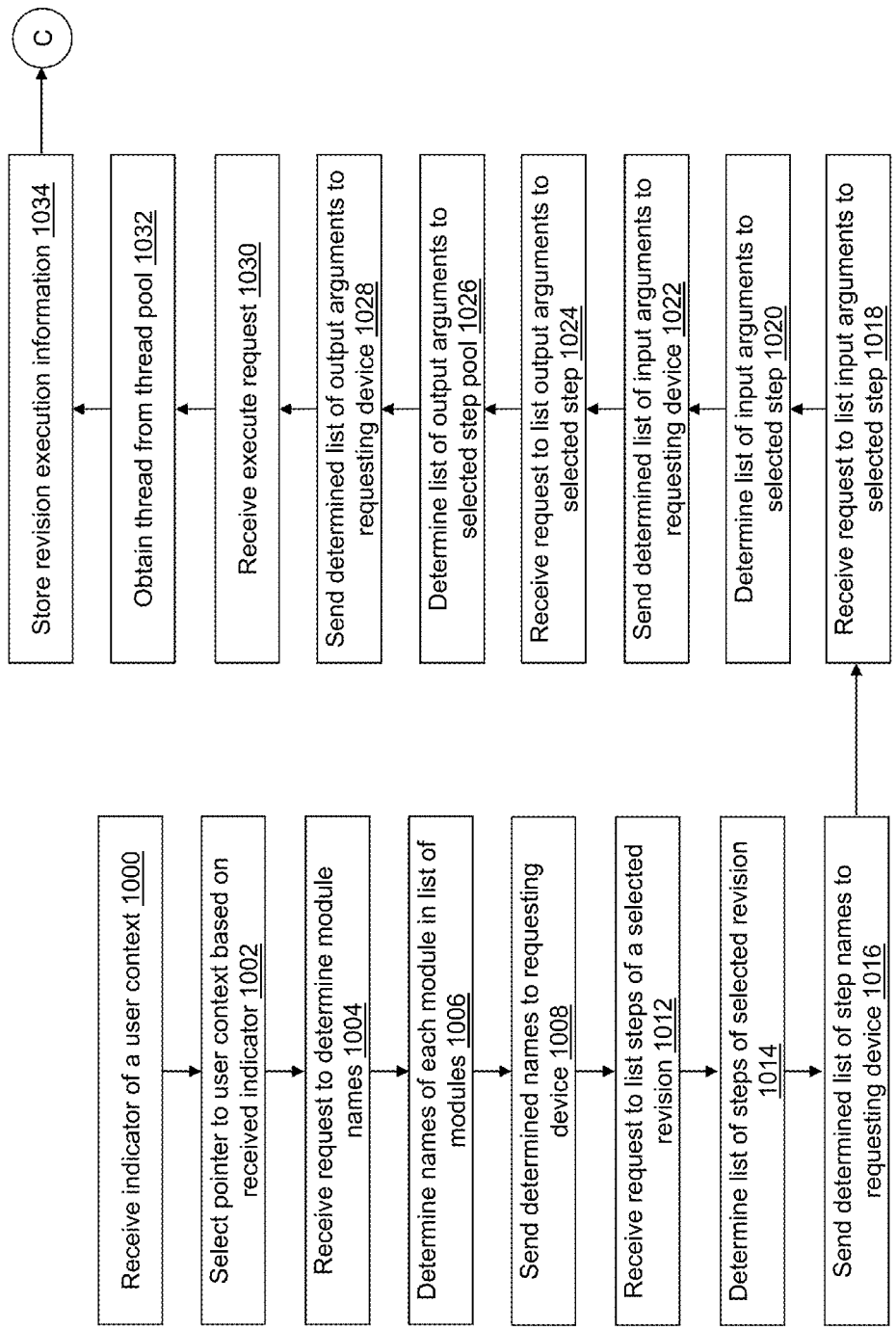
FIGS. 10A-10B depict flow diagrams illustrating examples of operations performed by the analytic service device of FIG. 2 in executing an analytic revision in accordance with an illustrative embodiment.
Figure 10B:
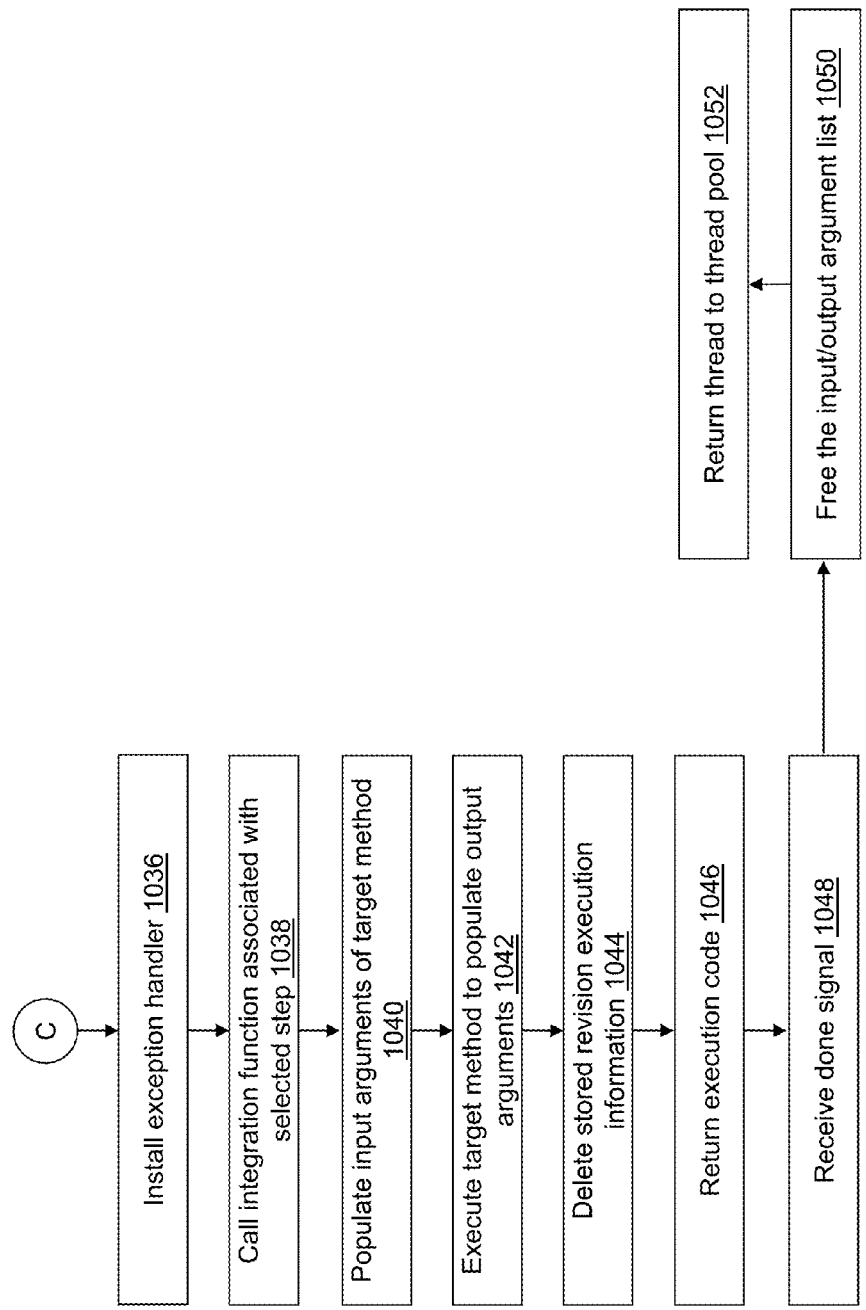

Referring to FIGS. 10A-10B, additional example operations associated with analytic service application 222 are described. When a revision has been created, its methods, subroutines, and/or functions can be executed repeatedly. Additional, fewer, or different operations may be performed depending on the embodiment of analytic service application 222. The order of presentation of the operations of FIGS. 10A-10B is not intended to be limiting. Some of the operations may not be performed in some embodiments. Although some of the operational flows are presented in sequence, the various operations may be performed in various repetitions, concurrently (in parallel, for example, using threads and/or distributed computing system 328), and/or in other orders than those that are illustrated.

Similar to operation 700, in an operation 1000, an eighth indicator of a user context is received from analytic execution application 422.

In an operation 1002, a pointer to the user context data structure associated with the user context is selected by looping through the list of user contexts and selecting a pointer to the user context data structure having a matching name from analytic data 224. The pointer may be returned to the requesting device and/or stored locally.

In an operation 1004, a request to determine module names included in the user context data structure is received.

In an operation 1006, a module name of each module in the linked list of modules accessed through the "modules" pointer of the user context data structure is determined using analytic data 224. The value of the "name" parameter stored in the module context data structure of each module context accessed through the "modules" pointer stored in the user context data structure may be selected.

In an operation 1008, the determined module names are sent to the requesting device such as analytic execution device 400.

In an operation 1012, a request to identify steps included in a selected revision of a selected module context of the user context data structure is received.

In an operation 1014, a step name of each step of the selected revision is determined using analytic data 224. The "dictionary" parameter of the DICTIONARY data structure stored in the revision data structure may be selected. Each method included in the list of methods is accessed using the "methods" parameter of the DICTIONARY data structure dictionary accessed using the "dictionary" parameter. The "name" parameter of each method included in the list of methods is selected.

In an operation 1016, the determined step name(s) are sent to the requesting device such as analytic execution device 400.

In an operation 1018, a request to identify input arguments to a selected step of the selected revision of the selected module context of the user context data structure is received.

In an operation 1020, an input argument name of each input argument of the selected step is determined using analytic data 224. The "dictionary" parameter of the DICTIONARY data structure stored in the revision data structure may be selected. The method is identified by matching the name parameter stored in the DICT_METHOD data structure with the name of the selected step included in the request. Using the DICT_METHOD data structure associated with the matching name, the "arguments" parameter of the DICT_METHOD data structure is used to access the SF_DICT_ARG data structure that stores information describing each input and output argument of the selected step. The "isInput" parameter of each SF_DICT_ARG data structure accessed by sequencing through the arguments using the "arguments" parameter is tested to determine if it is an input argument. If it is, the "name" parameter of the argument is selected. The "type" parameter may also be selected to provide the data type of each input argument. The "num Inputs" parameter of the DICT_METHOD data structure may be used to define a loop through which successive SF_DICT_ARG data structures are identified.

In an operation 1022, the determined input argument name(s) and/or data type(s) are sent to the requesting device such as analytic execution device 400.

In an operation 1024, a request to identify output arguments to the selected step of the selected revision of the selected module context of the user context data structure is received.

In an operation 1026, an output argument name of each output argument of the selected step is determined using analytic data 224 in a manner similar to the input arguments in operation 1020. The "dictionary" parameter of the DICTIONARY data structure stored in the revision data structure may be selected. The method is identified by matching the name parameter stored in the DICT_METHOD data structure with the name of the selected step included in the request. Using the DICT_METHOD data structure associated with the matching name, the "arguments" parameter of the DICT_METHOD data structure is used to access the SF_DICT_ARG data structure that stores information describing each input and output argument of the selected step. The "isInput" parameter of each SF_DICT_ARG data structure accessed by sequencing through the arguments using the "arguments" parameter is tested to determine if it is an output argument. If it is, the "name" parameter of the argument is selected. The "type" parameter may also be selected to provide the data type of each output argument. The "numOutputs" parameter of the DICT_METHOD data structure may be used to define a loop through which successive SF_DICT_ARG data structures are identified.

In an operation 1028, the determined output argument name(s) are sent to the requesting device such as analytic execution device 400.

in an operation 1030, the execution request is received from analytic execution application 422 with revision execution information that includes the user context ID, the module context ID, the revision number, the step name of a target method to execute, and the input and output arguments.

In an operation 1032, a thread is obtained from the thread pool.

In an operation 1034, the revision execution information is stored in thread-specific storage, for example, in computer readable-medium 208. If step execution must be interrupted later, such as if the step contained an infinite loop or became blocked waiting for a database or web service to respond, this information is used to lookup the worker thread executing the step so that execution can be halted and the thread returned to the worker thread pool.

Referring to FIG. 10B, in an operation 1036, an exception handler is installed to protect analytic service device 104 in case the target method terminates abnormally.

In an operation 1038, the integration function associated with the step name is called with the input and output arguments stored in the symbol table. When execute is called, the address of the integration function entry point is looked up from the metadata using the module context pointer or name, the revision number, and the step name. The user context ID is used to select the correct user context data structure, for example, by name or by pointer. The module context ID is used to select the correct module context data structure from the "modules" parameter of the selected user context data structure, for example, by name or pointer. The revision number is used to select the correct revision data structure from the "revisions" parameter of the selected module context data structure. That is, the list of revisions chained from the module context data structure is searched for a matching revision number where zero indicates to use the latest revision. The latest revision or revision number zero is stored first in the list of revisions chained through the "revisions" parameter. The REVISION data structure is the first element "i" of the language-specific data structures such as DS2REVISION and CREVISION. As a result, pointing to the correct revision data structure is also pointing to the language-specific data structure. The pointer is recast to the language specific data structure for example using the following code for a DS2 source:

rev=(struct DS2REVISION *)moduleContext→revisions;

where "moduleContext" is the pointer to the selected module context.

For example, the code below finds the selected revision number "revision" and defines the pointer "rev" to the revision data structure:

rev=(struct DS2REVISION *)moduleContext→revisions;
if (revision !=0) { // 0 indicates latest revision, which is 1st in list
  while(rev) {
    if (rev→i.revisionNumber==revision)
      break; // found matching revision number
    else
      rev=(struct DS2REVISION *)rev→i.nextRevision;
  }
}

The pointer to the revision is used with the language specific data structure, which in this example is DS2, to identify the matching step name "methName".

if (rev) {
pack=&rev→packList[sfe→threadNdx];
i=findMethod(pack, methName); // find the matching method name
if (i !=−1) {
  FREE_TKMEM(sfe→gcb→Pool, methName);
  return &pack→meths[i].i;
}
}

Once the matching step name is identified, the entry point to the integration function is selected. The entry point to the integration function is stored in the language specific data structure for the matching method, such as DS2METH in the "i" parameter that has the data type ENTRYPT. The entry point to the integration function obtained by "pack→meths[i].i" is used to call the integration function. The integration function entry point is called using the *fp-style function call by dereferencing and branching to the entry point address that is a pointer to the integration function. For the illustrative integration function shown above, the entry point results in a call to the integration function "Call_crunch1_THREAD01" associated with the matching step name. The "(*entry)( )" parameter holds a pointer to the entry point of the DS2 method "(*crunch1_THREAD0)" that translates the input and output data between the integration function "Call_crunch1_THREAD01" and the target function "_crunch1".

Analytic service application 222 may execute different code to find revisions and steps based on the language indicated by the "type" parameter of the module context moduleContext→type.

In an operation 1040, the input arguments associated with the target method of the integration function are populated. For the illustrative integration function shown above, the input arguments are populated by executing the code compiled into the selected integration function:
"(*crunch1_THREAD0)
(sfSymbolTableGetDS2ExecutionContext(args),
sfSymbolTableGetInt(args, 0)→val, &(sfSymbolTableGetInt(args, 0)→ind),
sfSymbolTableGetInt(args, 1)→val, &(sfSymbolTableGetInt(args, 1)→ind),
sfSymbolTableGetInt(args, 2)→val, &(sfSymbolTableGetInt(args, 2)→ind)", . . . ).

In an operation 1042, the target method is executed to populate the output arguments. For the illustrative integration function shown above, the output arguments are populated by executing the code compiled into the selected integration function: void "_crunch1( . . . ) { . . . }".

Again, output values are passed by reference. In the C programming language, the leading "&" is an "address of" operator, which provides the target method with the address of an integer variable in which to store an execution result. Values for the output arguments are passed back to the caller through the language independent parameter list. For the illustrative integration function shown above, the output arguments are passed back using the code
"(*crunch1_THREAD0)
(sfSymbolTableGetDS2ExecutionContext(args), . . . ,
&(sfSymbolTableGetInt(args, 3)→val), &(sfSymbolTableGetInt(args, 3)→ind),
&(sfSymbolTableGetInt(args, 4)→val), &(sfSymbolTableGetInt(args, 4)→ind));",
which includes the references to the output arguments.

In an operation 1044, the stored revision execution information is deleted.

In an operation 1046, an execution code value is returned to analytic execution application 422 to indicate a successful execution of the revision. For illustration, a zero value may indicate a successful execution; and a non-zero value may indicate an error code.

In an operation 10448, a done signal is received from analytic execution application 422.

In an operation 1050, the input/output argument list is freed.

In an operation 1052, the thread is returned to the thread pool and the instantiated analytic service application 222 is stopped.

Figure 11:
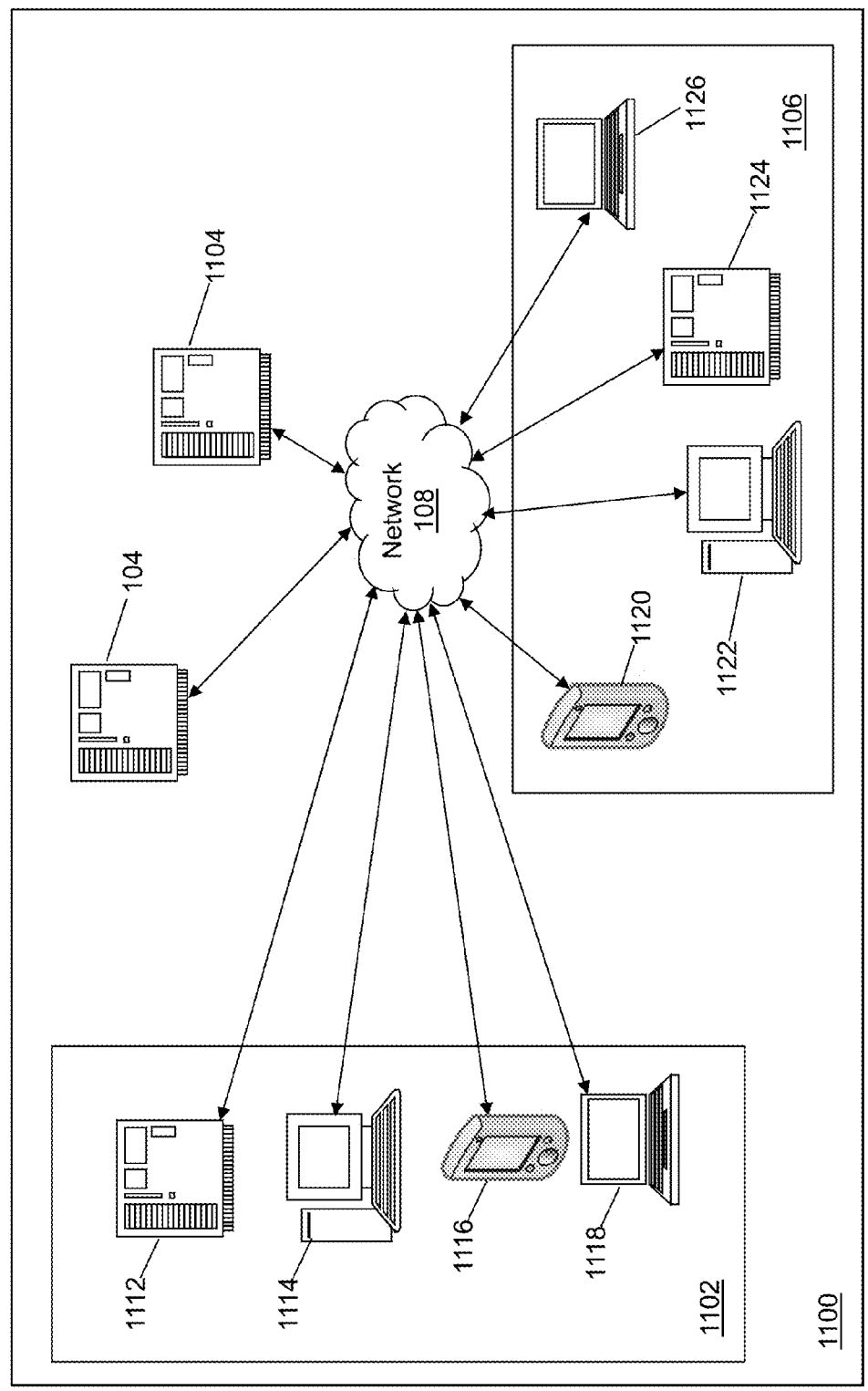
FIG. 11 depicts a block diagram of a stream processing system that includes the analytic service device of FIG. 2 in accordance with an illustrative embodiment.

Referring to FIG. 11, a block diagram of a stream processing system 1100 is shown in accordance with an illustrative embodiment. In an illustrative embodiment, stream processing system 1100 may include an event publishing system 1102, an ESP device 1104, an event subscribing system 1106, analytic service device 104, and network 108. Each of event publishing system 1102, ESP device 1104 and event subscribing system 1106 may be composed of one or more discrete devices in communication through network 108.

Event publishing system 1102 includes, is integrated with, and/or communicates with one or more sensors 1513 (shown referring to FIG. 15), data generation devices, data capture devices, etc. For example, sensor 1513 may produce a sensor signal value referred to as a measurement data value representative of a measure of a physical quantity in an environment to which sensor 1513 is associated and generate a corresponding measurement datum that typically is associated with a time that the measurement datum is generated. The environment to which sensor 1513 is associated for monitoring may include a power grid system, a telecommunications system, a fluid (oil, gas, water, etc.) pipeline, a transportation system, an industrial device, a medical device, an appliance, a vehicle, a computing device, etc. Example sensor types include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system.

As another example, a data generation device may be a computing device that generates a measurement data value in response to occurrence of an event. As still another example, a data capture device may be a computing device that receives a measurement data value generated by another device that may be in response to an event.

Event publishing system 1102 publishes the measurement data value to ESP device 1104 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 1104 receives the measurement data value in an event stream, processes the measurement data value, and identifies a computing device of event subscribing system 1106 to which the processed measurement data value is sent.

The one or more computing devices of event publishing system 1102 may include computing devices of any form factor such as a server computer 1112, a desktop 1114, a smart phone 1116, a laptop 1118, a personal digital assistant, an integrated messaging device, a tablet computer, a point of sale system, a transaction system, etc. Event publishing system 1102 can include any number and any combination of form factors of computing devices that may be organized into subnets. The computing devices of event publishing system 1102 send and receive signals through network 108 to/from another of the one or more computing devices of event publishing system 1102 and/or to/from ESP device 1104. The one or more computing devices of event publishing system 1102 may communicate using various transmission media that may be wired and/or wireless as understood by those skilled in the art. The one or more computing devices of event publishing system 1102 may be geographically dispersed from each other and/or co-located. Each computing device of the one or more computing devices of event publishing system 1102 may be executing one or more event publishing applications such as an event publishing application 1522 (shown referring to FIG. 15) of the same or different type.

ESP device 1104 can include any form factor of computing device. For illustration, FIG. 11 represents ESP device 1104 as a server computer. In general, a server computer may include faster processors, additional processors, more disk memory, and/or more random access memory (RAM) than a client computer and support multi-threading as understood by a person of skill in the art. ESP device 1104 sends and receives signals through network 108 to/from event publishing system 1102 and/or to/from event subscribing system 1106. ESP device 1104 may communicate using various transmission media that may be wired and/or wireless as understood by those skilled in the art. ESP device 1104 may be implemented on a plurality of computing devices of the same or different type that support failover processing.

The one or more computing devices of event subscribing system 1106 may include computers of any form factor such as a smart phone 1120, a desktop 1122, a server computer 1124, a laptop 1126, a personal digital assistant, an integrated messaging device, a tablet computer, etc. Event subscribing system 1106 can include any number and any combination of form factors of computing devices. The computing devices of event subscribing system 1106 send and receive signals through network 108 to/from ESP device 1104. The one or more computing devices of event subscribing system 1106 may be geographically dispersed from each other and/or co-located. The one or more computing devices of event subscribing system 1106 may communicate using various transmission media that may be wired and/or wireless as understood by those skilled in the art. Each computing device of the one or more computing devices of event subscribing system 1102 may be executing one or more event subscribing applications such as an event subscribing application 1722 (shown referring to FIG. 17) of the same or different type.

Figure 12:
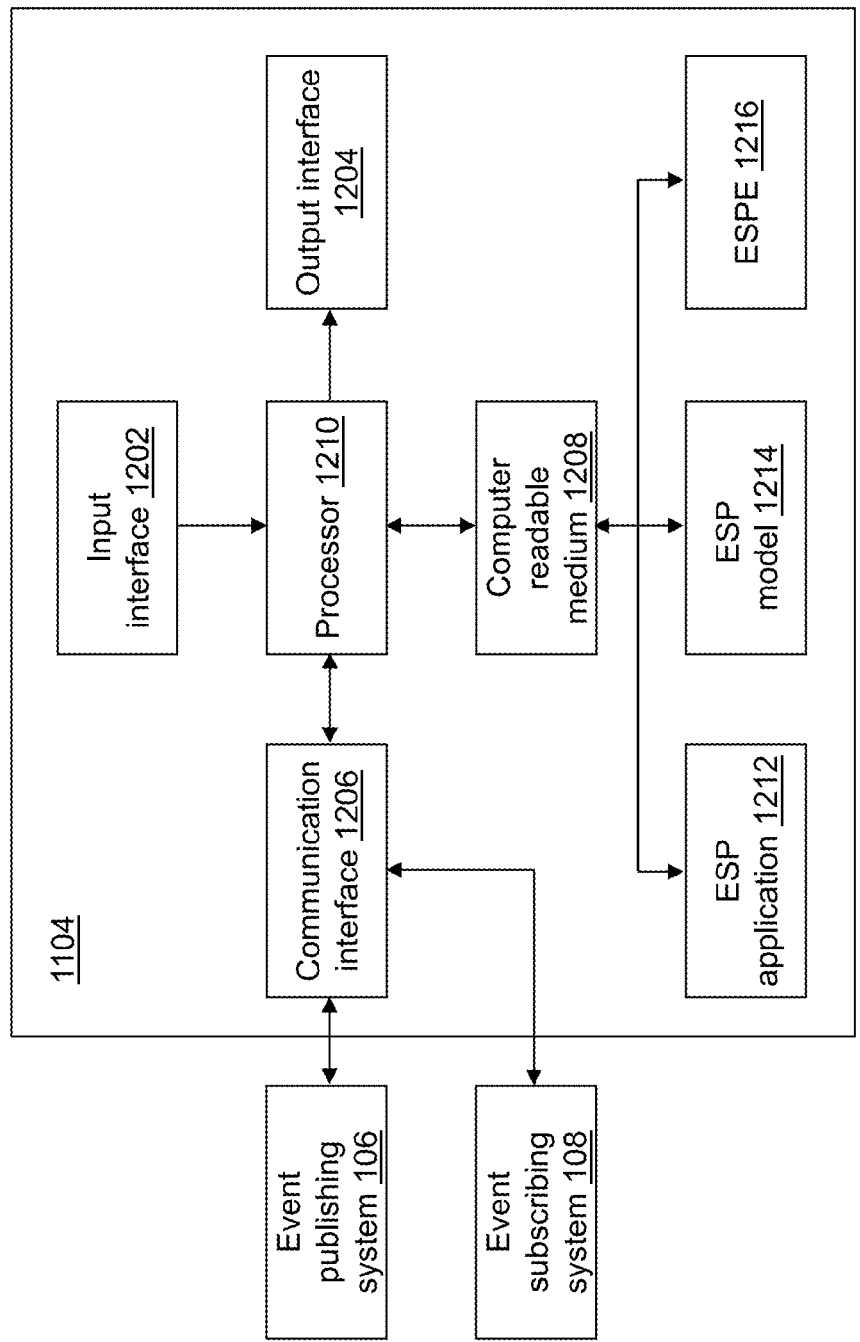
FIG. 12 depicts a block diagram of an event stream processing (ESP) device of the stream processing system of FIG. 11 accordance with an illustrative embodiment.
Figure 13:
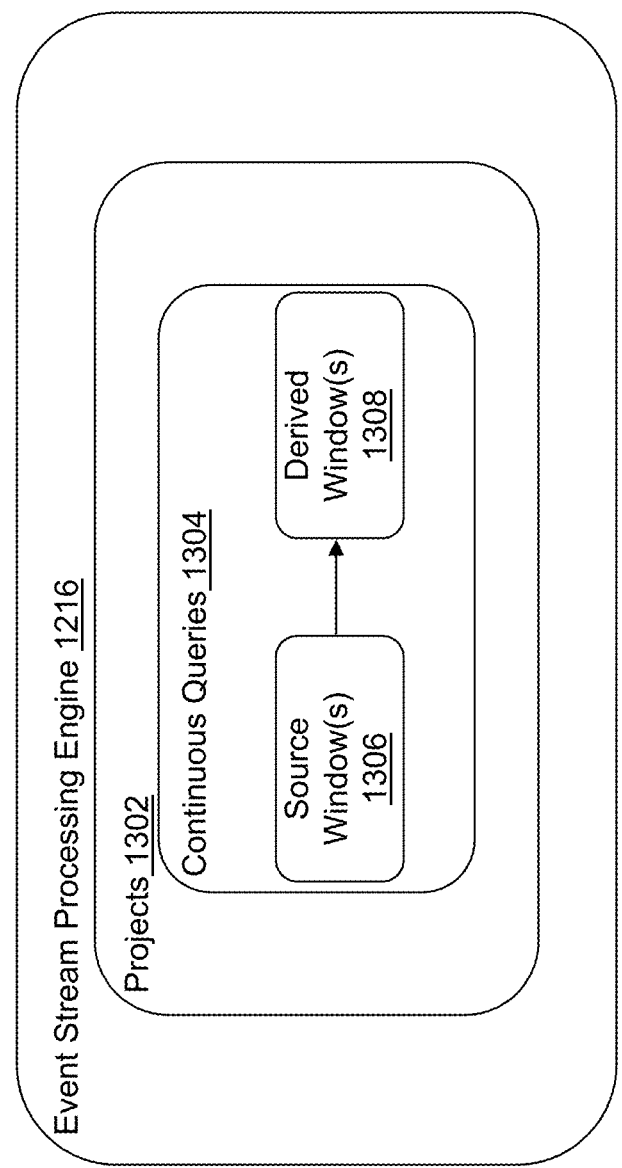
FIG. 13 depicts a block diagram of an ESP engine executing on the ESP device of FIG. 12 in accordance with an illustrative embodiment.

For illustration, referring to FIG. 12, a block diagram of ESP device 1104 is shown in accordance with an example embodiment. ESP device 1104 may include a fourth input interface 1202, a fourth output interface 1204, a fourth communication interface 1206, a fourth computer-readable medium 1208, a fourth processor 1210, an ESP application 1212, ESP model 1214, and an ESPE 1216. ESP device 1104 executes ESP application 1212 that reads ESP model 1214 to instantiate ESPE 1216 that is executing one or more revisions of analytic data 224 of analytic service device 104. Fewer, different, and/or additional components may be incorporated into ESP device 1104.

Fourth input interface 1202 provides the same or similar functionality as that described with reference to input interface 202 of analytic service device 104 though referring to ESP device 1104. Fourth output interface 1204 provides the same or similar functionality as that described with reference to output interface 204 of analytic service device 104 though referring to ESP device 1104. Fourth communication interface 1206 provides the same or similar functionality as that described with reference to communication interface 206 of analytic service device 104 though referring to ESP device 1104. Data and messages may be transferred between ESP device 1104 and analytic service device 104 and/or to/from event publishing system 1102 and/or to/from event subscribing system 1106 using fourth communication interface 1206. Fourth computer-readable medium 1208 provides the same or similar functionality as that described with reference to computer-readable medium 208 of analytic service device 104 though referring to ESP device 1104. Fourth processor 1210 provides the same or similar functionality as that described with reference to processor 210 of analytic service device 104 though referring to ESP device 1104.

ESP application 1212 performs operations associated with reading ESP model 1214 to instantiate ESPE 1216. Some or all of the operations described herein may be embodied in ESP application 1212 that reads ESP model 1214 to instantiate ESPE 1216. The operations may be implemented using hardware, firmware, software, or any combination of these methods.

Referring to the example embodiment of FIG. 12, ESP application 1212 is implemented in software (comprised of computer-readable and/or computer-executable instructions) stored in fourth computer-readable medium 1208 and accessible by fourth processor 1210 for execution of the instructions that embody the operations of ESP application 1212. ESP application 1212 may be written using one or more programming languages, assembly languages, scripting languages, etc. ESP application 1212 may be integrated with other analytic tools. For example, ESP application 1212 may be implemented using or integrated with SAS® Event Stream Processing developed and provided by SAS Institute Inc. of Cary, N.C., USA. Analytic service application 222 and ESP application 1212 further may be integrated applications.

ESP application 1212 may be implemented as a Web application. ESP application 1212 may be integrated with other system processing tools to automatically process data generated as part of operation of an enterprise using fourth input interface 1202, fourth output interface 1204, and/or fourth communication interface 1206 so that appropriate action can be initiated in response. For example, a warning or an alert may be sent to one or more computing devices of event subscribing system 1106 based on predicted values for a response variable.

Figure 15:
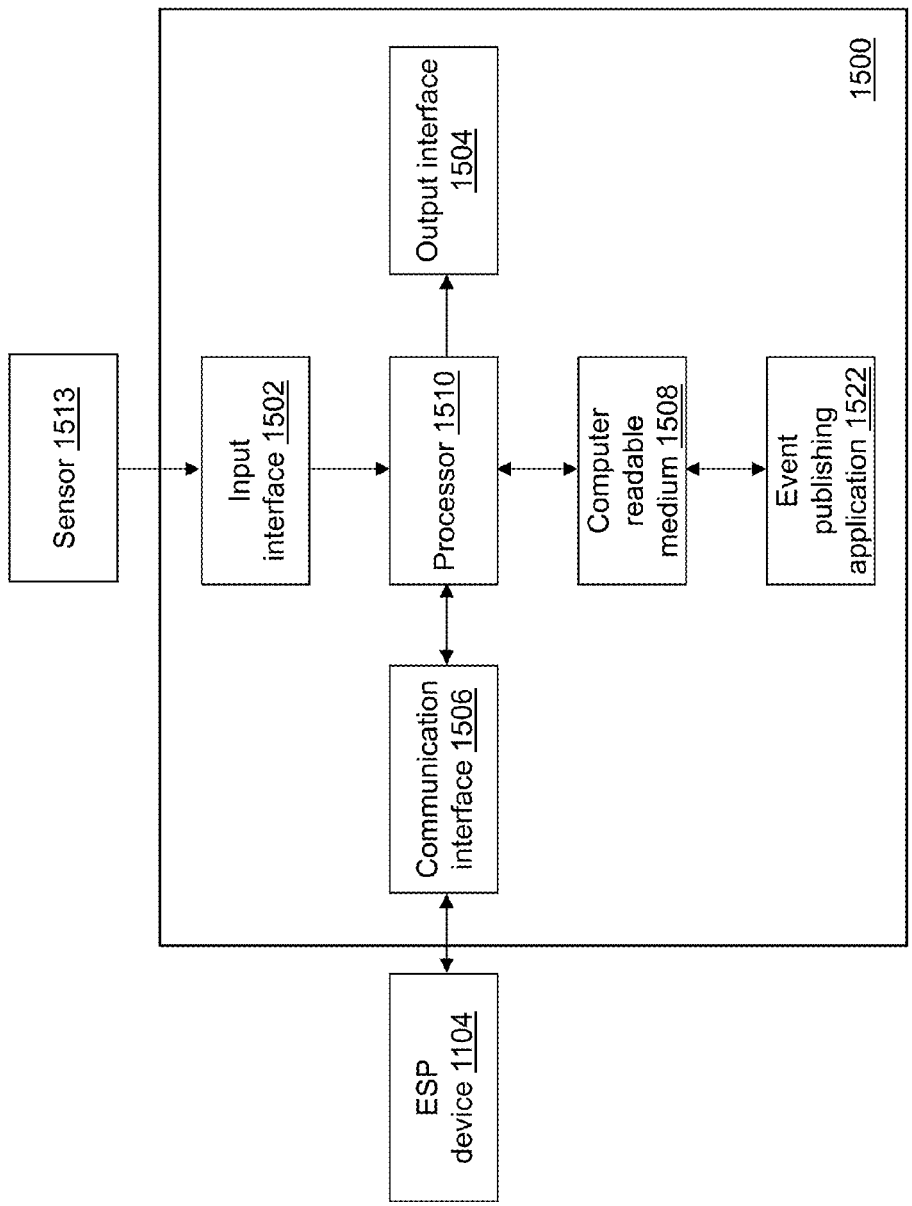
FIG. 15 depicts a block diagram of an event publishing device of an event publishing system of the stream processing system of FIG. 11 in accordance with an illustrative embodiment.

Referring to FIG. 15, the components of ESPE 1216 executing at ESP device 1104 are shown in accordance with an illustrative embodiment. ESPE 1216 may include one or more projects 1302. A project may be described as a second-level container in an engine model read from ESP model 1214 managed by ESPE 1216 where a thread pool size for the project may be defined by a user. A value of one for the thread pool size indicates that writes are single-threaded. Each project of the one or more projects 1302 may include one or more continuous queries 1304 that contain data flows, which are data transformations of incoming event streams. The one or more continuous queries 1304 may include one or more source windows 1306 and one or more derived windows 1308.

The engine container is the top-level container in a model that manages the resources of the one or more projects 1302. Each ESPE 1216 has a unique engine name. Additionally, the one or more projects 1302 may each have unique project names, and each query may have a unique continuous query name and begin with a uniquely named source window of the one or more source windows 1306. Each ESPE 1216 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 1306 and the one or more derived windows 1308 represent continuously executing queries that generate updates to a query result set as new event blocks stream through ESPE 1216. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 1216 can support the opcodes for events including insert, update, upsert, and delete. As a result, events entering a source window of the one or more source windows 1306 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 1500, a data transmit time by event publishing device 1500, a data receipt time by ESP device 1104, etc.

An event block object may be described as a grouping or package of one or more event objects. An event stream may be described as a flow of event block objects. A continuous query of the one or more continuous queries 1304 transforms the incoming event stream made up of streaming event block objects published into ESPE 1216 into one or more outgoing event streams using the one or more source windows 1306 and the one or more derived windows 1308. A continuous query can also be thought of as data flow modeling.

The one or more source windows 1306 are at the top of the directed graph and have no windows feeding into them. Event streams are published into the one or more source windows 1306, and from there, the event streams are directed to the next set of connected windows as defined by the directed graph. The one or more derived windows 1308 are all instantiated windows that are not source windows and that have other windows streaming events into them. The one or more derived windows 1308 perform computations or transformations on the incoming event streams. The one or more derived windows 1308 transform event streams based on the window type (that is operators such as join, filter, compute, aggregate, copy, pattern match, procedural, union, etc.) and window settings. As event streams are published into ESPE 1216, they are continuously queried, and the resulting sets of derived windows in these queries are continuously updated.

For illustration, a continuous query of the one or more continuous queries 1304 may be created using a continuous query XML definition or by coding a continuous query in C++. Both methods enable the module written in DS2, Python, or C to be published to analytic service application 222, and to specify which methods are used to process each source window's events.

Figure 14:
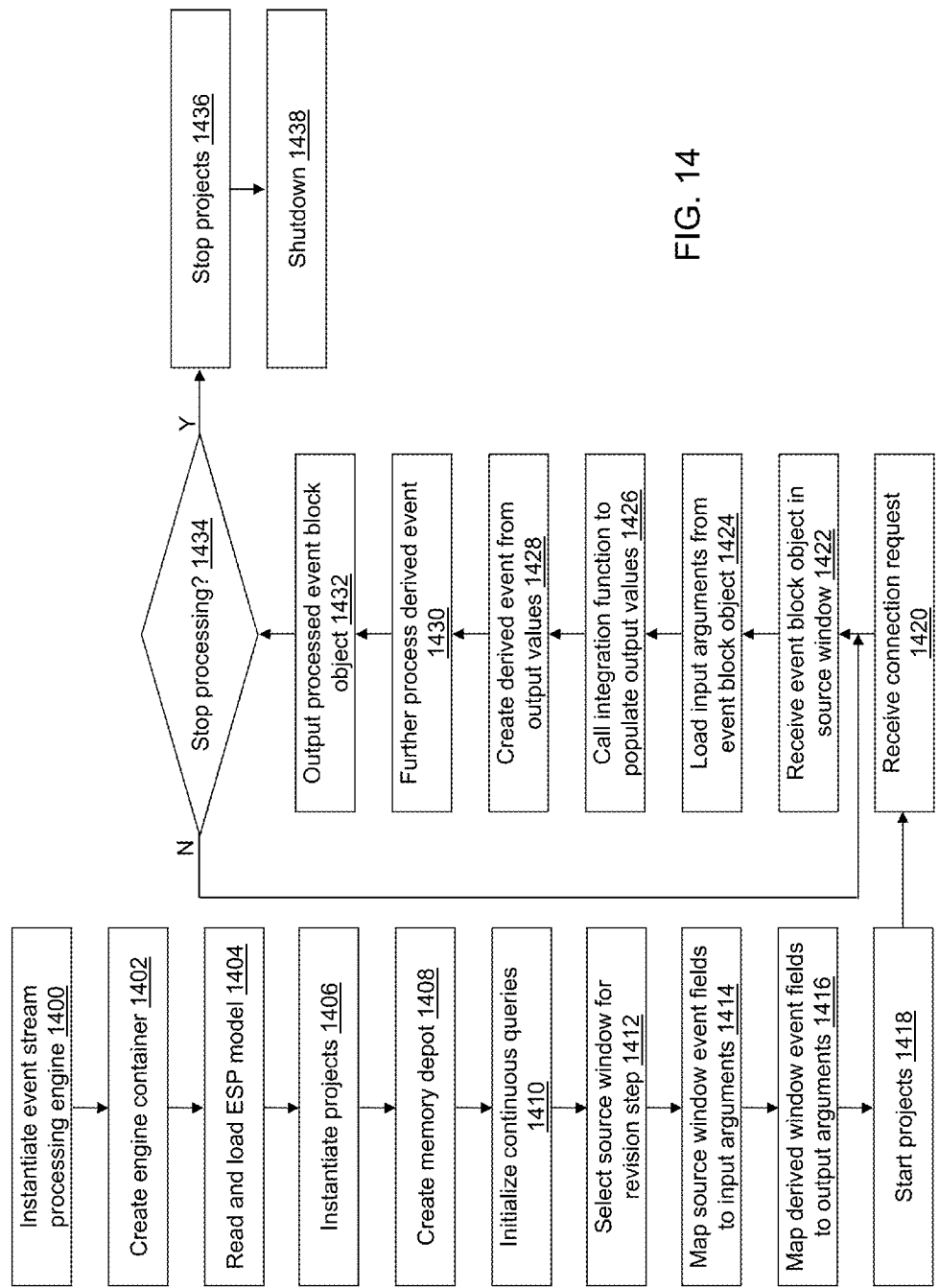
FIG. 14 depicts a flow diagram illustrating examples of operations performed by the ESP device of FIG. 12 in accordance with an illustrative embodiment.

Referring to FIG. 14, a flow diagram illustrating examples of operations performed by ESP device 1104 is shown in accordance with an illustrative embodiment. Additional, fewer, or different operations may be performed depending on the embodiment of ESP application 1212. The order of presentation of the operations of FIG. 14 is not intended to be limiting. Although some of the operational flows are presented in sequence, the various operations may be performed in various repetitions, concurrently (in parallel, for example, using threads), and/or in other orders than those that are illustrated.

In an operation 1400, ESPE 1216 is instantiated.

In an operation 1402, the engine container is created. For illustration, ESPE 1216 may be instantiated using a function call that specifies the engine container as a manager for the model. The function call may include the engine name for ESPE 1216 that may be unique to ESPE 1216.

In an operation 1404, ESP model 1214 that may be stored locally in fourth computer-readable medium 1208 is read and loaded.

In an operation 1406, the one or more projects 1302 defined by ESP model 1214 are instantiated. Instantiating the one or more projects 1302 also instantiates the one or more continuous queries 1304, the one or more source windows 1306, and the one or more derived windows 1308 defined from ESP model 1214. Based on ESP model 1214, ESPE 1216 may analyze and process events in motion or event streams. Instead of storing events and running queries against the stored events, ESPE 1216 may store queries and stream events through them to allow continuous analysis of data as it is received. The one or more source windows 1306 and the one or more derived windows 1308 defined from ESP model 1214 may be created based on the relational, pattern matching, and procedural algorithms that transform the input event streams from event publishing system 102 into the output event streams streamed to event subscribing system 106 to model, simulate, score, test, predict, etc. based on the continuous query model defined by ESP model 1214 and event publishing application 1522 that is streaming data to ESPE 1216.

In an illustrative embodiment, the pub/sub capability is also initialized for each project of the one or more projects 1302. To initialize and enable pub/sub capability for ESPE 1216, a host name and a port number are provided. The host name and the port number may be read from ESP model 1214. Pub/sub clients can use a host name and the port number of ESP device 1104 to establish pub/sub connections to ESPE 1216. For example, a server listener socket is opened for the port number to enable event publishing application 1522 to connect to ESPE 1216 for pub/sub services. The host name and the port number of ESP device 1104 to establish pub/sub connections to ESPE 1216 may be referred to as the host:port designation of ESPE 1216 executing on ESP device 1104.

In an operation 1408, a memory depot is created.

In an operation 1410, the one or more projects 1302 and the one or more continuous queries 1304 read from ESP model 1214 are initialized.

In an operation 1412, a source window of the one or more source windows 1306 of the initialized one or more continuous queries 1304 associated with a revision step is selected.

In an operation 1414, a source window event field of the selected source window is mapped to each input argument of the revision step. Each mapped window's event schema, for example, read from ESP model 1214 is inspected and event fields automatically mapped to method input parameters by matching event field names with argument names. Some, none, or all of the names may match. Some methods may not have any input arguments. The derived event window in which analytic creation application 322 operates is a procedural window. Within a continuous query, procedural windows may be configured to receive events from one or more source windows.

In an operation 1416, a derived window event field of the one or more derived windows 1308 of the selected source window is mapped to each output argument of the revision step. Similar matching of the specified method's output argument names are automatically mapped to the derived window's event field names.

In an operation 1418, the one or more projects 1302 defined from ESP model 1214 are started. The one or more started projects may run in the background on ESP device 1104.

In an operation 1420, a connection request is received from event publishing device 1500 for the selected source window to which data will be published. A connection request also may be received from event subscribing device 1700.

In an operation 1422, an event block object is received from event publishing device 1500. An event block object containing one or more event objects is injected into the selected source window.

In an operation 1424, one or more fields of the received event block object are loaded into the mapped input arguments.

In an operation 1426, the integration function associated with the revision step is called to populate the output values. For example, execution of the integration function triggers execution of operations 1030 to 1046 of FIGS. 10A and 10B by analytic service device 104.

In an operation 1428, a derived event block object is created from the output values received into the mapped output arguments.

In an operation 1430, the derived event block object is processed through the derived window(s) the one or more continuous queries 1304. The unique ID assigned to the event block object by event publishing device 1500 is maintained as the event block object is passed through ESPE 1216 and between the one or more source windows 1306 and/or the one or more derived windows 1308 of ESPE 1216. A unique embedded transaction ID further may be embedded in the event block object as the event block object is processed by a continuous query. ESPE 1216 maintains the event block containership aspect of the received event blocks from when the event block is published into a source window and works its way through the directed graph defined by the one or more continuous queries 1304 with the various event translations before being output to event subscribing device 1700.

In an operation 1432, the processed event block object is output to one or more subscribing devices of event subscribing system 1306 such as event subscribing device 1700. Subscribing devices can correlate a group of subscribed event block objects back to a group of published event block objects by comparing the unique ID of the event block object that a publisher, such as event publishing device 1500, attached to the event block object with the event block ID received by event subscribing device 1700. The received event block objects further may be stored, for example, in a RAM or cache type memory of computer-readable medium 108.

In an operation 1434, a determination is made concerning whether or not processing is stopped. If processing is not stopped, processing continues in operation 1422 to continue receiving the one or more event streams containing event block objects from event publishing device 1500. If processing is stopped, processing continues in an operation 1436.

In operation 1436, the started projects are stopped.

In an operation 1438, ESPE 1216 is shutdown.

Referring to FIG. 15, a block diagram of an event publishing device 1500 of event publishing system 1102 is shown in accordance with an example embodiment. Event publishing device 1500 is an example computing device of event publishing system 1102. For example, each of server computer 1112, desktop 1114, smart phone 1116, and laptop 1118 may be an instance of event publishing device 1500. Event publishing device 1500 may include a fifth input interface 1502, a fifth output interface 1504, a fifth communication interface 1506, a fifth computer-readable medium 1508, a fifth processor 1510, and event publishing application 1522. Each event publishing device 1500 of event publishing system 1102 may include the same or different components and combinations of components. Fewer, different, and additional components may be incorporated into event publishing device 1500.

Fifth input interface 1502 provides the same or similar functionality as that described with reference to input interface 202 of analytic service device 104 though referring to event publishing device 1500. Fifth output interface 1504 provides the same or similar functionality as that described with reference to output interface 204 of analytic service device 104 though referring to event publishing device 1500. Fifth communication interface 1506 provides the same or similar functionality as that described with reference to communication interface 206 of analytic service device 104 though referring to event publishing device 1500. Data and messages may be transferred between event publishing device 1500 and ESP device 1104 using fifth communication interface 1506. Fifth computer-readable medium 1508 provides the same or similar functionality as that described with reference to computer-readable medium 208 of analytic service device 104 though referring to event publishing device 1500. Fifth processor 1510 provides the same or similar functionality as that described with reference to processor 210 of analytic service device 104 though referring to event publishing device 1500.

Event publishing application 1522 performs operations associated with generating, capturing, and/or receiving measurement data value and publishing the measurement data value in an event stream to one or more computing devices of event subscribing system 1106 directly or indirectly through ESP device 1104. The operations may be implemented using hardware, firmware, software, or any combination of these methods. Referring to the example embodiment of FIG. 15, event publishing application 1522 is implemented in software (comprised of computer-readable and/or computer-executable instructions) stored in fifth computer-readable medium 1508 and accessible by fifth processor 1510 for execution of the instructions that embody the operations of event publishing application 1522. Event publishing application 1522 may be written using one or more programming languages, assembly languages, scripting languages, etc. Event publishing application 1522 may be implemented as a Web application.

Figure 16:
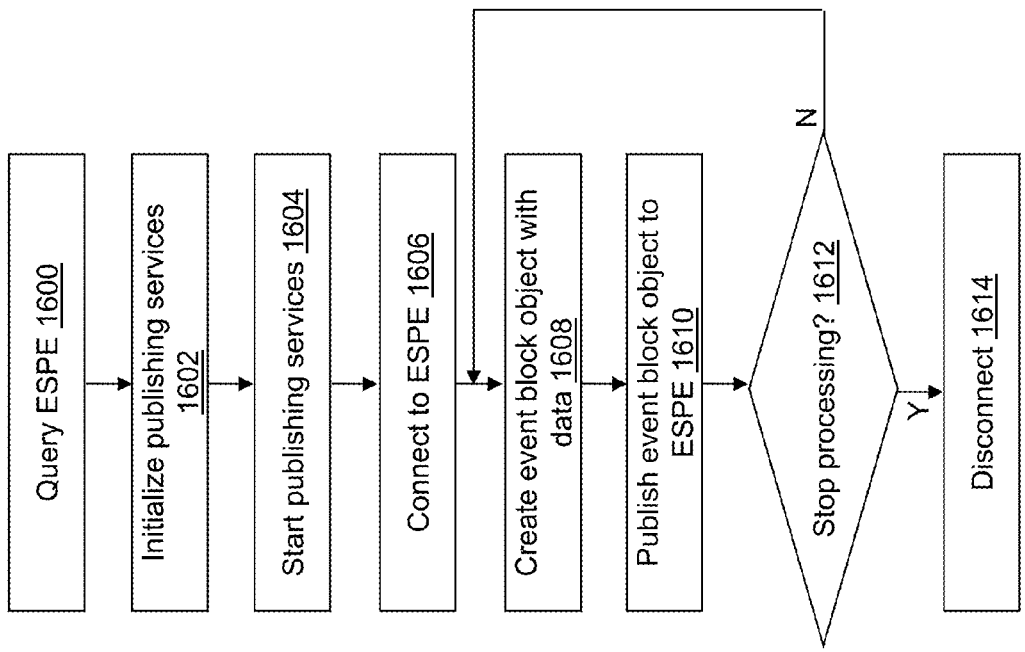
FIG. 16 depicts a flow diagram illustrating examples of operations performed by the event publishing device of FIG. 15 in accordance with an illustrative embodiment.

Referring to FIG. 16, example operations associated with event publishing application 1522 are described. Additional, fewer, or different operations may be performed depending on the embodiment. The order of presentation of the operations of FIG. 16 is not intended to be limiting. A user can interact with one or more user interface windows presented to the user in a display under control of event publishing application 1522 independently or through a browser application in an order selectable by the user. Although some of the operational flows are presented in sequence, the various operations may be performed in various repetitions, concurrently, and/or in other orders than those that are illustrated. For example, a user may execute event publishing application 1522, which causes presentation of a first user interface window, which may include a plurality of menus and selectors such as drop down menus, buttons, text boxes, hyperlinks, etc. associated with event publishing application 1522 as understood by a person of skill in the art. As further understood by a person of skill in the art, various operations may be performed in parallel, for example, using a plurality of threads or a plurality of computing devices such as a grid or a cloud of computing devices.

In an operation 1500, ESPE 1216 is queried, for example, to discover projects 1302, continuous queries 1304, windows 1306, 1508, window schema, and window edges currently running in ESPE 1216. The engine name and host/port to ESPE 1216 may be provided as an input to the query and a list of strings may be returned with the names of the projects 1302, of the continuous queries 1304, of the windows 1306, 1508, of the window schema, and/or of the window edges of currently running projects on ESPE 1216. The host is associated with a host name or Internet Protocol (IP) address of ESP device 1104. The port is the port number provided when a publish/subscribe (pub/sub) capability is initialized by ESPE 1216. The engine name is the name of ESPE 1216. The engine name of ESPE 1216 and host/port to ESP device 1104 may be read from a storage location on second computer-readable medium 1608, may be provided on a command line, or otherwise input to or defined by event publishing application 1522 as understood by a person of skill in the art.

In an operation 1602, publishing services are initialized.

In an operation 1604, the initialized publishing services are started, which may create a publishing client for the instantiated event publishing application 1522. The publishing client performs the various pub/sub activities for the instantiated event publishing application 1522. For example, a string representation of a URL to ESPE 1216 is passed to a "Start" function. For example, the URL may include the host:port designation of ESPE 1216 executing at ESP device 1104, a project of the projects 1302, a continuous query of the continuous queries 1304, and a window of the source windows 1306. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 1522 is publishing to more than one source window of ESPE 1216, the initialized publishing services may be started to each source window using the associated names (project name, continuous query name, source window name).

Pub/sub is a message-oriented interaction paradigm based on indirect addressing. Processed data recipients (event subscribing system 1106) specify their interest in receiving information from ESPE 1216 by subscribing to specific classes of events, while information sources (event publishing system 1102) publish events to ESPE 1216 without directly addressing the data recipients.

In an operation 1606, a connection is made between event publishing application 1522 and ESPE 1216 for each source window of the source windows 1306 to which any measurement data value is published. To make the connection, the pointer to the created publishing client may be passed to a "Connect" function. If event publishing application 1522 is publishing to more than one source window of ESPE 1216, a connection may be made to each started window using the pointer returned for the respective "Start" function call.

In an operation 1608, an event block object is created by event publishing application 1522 that includes a measurement data value. The measurement data value may have been received, captured, generated, etc., for example, through fifth communication interface 1506 or fifth input interface 1502 or by fifth processor 1510. The measurement data value may be processed before inclusion in the event block object, for example, to change a unit of measure, convert to a different reference system, etc. The event block object may include a plurality of measurement data values measured at different times and/or by different devices.

In an operation 1610, the created event block object is published to ESPE 1216, for example, using the pointer returned for the respective "Start" function call to the appropriate source window. Event publishing application 1522 passes the created event block object to the created publishing client, where the unique ID field in the event block object has been set by event publishing application 1522 possibly after being requested from the created publishing client. In an illustrative embodiment, event publishing application 1522 may wait to begin publishing until a "Ready" callback has been received from the created publishing client. The event block object is injected into the source window, continuous query, and project associated with the started publishing client.

In an operation 1612, a determination is made concerning whether or not processing is stopped. If processing is not stopped, processing continues in operation 1608 to continue creating and publishing event block objects that include measurement data values. If processing is stopped, processing continues in an operation 1614.

In operation 1614, the connection made between event publishing application 1522 and ESPE 1216 through the created publishing client is disconnected, and each started publishing client is stopped.

Figure 17:
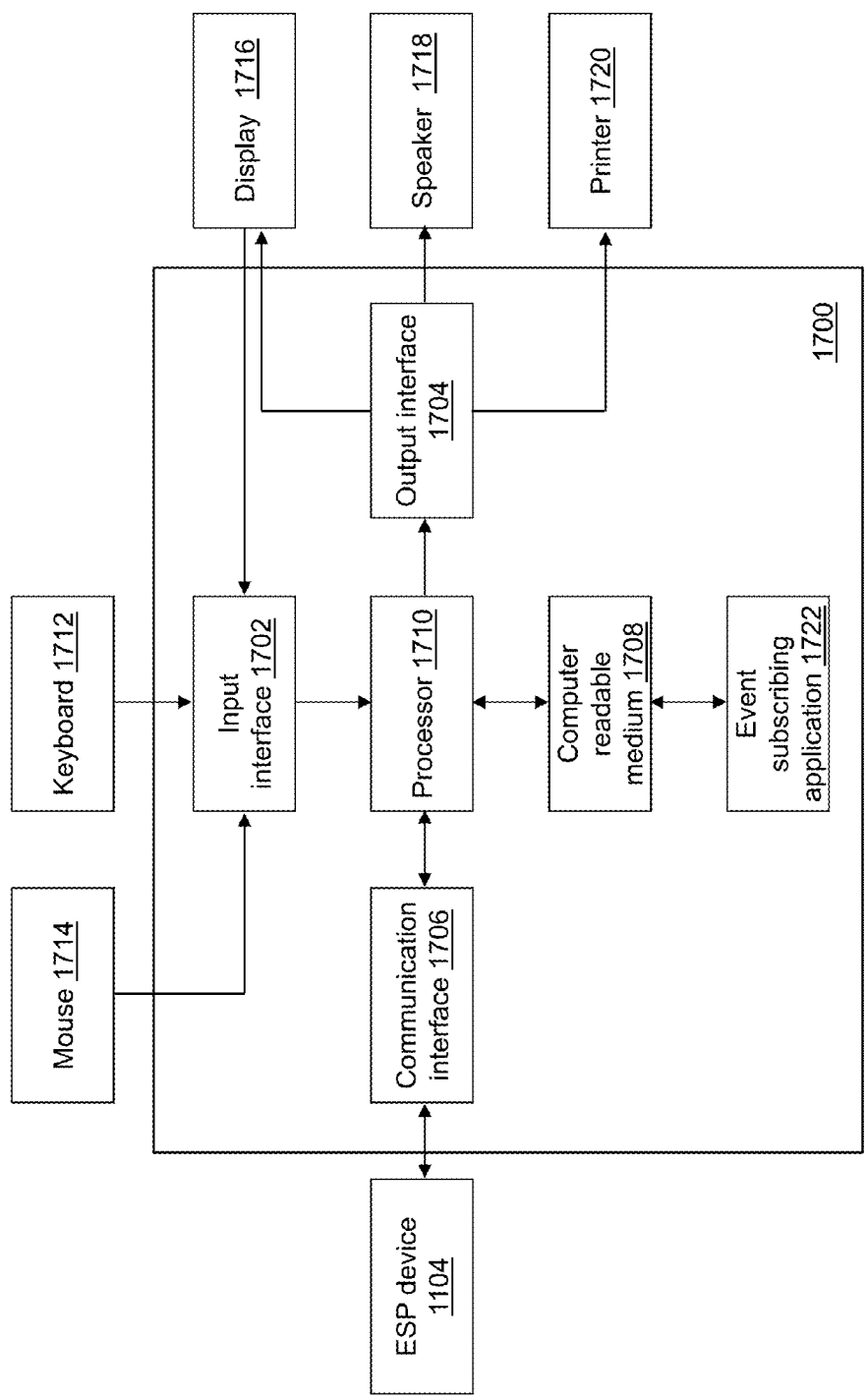
FIG. 17 depicts a block diagram of an event subscribing device of an event subscribing system of the stream processing system of FIG. 11 in accordance with an illustrative embodiment.

Referring to FIG. 17, a block diagram of an event subscribing device 1700 is shown in accordance with an example embodiment. Event subscribing device 1700 is an example computing device of event subscribing system 1106. For example, each of smart phone 1120, desktop 1122, server computer 11324, and laptop 1126 may be an instance of event subscribing device 1700. Event subscribing device 1700 may include a sixth input interface 1702, a sixth output interface 1704, a sixth communication interface 1706, a sixth computer-readable medium 1708, a sixth processor 1710, and an event subscribing application 1722. Fewer, different, and additional components may be incorporated into event subscribing device 1700. Each event subscribing device 1700 of event subscribing system 1106 may include the same or different components or combination of components.

Sixth input interface 1702 provides the same or similar functionality as that described with reference to input interface 202 of analytic service device 104 though referring to event subscribing device 1700. Sixth output interface 1704 provides the same or similar functionality as that described with reference to output interface 204 of analytic service device 104 though referring to event subscribing device 1700. Sixth communication interface 1706 provides the same or similar functionality as that described with reference to communication interface 206 of analytic service device 104 though referring to event subscribing device 1700. Data and messages may be transferred between event subscribing device 1700 and ESP device 1104 using sixth communication interface 1706. Sixth computer-readable medium 1708 provides the same or similar functionality as that described with reference to computer-readable medium 208 of analytic service device 104 though referring to event subscribing device 1700. Sixth processor 1710 provides the same or similar functionality as that described with reference to processor 210 of analytic service device 104 though referring to event subscribing device 1700.

Referring to FIG. 18, example operations associated with event subscribing application 1722 are described. Additional, fewer, or different operations may be performed depending on the embodiment. The order of presentation of the operations of FIG. 18 is not intended to be limiting.

Similar to operation 1600, in an operation 1800, ESPE 1216 is queried.

In an operation 1802, subscription services are initialized.

In an operation 1804, the initialized subscription services are started, which may create a subscribing client on behalf of event subscribing application 1722 at event subscribing device 1700. The subscribing client performs the various pub/sub activities for event subscribing application 1722. For example, a URL to ESPE 1216 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1806, a connection may be made between event subscribing application 1722 executing at event subscribing device 1700 and ESPE 1216 through the created subscribing client. To make the connection, the pointer to the created subscribing client may be passed to a "Connect" function and a mostly non-busy wait loop created to wait for receipt of event block objects.

In an operation 1808, an event block object is received by event subscribing application 1722 executing at event subscribing device 1700 from ESPE 1216.

In an operation 1810, the received event block object is processed based on the operational functionality provided by event subscribing application 1722. For example, event subscribing application 1722 may extract data from the received event block object and store the extracted data in a database. In addition, or in the alternative, event subscribing application 1722 may extract data from the received event block object and send the extracted data to a system control operator display system, an automatic control system, a notification device, an analytic device, etc. In addition, or in the alternative, event subscribing application 1722 may extract data from the received event block object and send the extracted data to a post-incident analysis device to further analyze the data. Event subscribing application 1722 may perform any number of different types of actions as a result of extracting data from the received event block object. The action may involve presenting information on a third display 1716 or a third printer 1720, presenting information using a third speaker 1718, storing data in sixth computer-readable medium 1708, sending information to another device using sixth communication interface 1706, etc. A user may further interact with presented information using a third mouse 1714 and/or a third keyboard 1712

In an operation 1812, a determination is made concerning whether or not processing is stopped. If processing is not stopped, processing continues in operation 1808 to continue receiving and processing event block objects. If processing is stopped, processing continues in an operation 1814.

In operation 1814, the connection made between event subscribing application 1722 and ESPE 1216 through the subscribing client is disconnected, and the subscribing client is stopped.

ESPE 1216 is an example analytic execution application 422. Users of SAS ESP can publish analytics, such as predictive models that were created with SAS Enterprise Miner, and can author custom programs using the SAS DS2, Python, or C programming languages. These custom programs can be executed by analytic service application 222, which SAS Event Stream Processing calls using the C++ layer.

Analytic service application 222 integrates with multiple client types and client programming languages. A layered set of interfaces is provided for use with client systems written in C, C++, Java, and SAS DS2, and for web-based clients. Each interface provides the language independent publishing and execution functionality described. In addition, isolated publishing/execution contexts provide support for multiple users, tenants, or business contexts. Simplified interfaces are provided for clients that do not need to manage multiple contexts. These interfaces may manage a single user context automatically.

Analytic service application 222 supports versioning of executables. Analytic service application 222 is designed to host multiple modules and revisions concurrently. Analytic service application 222 is capable of executing multiple revisions of a given module simultaneously, which is useful for champion/challenger testing of predictive models, for example. Revisions are also useful for rolling back to a known good version of a module. A user can select a revision to execute by number.

SAS® Enterprise Decision Manager is an example integrated analytic creation application 322 and analytic execution application 422 that generates DS2 programs that implement user-created rule sets and rule flows. SAS® Enterprise Decision Manager can combine SAS analytics, such as score code generated by SAS Enterprise Miner, with business rules in order to form decision logic. SAS Enterprise Decision Manager uses analytic service application 222 to compile and execute this decision logic. In addition to deploying generated decision logic, the SAS Enterprise Decision Manager enables users to author DS2 or Python code customized to their specific needs, and to publish this code to analytic service application 222. The SAS Enterprise Decision Manager solution deploys analytic service application 222 as a web service and calls it through the Rest API layer of analytic service application 222.

Analytic execution application 422 is not required to know the language a published module is written in, and integrators do not need to implement language-specific calling conventions, even when analytic execution application 422 and analytic service application 222 are deployed to the same process space.

Analytic service application 222 provides a language-independent parameter and results passing mechanism, which enables functions with arbitrary fixed signatures to be called in a standard way using a set of data types supported across all languages. Conversion between language-independent and language-specific types is performed automatically where necessary.

Other software systems typically require a separate set of tools for each programming language, and require separate steps to compile and deploy executables to a target environment. This separation of program creation versus deployment limits the ability of users to rapidly implement changes. Without analytic service application 222, typical projects involving multiple programming languages require integrators to employ cross-language integration code, and to handle multiple runtime libraries and data representation differences manually limiting automation and flexibility and lengthening project implementation times.

Analytic service application 222 provides a stateless, memory-resident, high performance program execution service that requires minimal configuration and footprint. It hosts programs written in multiple languages including SAS DS2, Python, C, and others, and supports a "compile-once, execute many times" usage pattern via a set of simplified, language-independent interfaces.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
receive a module context definition from an analytic client application, wherein the module context definition includes a module context name and an indicator of a first programming language;
create a module context data structure for the module context definition;
store the module context name and the indicator of the first programming language in the created module context data structure;
define a value of a module context pointer, wherein the value is a memory location of the created module context data structure;
store the value of the module context pointer;
receive a revision definition from the analytic client application, wherein the revision definition includes source code based on the first programming language;
compile the source code included in the received revision definition using a first compiler associated with the indicator of the first programming language;
when the compilation of the source code is successful, increment a revision number;
create a revision data structure for the revision definition;
parse the source code to define code elements;
generate an integration function using the parsed source code, wherein the generated integration function maps first input parameters of the source code in a second programming language to second input parameters of the source code in the first programming language and maps first output parameters of the source code in the second programming language to second output parameters of the source code in the first programming language;
compile the generated integration function with the source code using a second compiler associated with the second programming language to define an executable;
retrieve an entry point address to the generated integration function from the defined executable;
store the incremented revision number and the retrieved entry point address in the created revision data structure; and
store the created revision data structure in the created module context data structure;
receive a request to execute the source code from the analytic client application, wherein the request includes a module indicator and a revision indicator;
identify the created revision data structure using the module indicator and the revision indicator;
identify the retrieved entry point address using the identified, created revision data structure;
call the generated integration function using the identified, retrieved entry point address, wherein the generated integration function calls the source code compiled using the second compiler; and
output a result generated by the called integration function.

2. The non-transitory computer-readable medium of claim 1, wherein the computer-readable instructions further cause the computing device to return the value of the module context pointer to the analytic client application.

3. The non-transitory computer-readable medium of claim 2, wherein the received revision definition includes the value of the module context pointer.

4. The non-transitory computer-readable medium of claim 1, wherein the computer-readable instructions further cause the computing device to:
define a second value of a revision pointer, wherein the second value is a memory location of the created revision data structure;
wherein storing the created revision data structure comprises storing the value of the revision pointer in the module context data structure.

5. The non-transitory computer-readable medium of claim 4, wherein the computer-readable instructions further cause the computing device to return the incremented revision number to the analytic client application, wherein the incremented revision number indicates a successful compilation of the source code.

6. The non-transitory computer-readable medium of claim 5, wherein the revision indicator is the incremented revision number.

7. The non-transitory computer-readable medium of claim 1, wherein the computer-readable instructions further cause the computing device to:
define a second value of a revision pointer, wherein the second value is a memory location of the created revision data structure;
wherein storing the created revision data structure comprises adding the value of the revision pointer to a list of a plurality of revisions stored in the module context data structure and associated with the module context definition.

8. The non-transitory computer-readable medium of claim 7, wherein the list of the plurality of revisions stored in the module context data structure is stored in reverse creation order.

9. The non-transitory computer-readable medium of claim 7, wherein the computer-readable instructions further cause the computing device to:
update a highest revision counter with a value of the incremented revision number; and
store a value of the updated highest revision counter in the module context data structure.

10. The non-transitory computer-readable medium of claim 9, wherein the computer-readable instructions further cause the computing device to:

increment a number of revisions counter; and store a value of the incremented number of revisions counter in the module context data structure.

11. The non-transitory computer-readable medium of claim 10, wherein the value of the incremented number of revisions counter is less than the value of the updated highest revision counter.

12. The non-transitory computer-readable medium of claim 1, wherein the analytic client application that sent the request is a different analytic client application from the analytic client application that sent the revision definition.

13. The non-transitory computer-readable medium of claim 1, wherein the executable and the source code are stored in the created revision data structure.

14. The non-transitory computer-readable medium of claim 1, wherein before receiving the module context definition, the computer-readable instructions further cause the computing device to:

receive a user context definition from the analytic client application, wherein the user context definition includes a user context name;

create a user context data structure for the user context definition;

store the user context name in the created user context data structure; and store the value of the module context pointer in the created user context data structure.

15. The non-transitory computer-readable medium of claim 14, wherein storing the value of the module context pointer comprises adding the value of the module context pointer to a list of a plurality of modules stored in the user context data structure and associated with the user context definition.

16. The non-transitory computer-readable medium of claim 15, wherein the computer-readable instructions further cause the computing device to:

increment a number of modules counter; and store a value of the incremented number of modules counter in the user context data structure.

17. The non-transitory computer-readable medium of claim 1, wherein the code elements include a plurality of steps, wherein the request includes an indicator of a step name of the plurality of steps, wherein each step is a set of computer-readable instructions in the first programming language, wherein the set of instructions are configured to perform a predefined operation within the source code.

18. The non-transitory computer-readable medium of claim 17, wherein the retrieved entry point address is further identified using the step name.

19. The non-transitory computer-readable medium of claim 18, wherein the computer-readable instructions further cause the computing device to separately generate the integration function for each step of the plurality of steps.

20. The non-transitory computer-readable medium of claim 19, wherein the computer-readable instructions further cause the computing device to separately retrieve the entry point address to the generated integration function from the defined executable for each step of the plurality of steps.

21. The non-transitory computer-readable medium of claim 20, wherein the retrieved entry point address for each step of the plurality of steps is stored in the created revision data structure.

22. The non-transitory computer-readable medium of claim 1, wherein the computer-readable instructions further cause the computing device to:

create a second revision data structure for the revision definition based on the first programming language; and store the created revision data structure in the created second revision data structure.

23. The non-transitory computer-readable medium of claim 22, wherein the identified, retrieved entry point address is identified from the created second revision data structure.

24. A computing device comprising:

a processor; and a non-transitory computer-readable medium operably coupled to the processor, the computer-readable medium having computer-readable instructions stored thereon that, when executed by the processor, cause the computing device to receive a module context definition from an analytic client application, wherein the module context definition includes a module context name and an indicator of a first programming language;

create a module context data structure for the module context definition;

store the module context name and the indicator of the first programming language in the created module context data structure;

define a value of a module context pointer, wherein the value is a memory location of the created module context data structure;

store the value of the module context pointer;

receive a revision definition from the analytic client application, wherein the revision definition includes source code based on the first programming language;

compile the source code included in the received revision definition using a first compiler associated with the indicator of the first programming language;

when the compilation of the source code is successful, increment a revision number;

create a revision data structure for the revision definition;

parse the source code to define code elements;

generate an integration function using the parsed source code, wherein the generated integration function maps first input parameters of the source code in a second programming language to second input parameters of the source code in the first programming language and maps first output parameters of the source code in the second programming language to second output parameters of the source code in the first programming language;

compile the generated integration function with the source code using a second compiler associated with the second programming language to define an executable;

retrieve an entry point address to the generated integration function from the defined executable;

store the incremented revision number and the retrieved entry point address in the created revision data structure; and store the created revision data structure in the created module context data structure;

receive a request to execute the source code from the analytic client application, wherein the request includes a module indicator and a revision indicator;

identify the created revision data structure using the module indicator and the revision indicator;

identify the retrieved entry point address using the identified, created revision data structure;

call the generated integration function using the identified, retrieved entry point address, wherein the generated integration function calls the source code compiled using the second compiler; and output a result generated by the called integration function.

25. A method of executing analytic source code published to a computing device, the method comprising:

receiving a module context definition from an analytic client application, wherein the module context definition includes a module context name and an indicator of a first programming language;

creating, by a computing device, a module context data structure for the module context definition;

storing, by the computing device, the module context name and the indicator of the first programming language in the created module context data structure;

defining, by the computing device, a value of a module context pointer, wherein the value is a memory location of the created module context data structure;

storing, by the computing device, the value of the module context pointer;

receiving a revision definition from the analytic client application, wherein the revision definition includes source code based on the first programming language;

compiling, by the computing device, the source code included in the received revision definition using a first compiler associated with the indicator of the first programming language;

when the compilation of the source code is successful,
incrementing, by the computing device, a revision number;

creating, by the computing device, a revision data structure for the revision definition;

parsing, by the computing device, the source code to define code elements;

generating, by the computing device, an integration function using the parsed source code, wherein the generated integration function maps first input parameters of the source code in a second programming language to second input parameters of the source code in the first programming language and maps first output parameters of the source code in the second programming language to second output parameters of the source code in the first programming language;

compiling, by the computing device, the generated integration function with the source code using a second compiler associated with the second programming language to define an executable;

retrieving, by the computing device, an entry point address to the generated integration function from the defined executable;

storing, by the computing device, the incremented revision number and the retrieved entry point address in the created revision data structure; and storing, by the computing device, the created revision data structure in the created module context data structure;

receiving a request to execute the source code from the analytic client application, wherein the request includes a module indicator and a revision indicator;

identifying, by the computing device, the created revision data structure using the module indicator and the revision indicator;

identifying, by the computing device, the retrieved entry point address using the identified, created revision data structure;

calling, by the computing device, the generated integration function using the identified, retrieved entry point address, wherein the generated integration function calls the source code compiled using the second compiler; and outputting, by the computing device, a result generated by the called integration function.

26. The method of claim 25, wherein the code elements include a plurality of steps, wherein the request includes an indicator of a step name of the plurality of steps, wherein each step is a set of computer-readable instructions in the first programming language, wherein the set of instructions are configured to perform a predefined operation within the source code.

27. The method of claim 26, wherein the retrieved entry point address is further identified using the step name.

28. The method of claim 27, further comprising separately generating, by the computing device, the integration function for each step of the plurality of steps.

29. The method of claim 28, further comprising separately retrieving, by the computing device, the entry point address to the generated integration function from the defined executable for each step of the plurality of steps.

30. The method of claim 29, wherein the retrieved entry point address for each step of the plurality of steps is stored in the created revision data structure.

* * * * *